United States Patent
Wang et al.

(10) Patent No.: US 11,463,937 B2
(45) Date of Patent: Oct. 4, 2022

(54) DATA TRANSMISSION METHOD AND APPARATUS

(71) Applicant: HUAWEI TECHNOLOGIES CO., LTD., Guangdong (CN)

(72) Inventors: Rui Wang, Shanghai (CN); Mingzeng Dai, Shenzhen (CN); You Li, Shenzhen (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 55 days.

(21) Appl. No.: 16/925,614

(22) Filed: Jul. 10, 2020

(65) Prior Publication Data
US 2020/0344666 A1 Oct. 29, 2020

Related U.S. Application Data

(63) Continuation of application No. PCT/CN2019/071481, filed on Jan. 11, 2019.

(30) Foreign Application Priority Data

Jan. 12, 2018 (CN) .......................... 201810032655.5

(51) Int. Cl.
*H04W 40/22* (2009.01)
*H04L 69/326* (2022.01)
*H04W 24/10* (2009.01)

(52) U.S. Cl.
CPC ........... *H04W 40/22* (2013.01); *H04L 69/326* (2013.01); *H04W 24/10* (2013.01)

(58) Field of Classification Search
CPC .... H04W 40/22; H04W 24/10; H04L 69/326; H04L 5/00; H04L 29/06; H04L 29/08; H04L 69/321; H04L 69/06; H04L 69/322
See application file for complete search history.

(56) References Cited

U.S. PATENT DOCUMENTS

2012/0182929 A1* 7/2012 Chen .................... H04L 63/1458
370/315
2015/0296414 A1* 10/2015 Yi ........................ H04W 12/102
370/328

(Continued)

FOREIGN PATENT DOCUMENTS

CN  101626607 A  1/2010
CN  101877915 A  11/2010

(Continued)

OTHER PUBLICATIONS

Office Action issued in Chinese Application No. 201810032655.5 dated Dec. 25, 2019, 11 pages (With English translation).

(Continued)

*Primary Examiner* — Jung H Park
(74) *Attorney, Agent, or Firm* — Fish & Richardson P.C.

(57) ABSTRACT

The present disclosure relates to data transmission methods. One example method is applied to a first communications device or a chip in the first communications device. The method includes obtaining first data, and sending, to a second communications device, a first message including the first data and a type identifier, where the type identifier is used to indicate a type of the first data, and the type of the first data includes at least one of user plane data, a status report, a control plane message, and a radio resource control RRC message of a terminal.

20 Claims, 28 Drawing Sheets

(56) References Cited

U.S. PATENT DOCUMENTS

2016/0212661 A1* 7/2016 Basu Mallick ....... H04L 1/1614
2018/0309664 A1* 10/2018 Balasubramanian ... H04L 45/54

FOREIGN PATENT DOCUMENTS

| | | | |
|---|---|---|---|
| CN | 102160300 | A | 8/2011 |
| CN | 103582161 | A | 2/2014 |
| CN | 104219144 | A | 12/2014 |
| CN | 104468312 | A | 3/2015 |
| CN | 106162694 | A | 11/2016 |
| CN | 107113593 | A | 8/2017 |
| KR | 20170132080 | A | 12/2017 |
| WO | 2011002244 | A2 | 1/2011 |
| WO | 2012055114 | A1 | 5/2012 |
| WO | 2014007494 | A1 | 1/2014 |
| WO | 2014101062 | A1 | 7/2014 |
| WO | 2016026116 | A1 | 2/2016 |

OTHER PUBLICATIONS

PCT International Search Report and Written Opinion issued in International Application No. PCT/CN2019/071481 dated Apr. 11, 2019, 15 pages (with English translation).
Extended European Search Report issued in European Application No. 19738167.6 dated Nov. 27, 2020, 18 pages.
Office Action in Chinese Application No. 202010718517.X, dated Jun. 30, 2021, 6 pages.

* cited by examiner

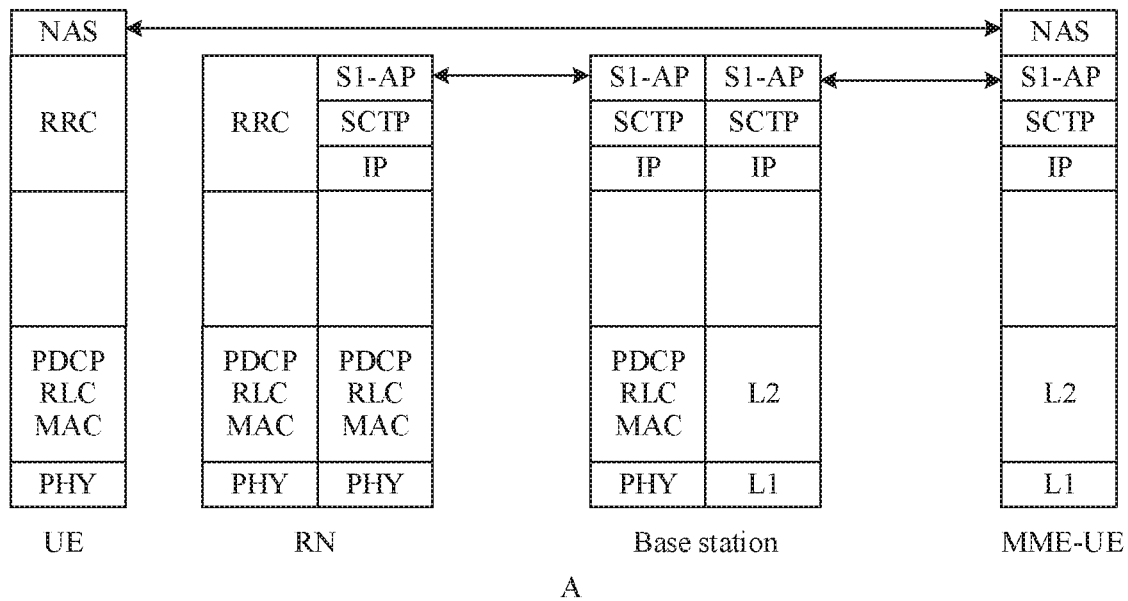
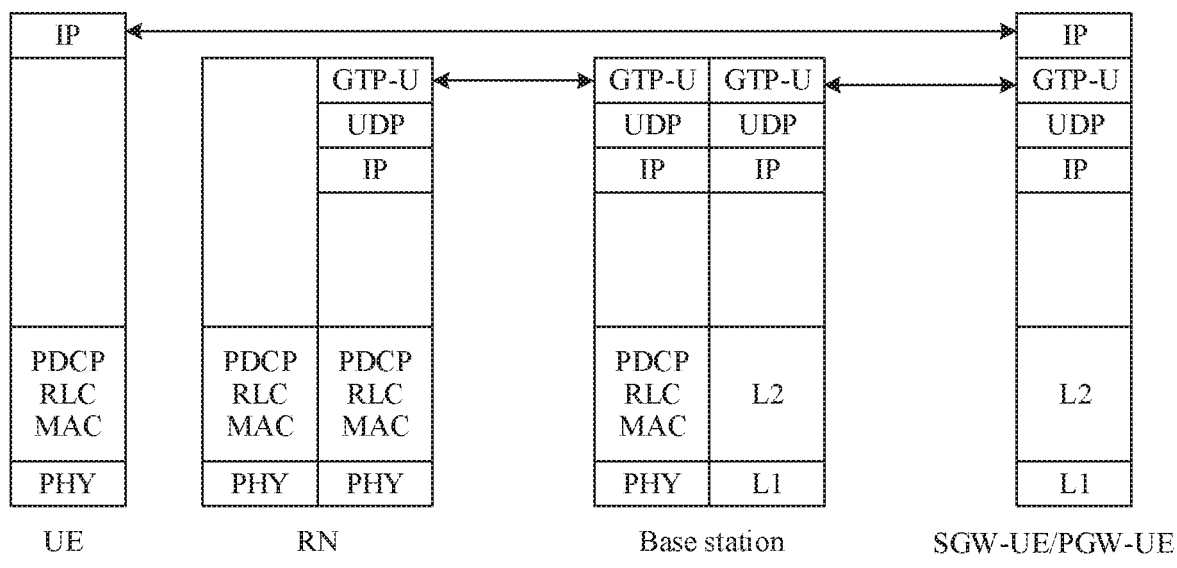
FIG. 3

TO FIG. 11B

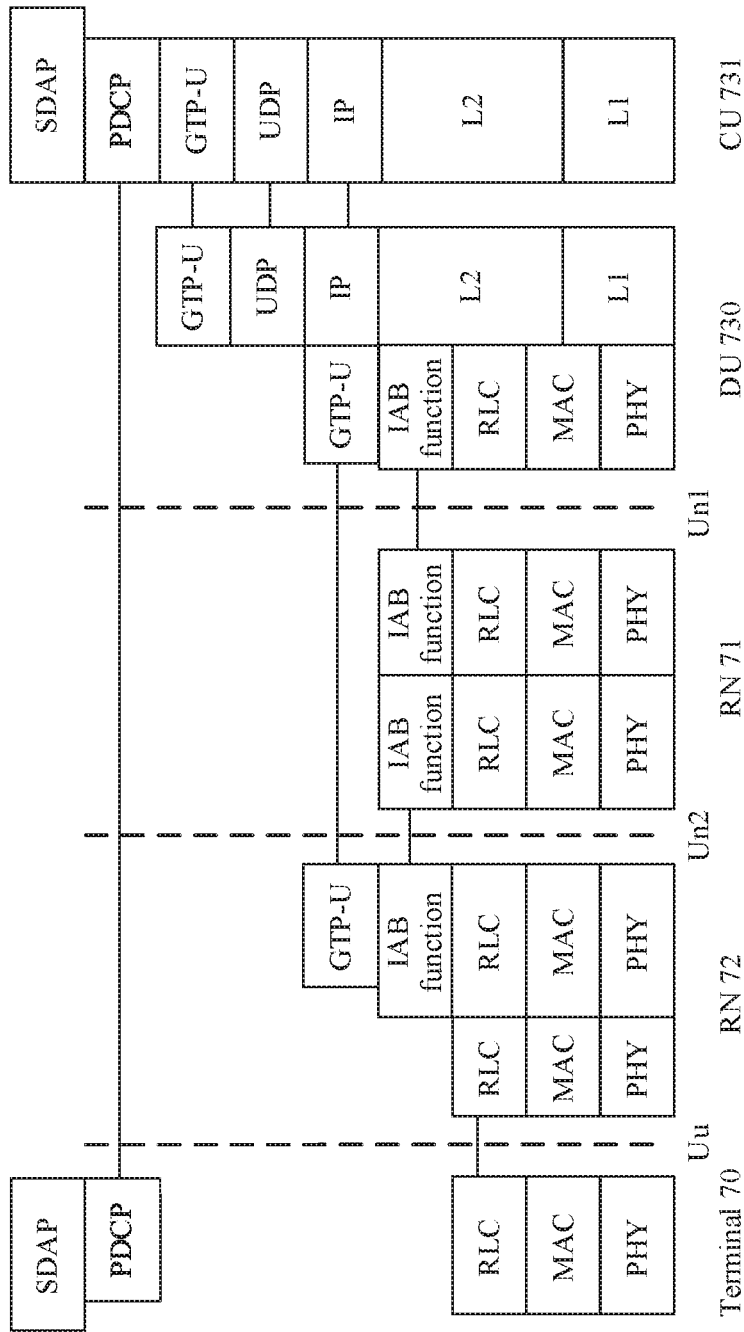

User plane protocol stack

| Message type (control plane message) | F1AP load (including a first interface identifier of a terminal, for example, a CU UE F1AP ID or a DU UE F1AP ID) |
|---|---|

| Message type (user plane data) | First indication information (for example, a TEID) | Global SN | User plane data of UE, such as a PDCP PDU |
|---|---|---|---|

| Message type (status report) | Status report, which may include fifth indication information (for example, a TEID) and a global SN number (for example, a largest consecutive SN received by UE, a hole SN, ...) |
|---|---|

FIG. 17

| Message type (control plane message) | Target identifier | F1AP load (including a first interface identifier of a terminal, for example, a CU UE F1AP ID or a DU UE F1AP ID) |
|---|---|---|

| Message type (user plane data) | Target identifier | First indication information (for example, a TEID) | Global SN | User plane data of UE (for example, a UE PDCP PDU) |
|---|---|---|---|---|

| Message type (status report) | Target identifier | Status report, which may include fifth indication information (for example, a TEID) and a global SN number (for example, a largest consecutive SN received by UE, a hole SN, ...) |
|---|---|---|

FIG. 18

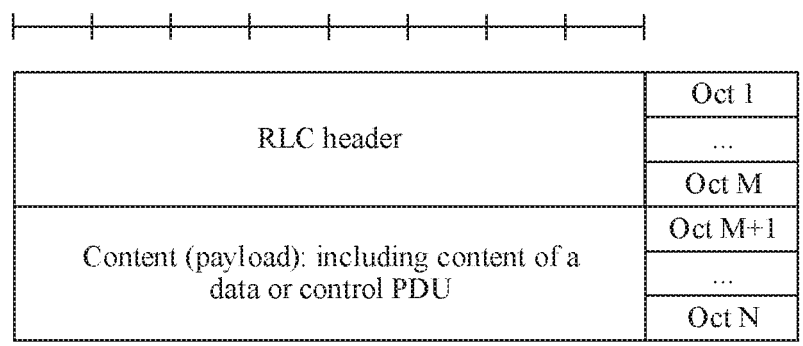
A
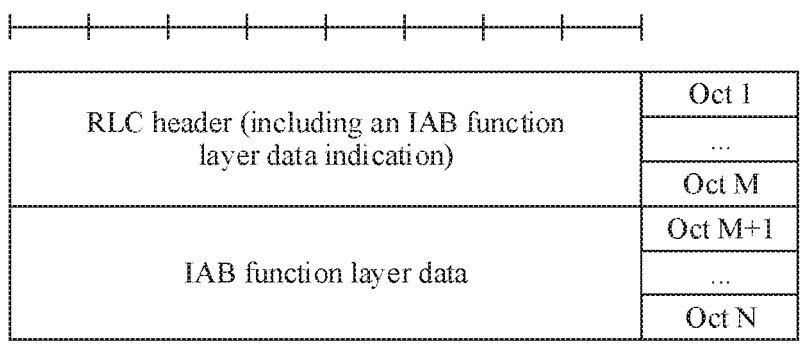
B
FIG. 20

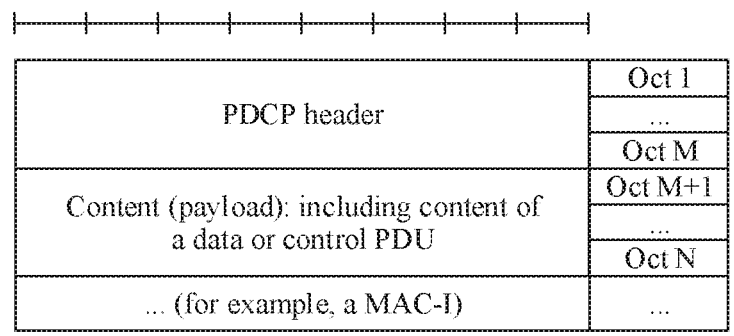
A
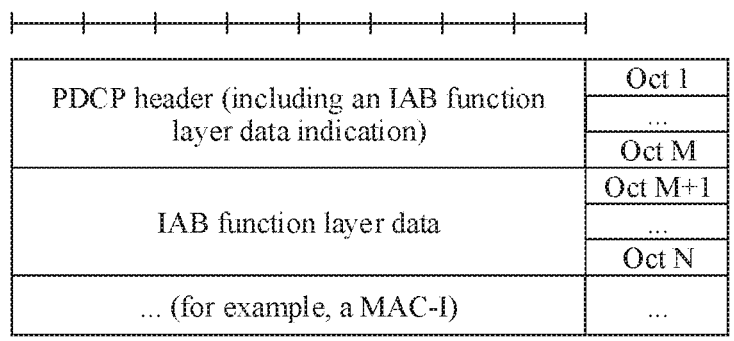
B
FIG. 21

DATA TRANSMISSION METHOD AND APPARATUS

CROSS-REFERENCE TO RELATED APPLICATIONS

This application is a continuation of International Application No. PCT/CN2019/071481, filed on Jan. 11, 2019, which claims priority to Chinese Patent Application No. 201810032655.5, filed on Jan. 12, 2018. The disclosures of the aforementioned applications are hereby incorporated by reference in their entireties.

TECHNICAL FIELD

Embodiments of this application relate to the field of communication technologies, and in particular, to a data transmission method and apparatus.

BACKGROUND

A relay node (RN) has features such as wireless self-backhaul and flexible placement. In a multi-hop relay scenario, a peer packet data convergence protocol (PDCP) layer of user equipment (UE) may be placed in a DeNB system, and a peer radio link control protocol (RLC) layer of the UE may be placed in an RN. In this way, for data of the UE, the RN needs to complete processing only at a physical layer (PHY), a media access control (MAC) layer, and an RLC layer. In this case, a protocol architecture of the RN is referred to as a layer 2 (L2) architecture.

However, in a multi-hop relay network including the RN having the L2 architecture, there is currently no method for the RN to identify or process data received by the RN.

SUMMARY

Embodiments of this application provide a data transmission method and apparatus, so that an RN can quickly identify and process data received by the RN.

To achieve the foregoing objective, the following technical solutions are used in the embodiments of this application.

According to a first aspect, a data transmission method is provided. The data transmission method is applied to a first communications device or a chip in the first communications device, and the first communications device is an intermediate forwarding node, a serving node of a terminal, a DeNB, or a distributed unit DU in a DeNB system. Specifically, the data transmission method provided in this embodiment of this application includes: obtaining, by the first communications device, first data, and sending, to a second communications device, a first message including the first data and a type identifier, where the type identifier is used to indicate a type of the first data. The type of the first data includes at least one of user plane data, a status report, a control plane message, and a radio resource control RRC message of the terminal. If the first communications device is the intermediate forwarding node, the second communications device is a previous-hop device or a next-hop device of the intermediate forwarding node. If the first communications device is the serving node of the terminal, the second communications device is a previous-hop device of the serving node of the terminal. If the first communications device is the DeNB or the DU, the second communications device is a next-hop device of the first communications device.

Specifically, if the first data is the user plane data, the first message includes first indication information and a global sequence number SN of the user plane data, and the first indication information is used to indicate a data radio bearer DRB of the terminal to which the user plane data belongs. If the first data is the status report, the first data includes the global SN of the user plane data carried over the DRB of the terminal, the first data is used to indicate a transmission status of a DRB data packet of a third communications device, and the third communications device is the terminal, the intermediate forwarding node, or the serving node of the terminal. If the first data is the control plane message, the first message includes at least one of transport layer protocol layer information of a first interface, second indication information, an identifier of the terminal on the first interface, and third indication information, the first interface is a logical communications interface between the first communications device and the second communications device, the transport layer protocol layer information of the first interface includes at least one of an internet protocol IP address of the first communications device, an IP address of the second communications device, an IP address of the DeNB or the DU, a port number of the first communications device, a port number of the second communications device, a port number of the DeNB or the DU, a stream control transmission protocol SCTP stream identifier, and an SCTP payload protocol identifier PPI, the second indication information is used to indicate the first communications device, and the third indication information is used to indicate the first interface; or the first message includes fourth indication information and an identifier of the serving node of the terminal, and the fourth indication information is used to indicate the terminal.

It can be learned that for different types of data, in the data transmission method provided in this embodiment of this application, a unified message format is used for transmission. In this way, a time for each node in a multi-hop relay network to process a message in the format can be effectively reduced.

In addition, because the first message sent by the first communications device to the second communications device includes the type identifier, after obtaining the first message, the second communications device in this embodiment of this application may directly determine the type of the first data based on the type identifier, and further process the first message by using a method corresponding to the type of the first data, thereby further improving processing efficiency of each node in the multi-hop relay network.

Optionally, the first indication information is a tunnel endpoint identifier (TEID), a source internet protocol (IP) address, a destination IP address, a source port number, a destination port number, a terminal identifier, or a data radio bearer (DRB) identifier.

The second indication information is used to indicate the first communications device. If the first communications device is an RN, the second indication information may be a UE identifier (for example, a C-RNTI, an S-TMSI, or a GUTI) when the RN accesses a network as UE, or may be an F1-like interface identifier (for example, a UE F1AP ID or a UE F1AP-like ID) allocated by a previous-hop RN to the RN when the RN accesses a network as UE, or may be an RN ID obtained after the RN is handed over from a UE mode to an RN mode after the RN accesses a network as UE. Optionally, if the RN is considered as one DU, the second indication information may have a same format as a DU identifier. Optionally, the second indication information may be a global identifier, and include an RN local identifier and a quantity of RN hops. Optionally, the RN local identifier may be allocated by a previous-hop node (for example, an RN or a DU in a DeNB system) of the RN.

The third indication information is used to indicate an F1-like interface, to identify logical F1-like connections of different RNs.

The fourth indication information is used to indicate the terminal. Optionally, the fourth indication information may be any one or any combination of a plurality of pieces of the following information: an F1-like interface UE ID, a C-RNTI, a cell ID, a context identifier, and the like. Further, optionally, the fourth indication information is a combination of a terminal identifier and an RN identifier.

Optionally, in a possible implementation of this application, if the first data is the status report, the first data further includes fifth indication information, and the fifth indication information is used to indicate the DRB of the terminal.

The fifth indication information is a TEID, a source IP address, a destination IP address, a source port number, a destination port number, a terminal identifier, or a DRB identifier. Optionally, the first indication information may be the same as or different from the fifth indication information. This is not specifically limited in this embodiment of this application.

Optionally, in another possible implementation of this application, if the third communications device is the intermediate forwarding node or the serving node of the terminal, the first data specifically includes the fifth indication information carried over each DRB in at least one DRB of the third communications device.

Optionally, in another possible implementation of this application, the first message further includes at least one of a target identifier and sixth indication information, the target identifier is used to indicate the serving node of the terminal, and the sixth indication information is used to indicate the terminal.

When the first message further includes at least one of the target identifier and the sixth indication information, the second communications device may determine a destination device of the first message, to perform corresponding processing/forwarding.

Optionally, the target identifier may be the identifier of the serving node of the terminal or an IP address of the serving node of the terminal.

Optionally, the sixth indication information may be any one or any combination of a plurality of pieces of the following information: an F1-like interface UE ID, a C-RNTI, a cell ID, a context identifier, and the like.

Optionally, in another possible implementation of this application, if the first data is the control plane message, and when the first message includes the identifier of the terminal on the first interface or the fourth indication information, a method for obtaining the first data by the first communications device includes: receiving, by the first communications device, a second message including second data, where the second data includes seventh indication information, and the seventh indication information is used to indicate the terminal or the DRB of the terminal; and obtaining, by the first communications device, the second data from the second message and replacing the seventh indication information with the identifier of the terminal on the first interface or the fourth indication information, to generate the first data.

Optionally, the seventh indication information may be any one or any combination of a plurality of pieces of the following information: an F1-like interface UE ID, a C-RNTI, a cell ID, a context identifier, and the like.

In this embodiment of this application, the seventh indication information and the identifier of the terminal on the first interface are identifiers of the terminal on different interfaces. Similarly, the seventh indication information and the fourth indication information are identifiers of the terminal on different interfaces. After obtaining the second data, the first communications device generates the first data by replacing the identifier used to indicate the terminal, and then sends the first data to the second communications device.

It may be understood that, if the second communications device is a previous-hop device of the first communications device, the second message is sent by the next-hop device of the first communications device. If the second communications device is the next-hop device of the first communications device, the second message is sent by the previous-hop device of the first communications device.

Optionally, in another possible implementation of this application, after obtaining the first data, the first communications device further compresses sub-information in the first data based on a first preset compression algorithm. The sub-information includes at least one of an IP header, an SCTP common header, and information other than target information in an SCTP data chunk, and the target information is at least one of user data, the stream identifier, and the PPI; or the sub-information includes at least one of an IP header, a user datagram protocol UDP header, and information other than a TEID in a general packet radio service tunneling protocol GTP header. Correspondingly, the first communications device sends the first message including the first data obtained after compression to the second communications device.

After obtaining the first data, the first communications device compresses the first data or some information in the first data, thereby effectively reducing resources occupied by the first message and reducing transmission overheads of an air interface resource.

Optionally, in another possible implementation of this application, if the first communications device is the intermediate forwarding node, the method for obtaining the first data by the first communications device includes: receiving, by the first communications device, a third message sent by a fourth communications device, where the third message includes the second data; and obtaining, by the first communications device, the second data from the third message and decompressing the second data based on a second preset compression algorithm, to obtain the first data. If the second communications device is a previous-hop device of the first communications device, the fourth communications device is the next-hop device of the first communications device. If the second communications device is the next-hop device of the first communications device, the fourth communications device is a previous-hop device of the first communications device.

If the first communications device is the serving node of the terminal, the first communications device further receives a fourth message that is sent by the second communications device and that includes third data: and the first communications device decompresses the third data based on a third preset compression algorithm, and sends the decompressed third data to the terminal.

If the first communications device is the DU, the first communications device further receives a fifth message that is sent by the second communications device and that includes fourth data; and the first communications device decompresses the fourth data based on a fourth preset compression algorithm, and sends the decompressed fourth data to a centralized unit CU in the DeNB system.

If the first communications device is the DU, the method for obtaining the first data by the first communications device includes: receiving, by the first communications device, a sixth message that is sent by the CU and that includes fifth data; and obtaining, by the first communications device, the fifth data from the sixth message and decompressing the fifth data based on a fifth preset compression algorithm, to obtain the first data.

It can be learned that if the first communications device is a different device, in a corresponding data transmission process (uplink data transmission/downlink data transmission), the first communications device further performs decompression processing.

Optionally, in another possible implementation of this application, after obtaining the first data, the first communications device further processes the first data based on a first preset key and a first preset target algorithm. The first preset target algorithm includes at least one of a preset encryption algorithm and a first preset integrity protection algorithm. Correspondingly, the first communications device sends the first message including the processed first data to the second communications device.

The first preset target algorithm includes at least one of the preset encryption algorithm and the first preset integrity protection algorithm. A process in which the first communications device processes the first data based on the first preset key and the first preset target algorithm is essentially performing, by the first communications device, security protection processing on the first data. In this way, security and integrity of the first data can be effectively ensured.

Optionally, in another possible implementation of this application, if the first communications device is the intermediate forwarding node, the method for obtaining the first data by the first communications device includes: receiving, by the first communications device, a seventh message that is sent by a fifth communications device and that includes sixth data; and obtaining, by the first communications device, the sixth data from the seventh message and processing the sixth data based on a second preset key and a second preset target algorithm, to obtain the first data. The second preset target algorithm includes at least one of a first preset decryption algorithm and a second preset integrity protection algorithm. If the second communications device is the previous-hop device of the first communications device, the fifth communications device is the next-hop device of the first communications device; or if the second communications device is the next-hop device of the first communications device, the fifth communications device is the previous-hop device of the first communications device.

If the first communications device is the serving node of the terminal, the first communications device further receives an eighth message that is sent by the second communications device and that includes seventh data; the first communications device obtains the seventh data from the eighth message, processes the seventh data based on a third preset key and a third preset target algorithm, and further sends the processed seventh data to the terminal. The third preset target algorithm includes at least one of a second preset decryption algorithm and a third preset integrity protection algorithm.

If the first communications device is the DU, the first communications device further receives a ninth message that is sent by the second communications device and that includes eighth data: the first communications device obtains the eighth data from the ninth message, processes the eighth data based on a fourth preset key and a fourth preset target algorithm, and further sends the processed eighth data to the centralized unit CU in the DeNB system. The fourth preset target algorithm includes at least one of a third preset decryption algorithm and a fourth preset integrity protection algorithm.

It can be learned that if the first communications device is a different device, in a corresponding data transmission process (uplink data transmission/downlink data transmission), the first communications device further performs decryption and/or integrity protection processing.

According to a second aspect, a data transmission apparatus is provided. The data transmission apparatus is a first communications device or a chip in the first communications device, and the first communications device is an intermediate forwarding node, a serving node of a terminal, a DeNB, or a distributed unit DU in a DeNB system. Specifically, the data transmission apparatus includes an obtaining unit and a sending unit.

Functions implemented by the unit modules provided in this application are specifically as follows:

The obtaining unit is configured to obtain first data. The sending unit is configured to send a first message to a second communications device, where the first message includes first data obtained by the obtaining unit and a type identifier, the type identifier is used to indicate a type of the first data, and the type of the first data includes at least one of user plane data, a status report, a control plane message, and a radio resource control RRC message of a terminal. If the first communications device is the intermediate forwarding node, the second communications device is a previous-hop device or a next-hop device of the intermediate forwarding node. If the first communications device is the serving node of the terminal, the second communications device is a previous-hop device of the serving node of the terminal. If the first communications device is the DeNB or the DU, the second communications device is a next-hop device of the first communications device. If the first data is the user plane data, the first message includes first indication information and a global sequence number SN of the user plane data, and the first indication information is used to indicate a data radio bearer DRB of the terminal to which the user plane data belongs. If the first data is the status report, the first data includes the global SN of the user plane data carried over the DRB of the terminal, the first data is used to indicate a transmission status of a DRB data packet of a third communications device, and the third communications device is the terminal, the intermediate forwarding node, or the serving node of the terminal. If the first data is the control plane message, the first message includes at least one of transport layer protocol layer information of a first interface, second indication information, an identifier of the terminal on the first interface, and third indication information, the first interface is a logical communications interface between the first communications device and the second communications device, the transport layer protocol layer information of the first interface includes at least one of an internet protocol IP address of the first communications device, an IP address of the second communications device, an IP address of the DeNB or the DU, a port number of the first communications device, a port number of the second communications device, a port number of the DeNB or the DU, a stream control transmission protocol SCTP stream identifier, and an SCTP payload protocol identifier PPI, the second indication information is used to indicate the first communications device, and the third indication information is used to indicate the first interface; or the first message includes fourth indication information and an identifier of the serving node of the terminal, and the fourth indication information is used to indicate the terminal.

Optionally, in a possible implementation of this application, if the first data is the status report, the first data further includes fifth indication information, and the fifth indication information is used to indicate the DRB of the terminal.

Optionally, in another possible implementation of this application, if the third communications device is the intermediate forwarding node or the serving node of the terminal, the first data specifically includes the fifth indication information carried over each DRB in at least one DRB of the third communications device.

Optionally, in another possible implementation of this application, the first message further includes at least one of a target identifier and sixth indication information, the target identifier is used to indicate the serving node of the terminal, and the sixth indication information is used to indicate the terminal.

Optionally, in another possible implementation of this application, if the first data is the control plane message, and the first message includes the identifier of the terminal on the first interface or the fourth indication information, the data transmission apparatus further includes a receiving unit. The receiving unit is configured to receive a second message including second data, where the second data includes seventh indication information, and the seventh indication information is used to indicate the terminal or the DRB of the terminal. The obtaining unit is further configured to obtain the second data from the second message received by the receiving unit. In addition, the data transmission apparatus in this embodiment of this application further includes a replacement unit. The replacement unit is configured to replace the seventh indication information with the identifier of the terminal on the first interface or the fourth indication information, to generate the first data.

Optionally, in another possible implementation of this application, the data transmission apparatus provided in this embodiment of this application further includes a compression unit. The compression unit is configured to compress, after the obtaining unit obtains the first data, sub-information in the first data based on a first preset compression algorithm, where the sub-information includes at least one of an IP header, an SCTP common header, and information other than target information in an SCTP data chunk, and the target information is at least one of user data, the stream identifier, and the PPI; or the sub-information includes at least one of an IP header, a user datagram protocol UDP header, and information other than a TEID in a general packet radio service tunneling protocol GTP header. The sending unit is specifically configured to send the first message including the first data obtained after compression to the second communications device.

Optionally, in another possible implementation of this application, the data transmission apparatus provided in this embodiment of this application further includes the receiving unit and a decompression unit. If the first communications device is the intermediate forwarding node, the receiving unit is configured to receive a third message sent by a fourth communications device, where the third message includes the second data. The obtaining unit is further configured to obtain the second data from the third message received by the receiving unit. The decompression unit is configured to decompress the second data based on a second preset compression algorithm, to obtain the first data. If the second communications device is a previous-hop device of the first communications device, the fourth communications device is the next-hop device of the first communications device; or if the second communications device is the next-hop device of the first communications device, the fourth communications device is a previous-hop device of the first communications device.

If the first communications device is the serving node of the terminal, the receiving unit is configured to receive a fourth message sent by the second communications device, where the fourth message includes third data. The decompression unit is configured to decompress the third data based on a third preset compression algorithm. The sending unit is specifically configured to send the decompressed third data to the terminal.

If the first communications device is the DU, the receiving unit is configured to receive a fifth message sent by the second communications device, where the fifth message includes fourth data. The decompression unit is configured to decompress the fourth data based on a fourth preset compression algorithm. The sending unit is specifically configured to send the decompressed fourth data to a centralized unit CU in the DeNB system.

If the first communications device is the DU, the receiving unit is configured to receive a sixth message sent by the CU, where the sixth message includes fifth data. The obtaining unit is further configured to obtain the fifth data from the sixth message. The decompression unit is configured to decompress the fifth data based on a fifth preset compression algorithm, to obtain the first data.

Optionally, in another possible implementation of this application, the data transmission apparatus in this embodiment of this application further includes a security protection unit. The security protection unit is configured to process, after the obtaining unit obtains the first data, the first data based on a first preset key and a first preset target algorithm, where the first preset target algorithm includes at least one of a preset encryption algorithm and a first preset integrity protection algorithm. The sending unit is specifically configured to send the first message including the processed first data to the second communications device.

Optionally, in another possible implementation of this application, the data transmission apparatus in this embodiment of this application further includes the receiving unit and a security processing unit. If the first communications device is the intermediate forwarding node, the receiving unit is configured to receive a seventh message sent by a fifth communications device, where the seventh message includes sixth data. The obtaining unit is further configured to obtain the sixth data from the seventh message received by the receiving unit. The security processing unit is configured to process, based on a second preset key and a second preset target algorithm, the sixth data obtained by the obtaining unit, to obtain the first data. The second preset target algorithm includes at least one of a first preset decryption algorithm and a second preset integrity protection algorithm. If the second communications device is the previous-hop device of the first communications device, the fifth communications device is the next-hop device of the first communications device; or if the second communications device is the next-hop device of the first communications device, the fifth communications device is the previous-hop device of the first communications device.

If the first communications device is the serving node of the terminal, the receiving unit is configured to receive an eighth message sent by the second communications device, where the eighth message includes seventh data. The obtaining unit is further configured to obtain the seventh data from the eighth message received by the receiving unit. The security processing unit is configured to process, based on a third preset key and a third preset target algorithm, the seventh data obtained by the obtaining unit. The sending unit is specifically configured to send the processed seventh data to the terminal, where the third preset target algorithm includes at least one of a second preset decryption algorithm and a third preset integrity protection algorithm.

If the first communications device is the DU, the receiving unit is configured to receive a ninth message sent by the second communications device, where the ninth message includes eighth data. The obtaining unit is further configured to obtain the eighth data from the ninth message. The security processing unit is configured to process the eighth data based on a fourth preset key and a fourth preset target algorithm. The sending unit is specifically configured to send the processed eighth data to the centralized unit CU in the DeNB system. The fourth preset target algorithm includes at least one of a third preset decryption algorithm and a fourth preset integrity protection algorithm.

According to a third aspect, a data transmission apparatus is provided. The data transmission apparatus includes one or more processors, a memory, and a communications interface. The memory and the communications interface are coupled to the one or more processors. The data transmission apparatus communicates with another device through the communications interface. The memory is configured to store computer program code. The computer program code includes an instruction. When the one or more processors execute the instruction, the data transmission apparatus performs the data transmission method according to the first aspect and the possible implementations of the first aspect.

According to a fourth aspect, a computer-readable storage medium is further provided. The computer-readable storage medium stores an instruction. When the instruction is run on a data transmission apparatus, the data transmission apparatus is enabled to perform the data transmission method according to the first aspect and the possible implementations of the first aspect.

According to a fifth aspect, a computer program product including an instruction is further provided. When the computer program product is run on a data transmission apparatus, the data transmission apparatus is enabled to perform the data transmission method according to the first aspect and the possible implementations of the first aspect.

In this application, a name of the data transmission apparatus does not constitute any limitation to devices or functional modules. In an actual implementation, these devices or functional modules may have other names. The devices or functional modules fall within the scope of the claims and their equivalent technologies in this application, provided that functions of the devices or functional modules are similar to those described in this application.

In this application, for detailed descriptions of the second aspect, the third aspect, the fourth aspect, the fifth aspect, and the implementations of the second aspect, the third aspect, the fourth aspect, and the fifth aspect, refer to the detailed descriptions of the first aspect and the implementations of the first aspect; for beneficial effects of the second aspect, the third aspect, the fourth aspect, the fifth aspect, and the implementations of the second aspect, the third aspect, the fourth aspect, and the fifth aspect, refer to the analyses of the beneficial effects of the first aspect and the implementations of the first aspect. Details are not described herein again.

According to a sixth aspect, a data transmission method is provided. The data transmission method is applied to a DeNB or a chip in the DeNB. The data transmission method includes: after receiving a first message that is sent by a first communications device and that includes first data and a type identifier, determining a type of the first data based on the type identifier, and processing the first data based on the type of the first data. The type identifier is used to indicate the type of the first data. The type of the first data includes at least one of user plane data, a status report, a control plane message, and a radio resource control RRC message of the terminal.

Specifically, if the first data is the user plane data, the first message includes first indication information and a global sequence number SN of the user plane data, and the first indication information is used to indicate a data radio bearer DRB of the terminal to which the user plane data belongs. If the first data is the status report, the first data includes the global SN of the user plane data carried over the DRB of the terminal, the first data is used to indicate a transmission status of a DRB data packet of a third communications device, and the third communications device is the terminal, the intermediate forwarding node, or the serving node of the terminal. If the first data is the control plane message, the first message includes at least one of transport layer protocol layer information of a first interface, second indication information, an identifier of the terminal on the first interface, and third indication information, the first interface is a logical communications interface between the first communications device and the second communications device, the transport layer protocol layer information of the first interface includes at least one of an internet protocol IP address of the first communications device, an IP address of the second communications device, an IP address of the DeNB or the DU, a port number of the first communications device, a port number of the second communications device, a port number of the DeNB or the DU, a stream control transmission protocol SCTP stream identifier, and an SCTP payload protocol identifier PPI, the second indication information is used to indicate the first communications device, and the third indication information is used to indicate the first interface: or the first message includes fourth indication information and an identifier of the serving node of the terminal, and the fourth indication information is used to indicate the terminal.

It can be learned that for different types of data, in the data transmission method provided in this embodiment of this application, a unified message format is used for transmission. In this way, a time for the DeNB to process a message in the format can be effectively reduced.

In addition, because the first message sent by the first communications device to the DeNB includes the type identifier, after obtaining the first message, the DeNB in this embodiment of this application may directly determine the type of the first data based on the type identifier, and further process the first message by using a method corresponding to the type of the first data, thereby further improving processing efficiency of the DeNB.

Optionally, the first indication information is a TEID, a source IP address, a destination IP address, a source port number, a destination port number, a terminal identifier, or a DRB identifier.

The second indication information is used to indicate the first communications device. If the first communications device is an RN, the second indication information may be a UE identifier (for example, a C-RNTI, an S-TMSI, or a GUTI) when the RN accesses a network as UE, or may be an F1-like interface identifier (for example, a UE F1AP ID or a UE F1AP-like ID) allocated by a previous-hop RN to the RN when the RN accesses a network as UE, or may be an RN ID obtained after the RN is handed over from a UE mode to an RN mode after the RN accesses a network as UE. Optionally, if the RN is considered as one DU, the second indication information may have a same format as a DU identifier. Optionally, the second indication information may be a global identifier, and include an RN local identifier and a quantity of RN hops. Optionally, the RN local identifier may be allocated by a previous-hop node (for example, an RN or a DU in a DeNB system) of the RN.

The third indication information is used to indicate an F1-like interface, to identify logical F1-like connections of different RNs.

The fourth indication information is used to indicate the terminal. Optionally, the fourth indication information may be any one or any combination of a plurality of pieces of the following information: an F1-like interface UE ID, a C-RNTI, a cell ID, a context identifier, and the like. Further, optionally, the fourth indication information is a combination of a terminal identifier and an RN identifier.

Optionally, in a possible implementation of this application, if the first data is the status report, the first data further includes fifth indication information, and the fifth indication information is used to indicate the DRB of the terminal.

The fifth indication information is a TEID, a source IP address, a destination IP address, a source port number, a destination port number, a terminal identifier, or a DRB identifier. Optionally, the first indication information may be the same as or different from the fifth indication information. This is not specifically limited in this embodiment of this application.

Optionally, in another possible implementation of this application, if the second communications device is the intermediate forwarding node or the serving node of the terminal, the first data specifically includes the fifth indication information carried over each DRB in at least one DRB of the second communications device.

Optionally, in another possible implementation of this application, if the first data is the status report, a method for processing the first data by the DeNB based on the type of the first data includes: sending, by the DeNB to the second communications device based on the first data, a DRB data packet of the second communications device that is not successfully received as indicated by the first data.

Optionally, in another possible implementation of this application, before the processing the first data based on the type of the first data, the DeNB further receives sixth indication information sent by the first communications device or a third communications device, where the sixth indication information is used to instruct to send, to the second communications device by using the third communications device, the DRB data packet of the second communications device that is not successfully received as indicated by the first data.

According to a seventh aspect, a data transmission apparatus is provided. The data transmission apparatus is a DeNB or a chip in the DeNB. Specifically, the data transmission apparatus includes a receiving unit and a processing unit.

Functions implemented by units and modules provided in this application are specifically as follows:

The receiving unit is configured to receive a first message sent by a first communications device, where the first message includes first data and a type identifier, the type identifier is used to indicate a type of the first data, and the type of the first data includes at least one of user plane data, a status report, a control plane message, and a radio resource control RRC message of a terminal. The processing unit is configured to: determine the type of the first data based on the type identifier in the first message received by the receiving unit, and process the first data based on the type of the first data.

Specifically, if the first data is the user plane data, the first message includes first indication information and a global sequence number SN of the user plane data, and the first indication information is used to indicate a data radio bearer DRB of the terminal to which the user plane data belongs. If the first data is the status report, the first data includes the global SN of the user plane data carried over the DRB of the terminal, the first data is used to indicate a transmission status of a DRB data packet of a second communications device, and the second communications device is the terminal, the intermediate forwarding node, or the serving node of the terminal. If the first data is the control plane message, the first message includes at least one of transport layer protocol layer information of a first interface, second indication information, an identifier of the terminal on the first interface, and third indication information, the first interface is a logical communications interface between the DeNB and the first communications device, the transport layer protocol layer information of the first interface includes at least one of an internet protocol IP address of the first communications device, an IP address of the DeNB, a port number of the first communications device, a port number of the DeNB, a stream control transmission protocol SCTP stream identifier, and an SCTP payload protocol identifier PPI, the second indication information is used to indicate the first communications device, and the third indication information is used to indicate the first interface; or the first message includes at least one of fourth indication information and an identifier of a cell to which the terminal belongs, and the fourth indication information is used to indicate the terminal.

Optionally, in a possible implementation of this application, the first data further includes fifth indication information, and the fifth indication information is used to indicate the DRB of the terminal.

Optionally, in another possible implementation of this application, if the second communications device is the intermediate forwarding node or the serving node of the terminal, the first data specifically includes the fifth indication information carried over each DRB in at least one DRB of the second communications device.

Optionally, in another possible implementation of this application, if the first data is the status report, the processing unit is specifically configured to: send, to the second communications device based on the first data, the DRB data packet of the second communications device that is not successfully received as indicated by the first data.

Optionally, in another possible implementation of this application, the receiving unit is further configured to receive, before the processing unit processes the first data based on the type of the first data, sixth indication information sent by the first communications device or a third communications device, where the sixth indication information is used to instruct to send, to the second communications device by using the third communications device, the DRB data packet of the second communications device that is not successfully received as indicated by the first data.

According to an eighth aspect, a data transmission apparatus is provided. The data transmission apparatus includes one or more processors, a memory, and a communications interface. The memory and the communications interface are coupled to the one or more processors. The data transmission apparatus communicates with another device through the communications interface. The memory is configured to store computer program code. The computer program code includes an instruction. When the one or more processors execute the instruction, the data transmission apparatus performs the data transmission method according to the sixth aspect and the possible implementations of the sixth aspect.

According to a ninth aspect, a computer-readable storage medium is further provided. The computer-readable storage medium stores an instruction. When the instruction is run on a data transmission apparatus, the data transmission apparatus is enabled to perform the data transmission method according to the sixth aspect and the possible implementations of the sixth aspect.

According to a tenth aspect, a computer program product including an instruction is further provided. When the computer program product is run on a data transmission apparatus, the data transmission apparatus is enabled to perform the data transmission method according to the sixth aspect and the possible implementations of the sixth aspect.

In this application, a name of the data transmission apparatus does not constitute any limitation to devices or functional modules. In an actual implementation, these devices or functional modules may have other names. The devices or functional modules fall within the scope of the claims and their equivalent technologies in this application, provided that functions of the devices or functional modules are similar to those described in this application.

In this application, for detailed descriptions of the seventh aspect, the eighth aspect, the ninth aspect, the tenth aspect, and the implementations of the seventh aspect, the eighth aspect, the ninth aspect, and the tenth aspect, refer to the detailed descriptions of the sixth aspect and the implementations of the sixth aspect; for beneficial effects of the seventh aspect, the eighth aspect, the ninth aspect, the tenth aspect, and the implementations of the seventh aspect, the eighth aspect, the ninth aspect, and the tenth aspect, refer to the analyses of the beneficial effects of the sixth aspect and the implementations of the sixth aspect. Details are not described herein again.

These aspects or other aspects in this application is more concise and comprehensible in the following descriptions.

BRIEF DESCRIPTION OF DRAWINGS

FIG. 3 is a schematic diagram of a protocol stack architecture of an LTE R10 relay according to an embodiment of this application;

FIG. 13A and FIG. 13B are a schematic diagram of a protocol stack architecture of each node in an end-to-end architecture between an RN and a DU according to an embodiment of this application;

FIG. 17 is a first schematic diagram of a format of a first message according to an embodiment of this application:

FIG. 18 is a second schematic diagram of a format of a first message according to an embodiment of this application;

FIG. 20 shows a format of a first message in a protocol stack shown in FIG. 14A and FIG. 14B according to an embodiment of this application;

FIG. 21 shows a format of a first message in a protocol stack shown in FIG. 15A and FIG. 15B according to an embodiment of this application;

DESCRIPTION OF EMBODIMENTS

To facilitate understanding of this application, related concepts in the embodiments of this application are described herein.

A DeNB system is a base station system that provides wireless access for a relay node, and is connected to the relay node through a wireless Un interface. The DeNB system may be an independent DeNB (DeNB), or may include a centralized unit (CU) and a distributed unit (DU).

The CU is mainly responsible for centralized radio resource and connection management control, and has a function of a wireless higher-layer protocol stack, such as a radio resource control (RRC) layer and a PDCP layer. The CU can also support movement of some core network functions to an access network, which is referred to as an edge computing network, and can meet a higher requirement, on a network latency, of an emerging service (such as a video, online shopping, or virtual/augmented reality) in a future communications network. The DU has a distributed user plane processing function, and mainly has a physical layer function and a layer 2 function that has a relatively high real-time requirement. Correspondingly, the CU has the RRC layer and the PDCP layer, and the DU has an RLC layer, a MAC layer, and a PHY layer.

The CU may be deployed in a centralized manner, and deployment of the DU depends on an actual network environment. For example, for a core urban area, or an area with relatively high traffic density, a relatively small inter-site distance, or a limited equipment room resource, for example, a college or a large performance venue, the DU may be deployed in a centralized manner. For an area with relatively sparse traffic, a relatively large inter-site distance, or the like, for example, an area such as a suburban county or a mountain area, DUs may be deployed in a distributed manner.

Figure 1:
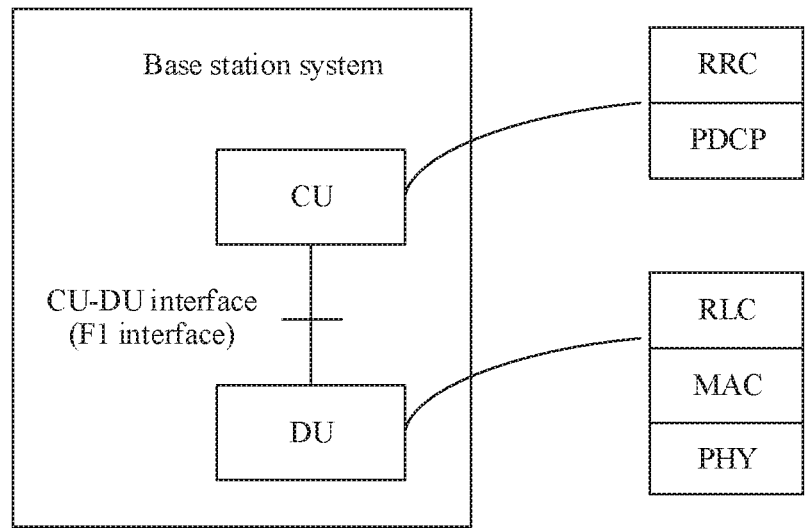
FIG. 1 is a schematic structural diagram of a base station system including a CU and a DU in a 5G system.

FIG. 1 is a schematic structural diagram of a base station system including a CU and a DU in a 5th generation communications technology (5G) system.

As shown in FIG. 1, the CU communicates with the DU through a CU-DU interface. The interface may be configured to transmit a control plane message between the CU and the DU, an RRC message of UE served by the base station system, data of UE served by the base station system, or the like. For ease of description, the CU-DU interface is referred to as an F1 interface, a control plane of the CU-DU interface is referred to as an F1-C, and a user plane of the CU-DU interface is referred to as an F1-U. A control plane message, between the CU and the DU, carried on the F1-C is referred to as an F1 application protocol (F1AP) message. The F1AP message may be divided into two parts: a common message (or Non UE Associated) and a UE-associated message. The common message may be used for management of the F1 interface, an update of a CU/DU configuration, cell management, and the like. The UE-associated message may be used to establish/manage/update/delete a UE context, and exchange a quality of service (QoS) parameter of UE, a protocol stack configuration of the UE, and the like. In addition, the UE-associated message may be further used to transmit an RRC message of the UE. To be specific, a PDCP protocol data unit (PDU) in an RRC message transmitted over a signaling radio bearer (SRB) 1/SRB 2/SRB 1S/SRB 2S/SRB 3 of the UE and an RRC PDU in an RRC message transmitted by an SRB 0 are included in the F1AP message for transmission as an RRC container. The F1-U transmits data of the UE. Specifically, the PDCP PDU of the UE is encapsulated in a general packet radio service tunneling protocol-user plane (GTP-U) data packet for transmission. Herein, a DRB of the UE may be identified by using a GTP TEID.

Un interface: A backhaul link of an RN is referred to as a Un interface. The Un interface includes a radio transmission interface for communication between the RN and a DeNB system, and a radio transmission interface for communication between RNs.

Uu interface: An access link used by an RN or a DeNB system to serve UE is referred to as a Uu interface.

Multi-hop relay network: A multi-relay network includes a terminal, a plurality of RNs, and a DeNB system. Data or signaling is forwarded by the plurality of RNs from a source (for example, the terminal or the DeNB system) to a sink (for example, the DeNB system or the terminal).

Serving node: A serving node is a node that is directly connected to a terminal through an air interface in a network and that provides the terminal with control plane message and user plane data transmission.

Intermediate forwarding node: An intermediate forwarding node is a node that provides relay transmission for another RN and a node that provides relay transmission for a terminal for which another RN provides a service.

Generally, a level of a quantity of hops may be used to describe a location of an RN in a network. A level of a quantity of hops of an RN that directly communicates with a DeNB system is 1, and a level of a quantity of hops of an RN that communicates with the DeNB system by using another RN is 2. The rest can be reduced by analogy.

Figure 2:
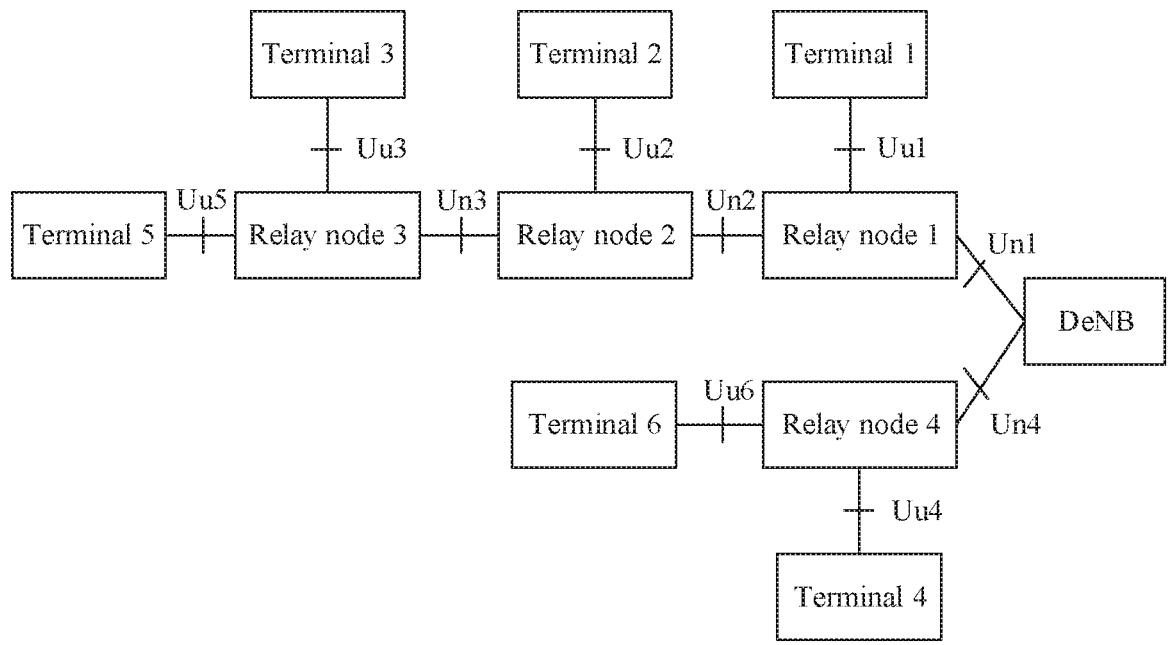
FIG. 2 is a schematic structural diagram of a multi-hop relay network according to an embodiment of this application.

For example, as shown in FIG. 2, a multi-hop relay network includes a DeNB, a relay node 1 to a relay node 4, and a terminal 1 to a terminal 6. The DeNB directly communicates with the relay node 1 and the relay node 4. An interface between the DeNB and the relay node 1 is a Un1 interface, and an interface between the DeNB and the relay node 4 is a Un4 interface. An interface between the relay node 1 and the relay node 2 is a Un2 interface, and an interface between the relay node 2 and the relay node 3 is a Un3 interface. The terminal 1 communicates with the relay node 1 through a Uu1 interface, the terminal 2 communicates with the relay node 2 through a Uu2 interface, the terminal 3 communicates with the relay node 3 through a Uu3 interface, the terminal 4 communicates with the relay node 4 through a Uu4 interface, the terminal 5 communicates with the relay node 1 through a Uu5 interface, and the terminal 6 communicates with the relay node 4 through a Uu6 interface.

Because the DeNB directly communicates with the relay node 1 and the relay node 4, levels of quantities of hops of the relay node 1 and the relay node 4 are 1. Because the relay node 2 communicates with the DeNB through the relay node 1, a level of a quantity of hops of the relay node 2 is 2. Similarly, a level of a quantity of hops of the relay node 5 is also 2. Because the relay node 3 communicates with the Donor node through the relay node 2 and the relay node 1, a level of a quantity of hops of the relay node 3 is 3. It can be learned with reference to the foregoing description that, the relay node 1 is an intermediate forwarding node of the relay node 2, the relay node 1 and the relay node 2 are intermediate forwarding nodes of the relay node 3, the relay node 1 and the relay node 2 are intermediate forwarding nodes of the terminal 3 and the terminal 5, and the like. The relay node 1 is a serving node of the terminal 1, the relay node 2 is a serving node of the terminal 2, the relay node 3 is a serving node of the terminal 3 and the terminal 5, and the relay node 4 is a serving node of the terminal 4 and the terminal 6.

For an intermediate forwarding node whose quantity of hops is 1, because the intermediate forwarding node directly communicates with the DeNB or a DU in the DeNB system, a previous-hop node of the intermediate forwarding node is the DeNB or the DU in the DeNB system. Correspondingly, the intermediate forwarding node may be referred to as a next-hop node of the DeNB or the DU in the DeNB system.

A relay technology is introduced in long term evolution release 10 (LTE R10). In a network including an RN, each node has a complete protocol stack. FIG. 3 shows a protocol stack architecture of each node in a network including an RN. The protocol stack architecture includes a control-plane protocol stack architecture and a user-plane protocol stack architecture.

A in FIG. 3 shows control-plane protocol stacks of UE, an RN, a DeNB, and a mobility management module (MME) (denoted as MME-UE in the figure) that provides a service for the UE. The control-plane protocol stack of the UE includes a non-access stratum (NAS), a radio resource control (RRC) layer, a PDCP layer, an RLC layer, a MAC layer, and a PHY layer from top to bottom. The control-plane protocol stack used by the RN to communicate with the UE includes an RRC layer, a PDCP layer, an RLC layer, a MAC layer, and a PHY layer from top to bottom. The control-plane protocol stack used by the RN to communicate with the DeNB includes an S1 application protocol (S1-AP) layer, a stream control transmission protocol (Stream Control Transmission Protocol, SCTP) layer, an internet protocol (IP) layer, a PDCP layer, an RLC layer, a MAC layer, and a PHY layer from top to bottom. The control-plane protocol stack used by the DeNB to communicate with the RN includes an S1-AP layer, an SCTP layer, an IP layer, a PDCP layer, an RLC layer, a MAC layer, and a PHY layer from top to bottom. The protocol stack used by the DeNB to communicate with the MME-UE includes an S1-AP layer, an SCTP layer, an IP layer, a data link layer (also referred to as an L2 layer), and a physical layer (also referred to as an L1 layer) from top to bottom. The protocol stacks of the MME-UE include a NAS, an S1-AP layer, an SCTP layer, an IP layer, an L2 layer, and an L1 layer from top to bottom. An R10 relay control plane has a complete protocol stack. An RRC message of the UE is terminated at the RN, and the RN provides a proxy of an S1/X2 message for the UE. An S1 interface is an interface between the DeNB and a core network (CN) control plane entity, and an X2 interface may be an interface between the DeNB and the RN (or between RNs).

B in FIG. 3 shows user-plane protocol stacks of UE, an RN, a DeNB, and a serving gateway (SGW)/public data network gateway (PGW) (denoted as SGW-UE/PGW-UE in the figure) that provides a service for the UE. The user-plane protocol stack of the UE includes an IP layer, a PDCP layer, an RLC layer, a MAC layer, and a PHY layer from top to bottom. The user-plane protocol stack used by the RN to communicate with the UE includes a PDCP layer, an RLC layer, a MAC layer, and a PHY layer from top to bottom. The user-plane protocol stack used by the RN to communicate with the DeNB includes a general packet radio service tunneling protocol user plane (GTP-U) layer, a user datagram protocol (UDP) layer, an IP layer, a PDCP layer, an RLC layer, a MAC layer, and a PHY layer from top to bottom. The user protocol stack used by the DeNB to communicate with the RN includes a GTP-U layer, a UDP layer, an IP layer, a PDCP layer, an RLC layer, a MAC layer, and a PHY layer from top to bottom. The user-plane protocol stack used by the DeNB to communicate with the SGW-UE/PGW-UE includes a GTP-U layer, a UDP layer, an IP layer, an L2 layer, and an L1 layer from top to bottom. The SGW-UE/PGW-UE includes an IP layer, a GTP-U layer, a UDP layer, an IP layer, an L2 layer, and an L1 layer from top to bottom. An R10 relay user plane also has a complete protocol stack, can provide an air interface data radio bearer (DRB) transmission service for the UE, and can aggregate data of a plurality of UEs and forward the data to the DeNB through a backhaul link.

With reference to FIG. 3, on a control plane, the RN generates a UE-associated S1 message for the UE. On a user plane, the RN encapsulates a GTP-format data packet of an S1 interface for the UE. The DeNB provides a proxy service for a message or data of the S1 interface, and sends the message or data to a corresponding core network node.

If a DRB on a same Un interface carries user plane data of a plurality of UEs, the UEs may be distinguished by using a GTP tunnel, for example, a TEID. If a DRB on a same Un interface carries control plane S1AP messages of a plurality of UEs, the UEs may be distinguished by using UE S1AP IDs in the S1AP messages. If a DRB carries both user plane data and S1AP messages, the user plane data and S1AP messages may be distinguished by using an IP address. In other words, different IP addresses are assigned to a GTP-U tunnel on a user plane and an SCTP connection on a control plane. After receiving an S1AP message sent by the RN, the DeNB replaces an IP address in the S1AP message with an IP address of the MME-UE, and replaces a UE S1AP ID of a Un interface in the message with an ID allocated by the DeNB/MME to the UE on an S1-MME. After receiving a GTP-U data packet sent by the RN, the DeNB replaces an IP address in the GTP-U data packet with an IP address of the SGW-UE, and replaces an uplink/downlink TEID in the GTP-U data packet with an uplink/downlink TEID allocated by the corresponding SGW/DeNB to an evolved packet system bearer (EPS-bearer) of the UE.

The RN has features such as wireless self-backhaul and flexible deployment, can reduce trenching and cabling costs when a conventional base station is placed on a wired backhaul link, and is applicable to initial-stage network deployment of a 5G network and an evolved communications system. However, an R10 RN can support only a relatively simple placement scenario, for example, a scenario in which there is a single hop and single DeNB, does not support a multi-hop relay network, and cannot meet a requirement for future network diversification.

To support a multi-hop relay network, provide better performance, and meet more diversified requirements of a future network, an RN that supports a multi-hop relay network needs to be researched.

In an R10 relay network, Uu and Un interfaces have complete control-plane and user-plane protocol stacks. On a user plane, uplink and downlink data packets of the UE need to be processed at the PDCP layer of the RN, increasing a processing latency. In a 5G network, the peer PDCP layer of the UE may be placed in the DeNB system, and the peer RLC layer of the UE may be placed in the RN. In this way, for data of the UE, the RN needs to complete processing only at the PHY layer, the MAC layer, and the RLC layer. In this case, a protocol architecture of the RN is referred to as an L2 architecture.

An architecture in which the peer RLC layer of the UE is placed in the RN and the peer PDCP layer of the UE is placed in the DeNB system is similar to the CU-DU architecture (referring to FIG. 1). The DeNB system may be considered as the CU, and the RN may be considered as the DU. Different from the CU-DU architecture, the DeNB system communicates with the RN through a radio interface. In addition, in the multi-hop relay network, the DeNB system directly communicates with a one-hop RN, and the DeNB system cannot directly communicate with an RN whose quantity of hops is greater than 1, and relaying by using an RN located between the DeNB system and the RN is required (it should be noted that, a location relationship herein is a location relationship in a communication connection, rather than a geographical location relationship). Therefore, a design of a protocol stack of a multi-hop L2 relay network may borrow ideas from a CU-DU interface protocol design. For example, signaling exchange between the RN and the DeNB system is performed based on an F1AP procedure and an F1AP information element, and user data is encapsulated and sent based on a GTP-U protocol stack architecture of an F1-U. It should be noted that the RN may also perform signaling exchange with the DeNB system by using an RRC message of the RN, to manage a context of the UE, transfer configuration information for the UE, and the like. However, an existing RRC function and procedure do not support UE-associated information exchange between the RN and the DeNB. Therefore, a new RRC procedure and a new RRC information element need to be defined, thereby increasing standardization work of implementing the multi-hop relay network. However, designing of an air interface between the RN and the DeNB system based on an F1 interface may introduce as few new signaling procedures and information elements as possible.

For the RN in the L2 architecture, when the air interface between the RN and the DeNB system is designed based on the F1 interface, data transmission may be completed based on a hop-by-hop architecture (Hop by Hop) or an end-to-end architecture. The end-to-end architecture includes an end-to-end architecture between the RN and the DU, and an end-to-end architecture between the RN and the CU.

In this embodiment of this application, a multi-hop relay network 1 is used as an example for description. The multi-hop relay network 1 includes a CU, a DU, an RN 1, an RN 2, and UE. An interface between the RN 1 and the DU is Un1, an interface between the RN 1 and the RN 2 is Un2, and an interface between the RN 2 and the UE is Uu.

It should be noted that the multi-hop relay network 1 is merely an example for describing the multi-hop relay network, and is not a limitation on the multi-hop relay network. The multi-hop relay network in this embodiment of this application may include a plurality of RNs.

Figure 4:
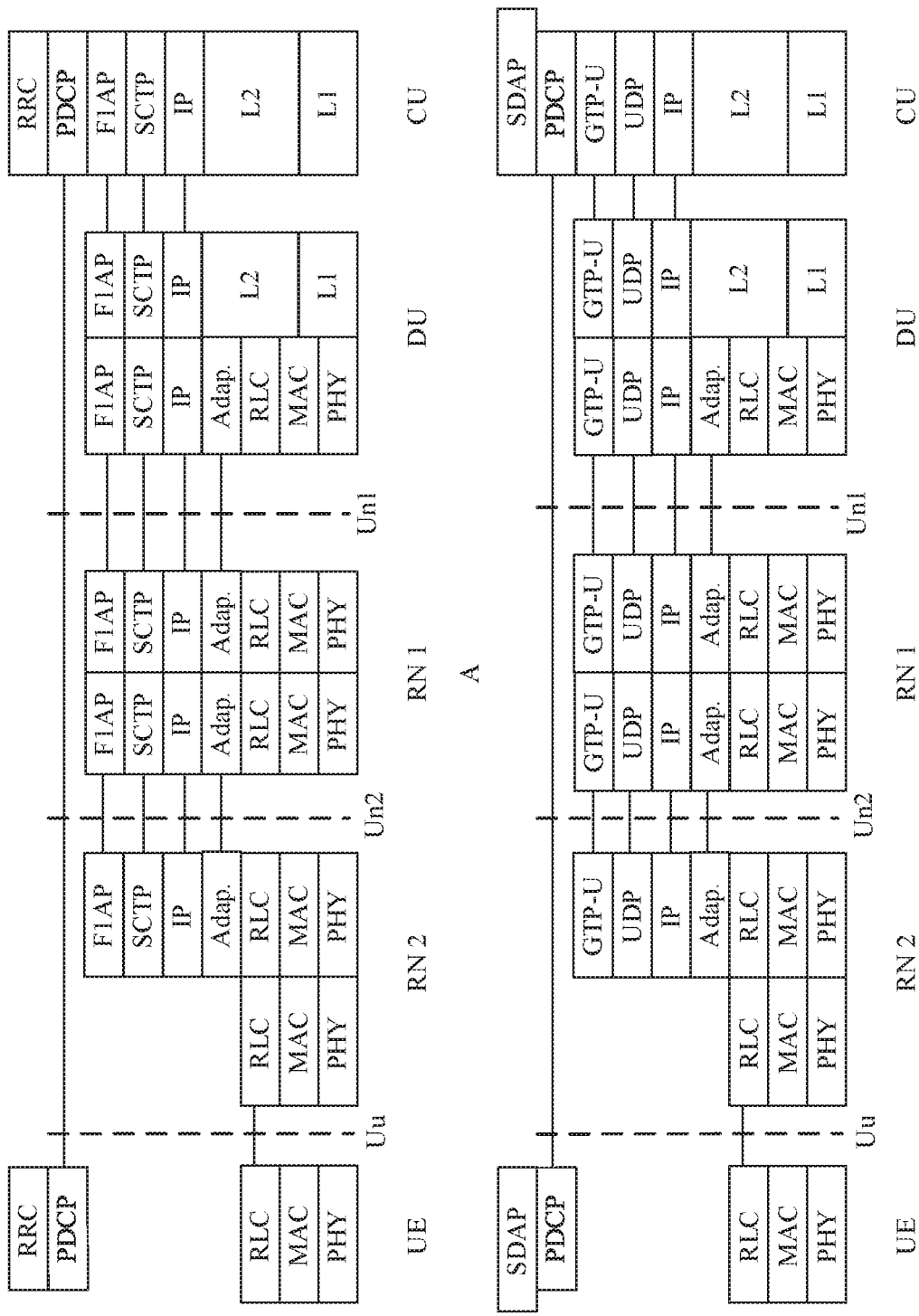
FIG. 4 is a first schematic diagram of a protocol stack architecture of each node in a hop-by-hop architecture according to an embodiment of this application.

For the hop-by-hop architecture, A in FIG. 4 shows control-plane protocol stacks of nodes in the multi-hop relay network 1 in the architecture, and B in FIG. 4 shows user-plane protocol stacks of nodes in the multi-hop relay network 1 in the architecture. Adap. in FIG. 4 indicates an adaptation layer. It can be learned with reference to FIG. 3 that, an F1 AP layer of the RN in FIG. 4 is similar to the S1-AP layer of the RN in FIG. 3, and F1AP layers of the DU and the CU in FIG. 4 are similar to the S1-AP layer of the base station in FIG. 3.

In A of FIG. 4, a peer RRC layer and PDCP layer of the UE are placed on the CU, and a peer RLC layer of the UE is placed on the RN 2.

In an uplink transmission process, the RN 2 generates a UE-associated F1 AP message, and sends the generated F1AP message to the RN 1 through the Un2 interface. Specially, for an uplink RRC message of the UE, after receiving the RRC message of the UE through the Uu interface, the RN 2 processes the RRC message to the RLC layer, carrying an RLC SDU or a PDCP PDU into the F1AP message, and sends the F1AP message to the RN 1. After receiving the F1AP message through the Un2 interface, the RN 1 processes the received F1AP message (for example, the RN 1 replaces a UE-associated UE F1AP ID and/or TEID in an F1AP message body with an identifier corresponding to the UE on the Un interface, and other content remains unchanged), sends the processed F1AP message to the DU through the Un interface. The DU processes the received F1AP message (for example, the DU replaces the UE-associated UE F1AP ID and/or TEID in the F1AP message body with an identifier corresponding to the UE on the F interface, and other content remains unchanged), and sends the processed F1 AP message to the CU through the F1 interface. The CU processes the received F1AP message (for example, the CU extracts an RRC message from the F1 AP message and performs RRC layer processing; optionally, before performing the RRC layer processing, the CU first performs PDCP processing).

In a downlink transmission process, the CU generates a UE-associated F1AP message, and sends the F1AP message to the DU through the F1 interface. The DU processes the received F1AP message (for example, the DU replaces a UE-associated UE F1AP ID and/or TEID, on the F1 interface, in the F1AP message body with the identifier corresponding to the UE on the Un1 interface, and other content remains unchanged), and sends the processed F1AP message to the RN 1 through the Un1 interface. Specially, for a downlink RRC message of the UE, after generating an RRC message (that is, an RRC PDU) (optionally, the RRC message is further processed at the PDCP layer), the CU adds the RRC message to the F1AP message, and sends the F1AP message to the DU. After receiving the F1AP message through the Un1 interface, the RN 1 processes the received F1AP message (for example, the RN 1 replaces a UE-associated UE F1AP ID and/or TEID, on Un1, in the F1 AP message body with an identifier corresponding to the UE on the Un2 interface, and other content remains unchanged), and sends the processed F1AP message to the RN 2 through the Un2 interface. The RN 2 processes the received F1AP message, for example, extracts a downlink RRC message from the F1AP message, performs processing of the peer RLC layer of the UE on the extracted downlink RRC message, and then sends the downlink RRC message to the UE through the Uu interface.

In B of FIG. 4, a peer PDCP layer of UE is placed on a CU, and a peer RLC layer of the UE is placed on an RN 2.

In an uplink transmission process, the RN 2 receives data, such as data carried over a UE DRB, of the UE through a Uu interface, processes the received data to the RLC layer, encapsulates an RLC SDU/PDCP PDCU into GTP-U data, and sends the GTP-U data to an RN 1 through a Un2 interface. The RN 1 processes the received GTP-U data (for example, the RN 1 replaces a TEID corresponding to the UE on the Un2 interface with a TEID corresponding to the UE on a Un1 interface, and content of data of the UE remains unchanged), and sends the processed GTP-U data to a DU through the Un1 interface. The DU processes the received GTP-U data (for example, the DU replaces a GTP TEID with a corresponding TEID on an F1 interface, and the content of the data of the UE remains unchanged), and sends the processed GTP-U data to the CU through the F1 interface. The CU processes the received GTP-U data (for example, the CU extracts the data of the UE, and the data of the UE may be a PDCP PDU/RLC SDU), and performs PDCP layer processing.

In a downlink transmission process, the CU encapsulates the data (for example, a DRB PDCP PDU) of the UE into GTP-U data, and sends the GTP-U data to the DU through the F1 interface. The DU processes the received GTP-U data (for example, the DU replaces a TEID corresponding to the UE on the F1 interface with a TEID corresponding to the UE on the Un1 interface, and the content of data of the UE remains unchanged), and sends the processed GTP-U data to the RN 1 through the Un interface. The RN 1 processes the received GTP-U data (for example, the RN 1 replaces a TEID corresponding to the UE on the Un1 interface with a TEID corresponding to the UE on the Un2 interface, and the content of data of the UE remains unchanged), and sends the processed GTP-U data to the RN 2 through the Un2 interface. The RN 2 processes the received GTP-U data, for example, extracts a PDCP PDU/RLC SDU from the GTP-U data, performs processing of the peer RLC layer of the UE on the GTP-U data, and sends the GTP-U data to the UE through the Uu interface.

It can be learned that in protocol stacks (control-plane protocol stacks and user-plane protocol stacks) shown in FIG. 4, each node in a data transmission path can perceive information about each UE, maintain a context of the UE, and manage the UE and collect statistics on data of the UE, to ensure QoS of the UE. A UE identifier (for example, a UE F1AP ID/TEID) is maintained by each transmission channel. For example, a UE identifier on the Un2 interface is allocated by the RN 2 or the RN 1, a UE identifier on the Un1 interface is allocated by the RN 1 or the DU, and a UE identifier on the F1 interface is allocated by the DU or the CU. Therefore, an intermediate forwarding node on two transmission channels needs to replace identifiers of UEs on the two transmission channels (optionally, the intermediate forwarding node determines/maintains a mapping relationship between the identifiers of the UEs on two transmission channels). However, on each node on a transmission path, an F1AP message/GTP-U data needs to be parsed and encapsulated, thereby reducing a forwarding speed of UE signaling/data.

Figure 5:
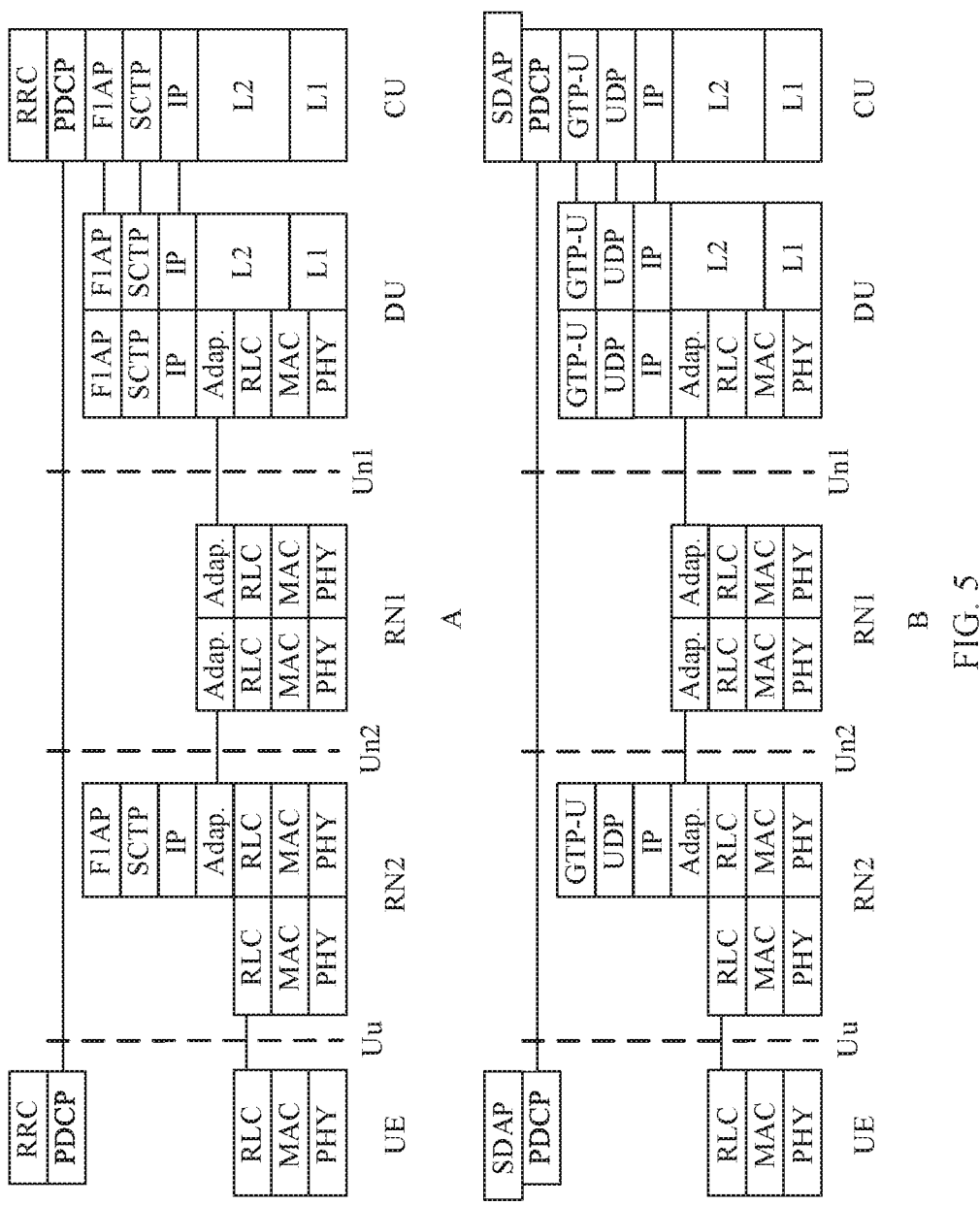
FIG. 5 is a first schematic diagram of a protocol stack architecture of each node in an end-to-end architecture between an RN and a DU according to an embodiment of this application.

For an end-to-end architecture between an RN and a DU, A in FIG. 5 shows control-plane protocol stacks of nodes in a multi-hop relay network 1 in the architecture, and B in FIG. 5 shows user-plane protocol stacks of nodes in the multi-hop relay network 1 in the architecture.

Different from the protocol stacks shown in FIG. 4, in the protocol stacks shown in FIG. 5, after a node other than an RN 2, a DU, and a CU in a data transmission path receives data sent by a previous node/next node of the node, the node does not need to process/parse data at an F1AP protocol layer/GTP-U protocol layer, but directly forwards the data.

Figure 6:
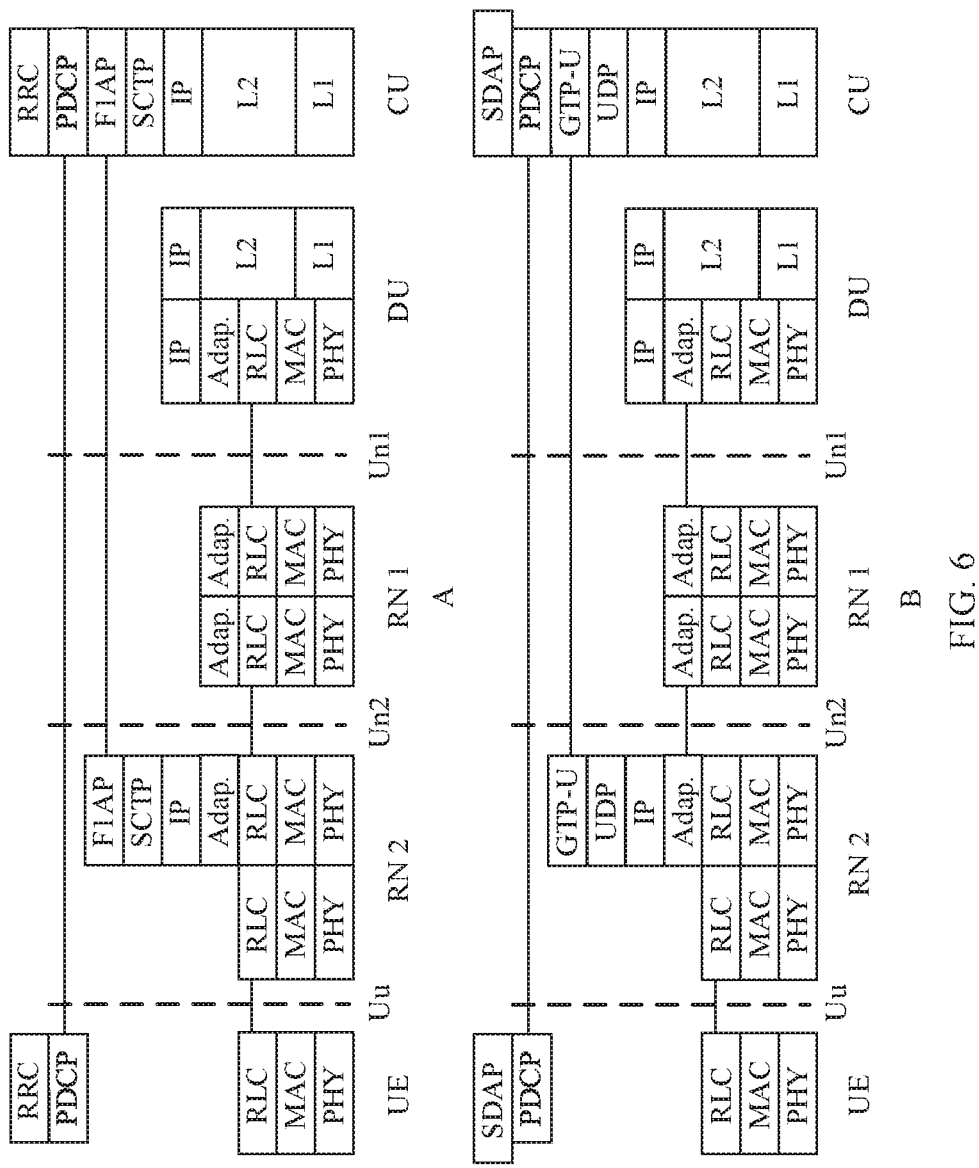
FIG. 6 is a schematic diagram of a protocol stack architecture of each node in an end-to-end architecture between an RN and a CU according to an embodiment of this application.

For an end-to-end architecture between an RN and a CU, A in FIG. 6 shows control-plane protocol stacks of nodes in a multi-hop relay network 1 in the architecture, and B in FIG. 6 shows user-plane protocol stacks of nodes in the multi-hop relay network 1 in the architecture.

Different from the protocol stacks shown in FIG. 4 and FIG. 5, in the protocol stacks shown in FIG. 6, after a node other than an RN 2 and a CU in a data transmission path receives data sent by a previous node/next node of the node, the node does not need to process/parse data at an F1AP protocol layer/GTP-U protocol layer, but directly forwards the data.

It can be learned that, compared with the protocol stacks shown in FIG. 4, in the protocol stacks (control-plane protocol stacks and user-plane protocol stacks) shown in FIG. 5 and FIG. 6, some/all intermediate forwarding nodes do not need to process/parse data received by the intermediate forwarding nodes, thereby improving forwarding efficiency. However, in the protocol stacks shown in FIG. 5 and FIG. 6, some/all intermediate forwarding nodes cannot perceive information about UEs served by other RNs, and cannot perform statistics collection on data of the UEs served by the other RNs.

In addition, in the protocol stacks shown in FIG. 4, FIG. 5, and FIG. 6, air interface encryption is not performed on an F1AP message transmitted over each air interface, and data security cannot be effectively ensured.

In addition to the foregoing problems of the low forwarding speed and inability to collect statistics on the data of the UE, currently, a method about how the RN 1 and the RN 2 identify or process data received by the RN 1 and the RN 2 have not been specified.

For the foregoing problem, an embodiment of this application provides a data transmission method. After obtaining first data, a first communications device (or a chip in a first communications device) sends, to a second communications device, a first message that includes the first data and a type identifier used to indicate a type of the first data. Herein, the first data may be at least one of user plane data (for example, a PDCP PDU of a terminal), a status report, a control plane message, and an RRC message of the terminal. It can be learned that for different types of data, in the data transmission method provided in this embodiment of this application, a unified message format is used for transmission. In this way, a time for each node in a multi-hop relay network to process a message in the format can be effectively reduced.

In addition, because the first message sent by the first communications device to the second communications device includes the type identifier, after obtaining the first message, the second communications device in this embodiment of this application may directly determine the type of the first data based on the type identifier, and further process the first message by using a method corresponding to the type of the first data, thereby further improving processing efficiency of each node in the multi-hop relay network.

The first communications device in this embodiment of this application may be an intermediate forwarding node, a serving node of the terminal, a DeNB, or a DU in a DeNB system. If the first communications device is the intermediate forwarding node, the second communications device is a previous-hop device or a next-hop device of the intermediate forwarding node. If the first communications device is the serving node of the terminal, the second communications device is a previous-hop device of the serving node of the terminal. If the first communications device is the DeNB or the DU in the DeNB system, the second communications device is a next-hop device of the first communications device.

The data transmission method provided in this embodiment of this application is applicable to a communications system. The communications system may be a 5G system, an LTE system, or another communications system including at least one RN. This is not specifically limited in this embodiment of this application.

For a schematic structural diagram of the communications system provided by this embodiment of this application, refer to FIG. 2. Both the DeNB and any relay node in FIG. 2 may be the first communications device.

Figure 7:
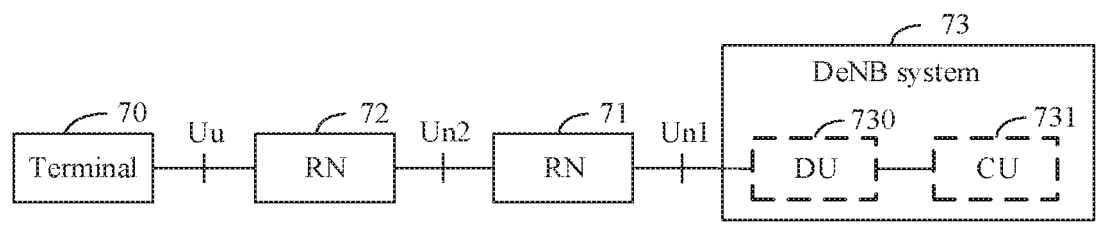
FIG. 7 is a schematic structural diagram of a communications system according to an embodiment of this application.

For ease of understanding, an example in which the communications system includes two RNs is used for description herein. Referring to FIG. 7, the communications system includes a terminal 70, an RN 71, an RN 72, and a DeNB system 73. The terminal 70 communicates with the RN 72 through a Uu interface, the RN 72 communicates with the RN 71 through a Un2 interface, and the RN 71 communicates with the DeNB system 73 through a Un1 interface.

It should be noted that FIG. 7 is merely an example of the communications system provided in this embodiment of this application, and does not specifically limit the communications system. In an actual application, both the RN 71 and the RN 72 may provide a service for a plurality of terminals, or the communications system may include at least one RN between the RN 71 and the RN 72.

The terminal 70 in this embodiment of this application may be a mobile phone (a mobile phone 800 shown in FIG. 8), a tablet computer, a personal computer (PC), a personal digital assistant (PDA), a smartwatch, a netbook, a wearable electronic device, or the like that can implement data transmission with the RN 72 on a control plane and a user plane. A specific form of the device is not specially limited in this embodiment of this application.

Figure 8:
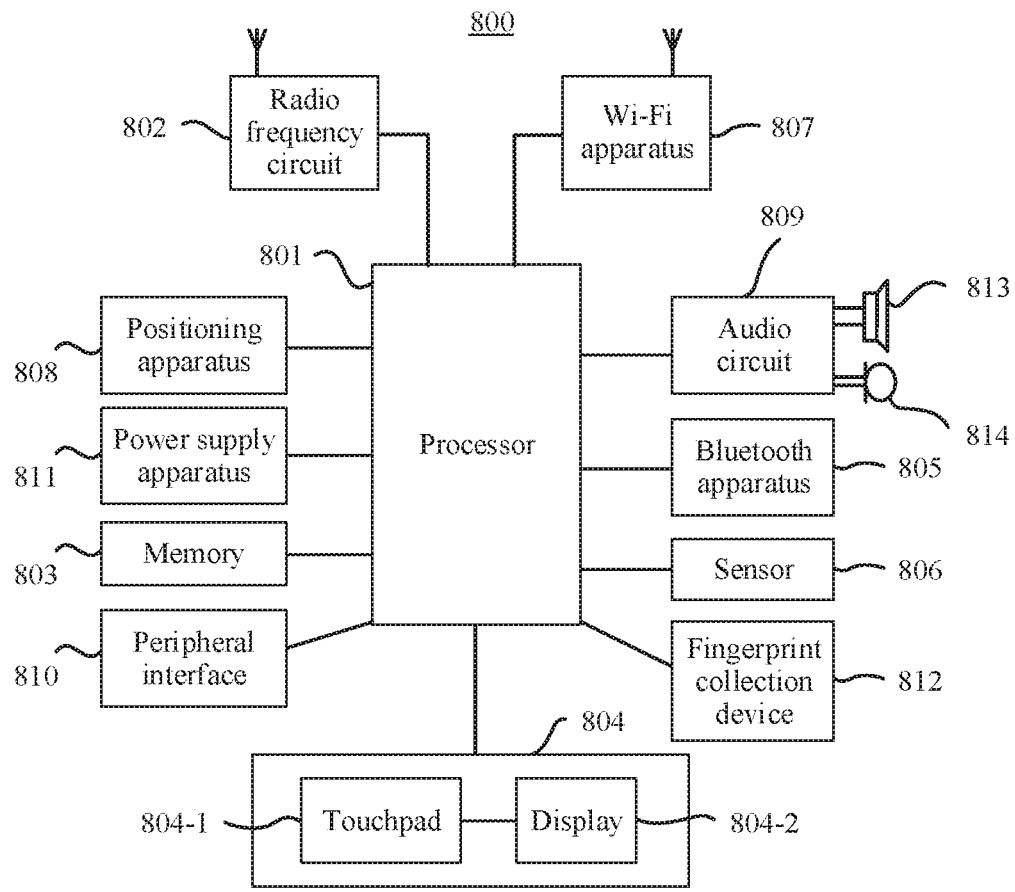
FIG. 8 is a schematic diagram of a hardware structure of a mobile phone according to an embodiment of this application.

As shown in FIG. 8, an example in which the terminal is the mobile phone 800 is used. The mobile phone 800 may specifically include components such as a processor 801, a radio frequency (RF) circuit 802, a memory 803, a touchscreen 804, a Bluetooth apparatus 805, one or more sensors 806, a wireless fidelity (Wi-Fi) apparatus 807, a positioning apparatus 808, an audio frequency circuit 809, a peripheral interface 810, and a power supply apparatus 811. These components may perform communication by using one or more communications buses or signal cables (not shown in FIG. 8). A person skilled in the art may understand that a hardware structure shown in FIG. 8 does not constitute a limitation on the mobile phone, and the mobile phone 800 may include more or fewer components than those shown in the figure, may combine some components, or may have different component arrangements.

The following describes all components of the mobile phone 800 in detail with reference to FIG. 8.

The processor 801 is a control center of the mobile phone 800. The processor 801 is connected to parts of the mobile phone 800 through various interfaces and cables, runs or executes an application program stored in the memory 803, and invokes data stored in the memory 803, to perform various functions of the mobile phone 800 and process data. In some embodiments, the processor 801 may include one or more processing units. In some of the embodiments of this application, the processor 801 may further include a fingerprint verification chip, configured to verify a collected fingerprint.

The radio frequency circuit 802 may be configured to send and receive a radio signal in an information receiving and sending process or a call process. Particularly, after receiving downlink data from a base station, the radio frequency circuit 802 may send the downlink data to the processor 801 for processing, and sends related uplink data to the base station. Generally, the radio frequency circuit includes but is not limited to an antenna, at least one amplifier, a transceiver, a coupler, a low noise amplifier, a duplexer, and the like. In addition, the radio frequency circuit 802 may further communicate with another device through wireless communication. The wireless communication may use any communication standard or protocol, including but not limited to a global system for mobile communications, a general packet radio service, code division multiple access, wideband code division multiple access, long term evolution, an email, a short message service, and the like.

The memory 803 is configured to store the application program and the data. The processor 801 performs various functions and data processing of the mobile phone 800 by running the application program and the data that are stored in the memory 803. The memory 803 mainly includes a program storage area and a data storage area. The program storage area may store an operating system, and an application program required by at least one function (for example, a sound playback function or an image processing function). The data storage area may store data (for example, audio data or a phone book) created when the mobile phone 800 is used. In addition, the memory 803 may include a high-speed random access memory (RAM), and may further include a non-volatile memory such as a magnetic disk storage device, a flash memory, or another volatile solid-state storage device. The memory 803 may store various operating systems such as an iOS operating system and an Android operating system. The memory 803 may be independent, and is connected to the processor 801 by using the communications bus; or the memory 803 may be integrated with the processor 801.

The touchscreen 804 may specifically include a touchpad 804-1 and a display 804-2.

The touchpad 804-1 can collect a touch event performed by a user of the mobile phone 800 on or near the mobile phone 800 (for example, an operation performed by the user on the touchpad 804-1 or near the touchpad 804-1 by using a finger or any suitable object such as a stylus), and send collected touch information to another component (such as the processor 801). The touch event of the user near the touch panel 804-1 may be referred to as floating touch. The floating touch may mean that the user does not need to directly touch the touch panel to select, move, or drag a target (for example, an icon), and instead, the user only needs to be near a device to implement a desired function. In addition, the touchpad 804-1 may be implemented in a plurality of types such as a resistive type, a capacitive type, an infrared type, and a surface acoustic wave type.

The display (also referred to as a display screen) 804-2 may be configured to display information entered by the user or information provided for the user, and menus of the mobile phone 800. The display 804-2 may be configured in a form such as a liquid crystal display or an organic light emitting diode. The touchpad 804-1 may cover the display 804-2. After detecting the touch event on or near the touchpad 804-1, the touchpad 804-1 transmits the touch event to the processor 801 to determine a type of the touch event. Then the processor 801 may provide a corresponding visual output on the display 804-2 based on the type of the touch event. Although the touchpad 804-1 and the display 804-2 are used as two independent components to implement input and output functions of the mobile phone 800 in FIG. 2, in some embodiments, the touchpad 804-1 and the display 804-2 may be integrated to implement the input and output functions of the mobile phone 800. It may be understood that the touchscreen 804 is formed by stacking a plurality of layers of materials. In this embodiment of this application, only the touchpad (layer) and the display screen (layer) are displayed, and another layer is not recorded in this embodiment of this application. In addition, the touchpad 804-1 may be disposed on a front side of the mobile phone 800 in a full panel form, and the display screen 804-2 may also be disposed on the front side of the mobile phone 800 in a full panel form. In this way, a bezel-less structure can be implemented on the front side of the mobile phone.

In addition, the mobile phone 800 may further have a fingerprint recognition function. For example, a fingerprint recognizer 812 may be disposed on a back side of the mobile phone 800 (for example, below a rear-facing camera), or a fingerprint recognizer 812 may be configured on the front side of the mobile phone 800 (for example, below the touchscreen 804). For another example, a fingerprint collection device 812 may be disposed on the touchscreen 804 to implement the fingerprint recognition function. In other words, the fingerprint collection device 812 and the touchscreen 804 may be integrated to implement the fingerprint recognition function of the mobile phone 800. In this case, the fingerprint collection device 812 is disposed on the touchscreen 804, and may be a part of the touchscreen 804, or may be disposed on the touchscreen 804 in another manner. In this embodiment of this application, a main component of the fingerprint collection device 812 is a fingerprint sensor. The fingerprint sensor may use any type of sensing technology, including but not limited to an optical, capacitive, piezoelectric, or ultrasonic sensing technology.

The mobile phone 800 may further include a Bluetooth apparatus 805, configured to implement data exchange between the mobile phone 800 and another short-range device (for example, a mobile phone or a smartwatch). In this embodiment of this application, the Bluetooth apparatus may be an integrated circuit, a Bluetooth chip, or the like.

The mobile phone 800 may further include at least one type of sensor 806, such as a light sensor, a motion sensor, and another sensor. Specifically, the light sensor may include an ambient light sensor and a proximity sensor. The ambient light sensor may adjust luminance of the display of the touchscreen 804 based on intensity of ambient light. The proximity sensor may power off the display when the mobile phone 800 is moved to an ear. As a motion sensor, an accelerometer sensor can detect a value of an acceleration in each direction (usually, three axes), can detect a value and a direction of gravity in a static state, and can be used in an application for identifying a mobile phone posture (such as switching between a landscape orientation and a portrait orientation, a related game, and magnetometer posture calibration), a function related to vibration identification (such as a pedometer and a strike), and the like. Other sensors such as a gyroscope, a barometer, a hygrometer, a thermometer, and an infrared sensor may also be disposed in the mobile phone 800. Details are not described herein.

The Wi-Fi apparatus 807 is configured to provide the mobile phone 800 with network access that complies with a Wi-Fi-related standard protocol. The mobile phone 800 may access a Wi-Fi access point by using the Wi-Fi apparatus 807, to help the user send and receive an email, browse a web page, access streaming media, and the like. The Wi-Fi apparatus 807 provides a wireless broadband internet access for the user. In some other embodiments, the Wi-Fi apparatus 807 may alternatively be used as a Wi-Fi wireless access point, and may provide Wi-Fi network access for another device.

The positioning apparatus 808 is configured to provide a geographic location for the mobile phone 800. It may be understood that the positioning apparatus 808 may be specifically a receiver of a positioning system such as a global positioning system (GPS), a BeiDou navigation satellite system, or a Russian GLONASS. After receiving the geographic location sent by the positioning system, the positioning apparatus 808 sends this information to the processor 801 for processing, or sends this information to the memory 803 for storage. In some other embodiments, the positioning apparatus 808 may alternatively be a receiver of an assisted global positioning system (AGPS). The AGPS system assists the positioning apparatus 808 as an assisted server, to implement ranging and positioning services. In this case, the assisted positioning server communicates with a device such as the positioning apparatus 808 (namely, the GPS receiver) of the mobile phone 800 by using a wireless communications network, to provide positioning assistance. In some other embodiments, the positioning apparatus 808 may be alternatively a positioning technology based on a Wi-Fi access point. Each Wi-Fi access point has a globally unique MAC address, and the device can scan and collect a broadcast signal of a surrounding Wi-Fi access point when Wi-Fi is enabled. Therefore, the device can obtain a MAC address broadcast by the Wi-Fi access point. The device sends such data (for example, the MAC address) that can identify the Wi-Fi access point to a location server by using a wireless communications network. The location server retrieves a geographic location of each Wi-Fi access point, calculates a geographic location of the device with reference to strength of the Wi-Fi broadcast signal, and sends the geographic location of the device to the positioning apparatus 808 of the device.

The audio circuit 809, a speaker 813, and a microphone 814 may provide an audio interface between the user and the mobile phone 800. The audio circuit 809 may convert received audio data into an electrical signal and transmit the electrical signal to the speaker 813. The speaker 813 converts the electrical signal into a sound signal for output. In addition, the microphone 814 converts a collected sound signal into an electrical signal. The audio circuit 809 receives the electrical signal, converts the electrical signal into audio data, and outputs the audio data to the RF circuit 802 to send the audio data to, for example, another mobile phone, or outputs the audio data to the memory 803 for further processing.

The peripheral interface 810 is configured to provide various interfaces for an external input/output device (for example, a keyboard, a mouse, an external display, an external memory, or a subscriber identification module card). For example, the peripheral interface 810 is connected to the mouse by using a universal serial bus (Universal Serial Bus, USB) interface, and the peripheral interface 810 is connected, by using a metal contact on a card slot of the subscriber identification module card, to the subscriber identification module (SIM) card provided by a telecommunications operator. The peripheral interface 810 may be configured to couple the external input/output peripheral device to the processor 801 and the memory 803.

In this embodiment of this application, the mobile phone 800 may communicate with another device in a device group through the peripheral interface 810. For example, the mobile phone 800 may receive, through the peripheral interface 810, display data sent by another device for display. This is not limited in this embodiment of this application.

The mobile phone 800 may further include the power supply apparatus 811 (for example, a battery and a power management chip) that supplies power to the components. The battery may be logically connected to the processor 801 by using the power management chip, so that functions such as charging, discharging, and power consumption management are implemented by using the power supply apparatus 811.

Although not shown in FIG. 8, the mobile phone 800 may further include a camera (a front-facing camera and/or a rear-facing camera), a flash, a micro projection apparatus, a near field communication (NFC) apparatus, and the like. Details are not described herein.

Figure 9:
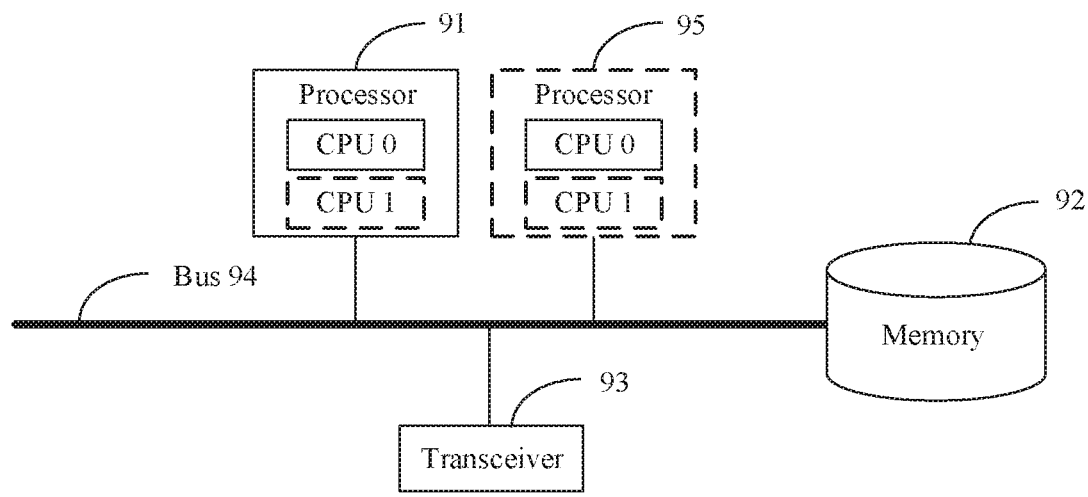
FIG. 9 is a schematic diagram of a hardware structure of an RN according to an embodiment of this application.

FIG. 9 is a schematic composition diagram of an RN according to an embodiment of this application. As shown in FIG. 9, the RN may include at least one processor 91, a memory 92, a transceiver 93, and a bus 94.

The following describes all components of the RN in detail with reference to FIG. 9.

The processor 91 is a control center of the RN, and may be a processor, or may be a collective name of a plurality of processing elements. For example, the processor 91 is a CPU, or an application-specific integrated circuit (ASIC), or one or more integrated circuits configured to implement this embodiment of this application, for example, one or more microprocessors (DSP) or one or more field programmable gate arrays (FPGA).

The processor 91 may implement various functions of the RN by running or executing a software program stored in the memory 92 and invoking data stored in the memory 92.

In a specific implementation, in an embodiment, the processor 91 may include one or more CPUs, such as a CPU 0 and a CPU 1 shown in FIG. 9.

In a specific implementation, in an embodiment, the RN may include a plurality of processors, for example, the processor 91 and a processor 95 shown in FIG. 9. Each of the processors may be a single-core processor (single-CPU) or may be a multi-core processor (multi-CPU). The processor herein may refer to one or more devices, circuits, and/or processing cores configured to process data (for example, a computer program instruction).

The memory 92 may be a read-only memory (ROM) or another type of static storage device that can store static information and an instruction, a random access memory (RAM) or another type of dynamic storage device that can store information and an instruction, or may be an electrically erasable programmable read-only memory (EE-PROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this is not limited thereto. The memory 92 may exist independently, and be connected to the processor 91 by using the bus 94. The memory 92 may be alternatively integrated with the processor 91.

The memory 92 is configured to store a software program that performs the solution of this application, and the processor 91 controls execution of the software program.

The transceiver 93 is configured to communicate with another device or a communications network. For example, the transceiver 93 is configured to communicate with the communications network, such as the Ethernet, a radio access network (RAN), or a wireless local area network (WLAN). The transceiver 93 may include all or a part of a baseband processor, and may further optionally include an RF processor. The RF processor is configured to send and receive an RF signal. The baseband processor is configured to process a baseband signal converted from the RF signal or a baseband signal to be converted into the RF signal.

The bus 94 may be an industry standard architecture (ISA) bus, a peripheral component interconnect (PCI) bus, an extended industry standard architecture (ESA) bus, or the like. The bus may be classified into an address bus, a data bus, a control bus, and the like. For ease of representation, only one thick line is used to represent the bus in FIG. 9, but this does not mean that there is only one bus or only one type of bus.

A device structure shown in FIG. 9 does not constitute a limitation on the RN. A quantity of components included may be greater or less than that shown in the figure, or some components are combined, or component arrangements are different.

The DeNB system 73 in this embodiment of this application may be an independent DeNB, and the DeNB may be a base station (BS) or a base station controller in wireless communication, or the like. Alternatively, the DeNB may include a DU 730 and a CU 731. Because the DeNB system 73 may include the DU 730 and the CU 731, the DU 730 and the CU 731 are represented by dashed-line boxes in FIG. 7.

Specifically, main functions of the DeNB system 73 include one or more of the following functions: radio resource management, IP header compression and user data stream encryption, MME selection when a terminal is attached, routing of user plane data to an SGW, paging message organization and sending, broadcast message organization and sending, measurement for mobility or scheduling, measurement report configuration, and the like.

When the DeNB system 73 is an independent DeNB, in systems using different radio access technologies, a name of the DeNB may be different. For example, in an LTE network (or referred to as a fourth generation mobile communications technology (4G) system), the name of the DeNB is an evolved NodeB (eNB or eNodeB). In a third generation mobile communications technology (3G) system, the name of the DeNB is NodeB. In a next-generation wireless communications system (for example, a 5G system), the name of the DeNB is gNB. With evolution of communications technologies, the name may change. In addition, in another possible case, the DeNB may be another apparatus that provides a wireless communication function for a terminal device.

Figure 10:
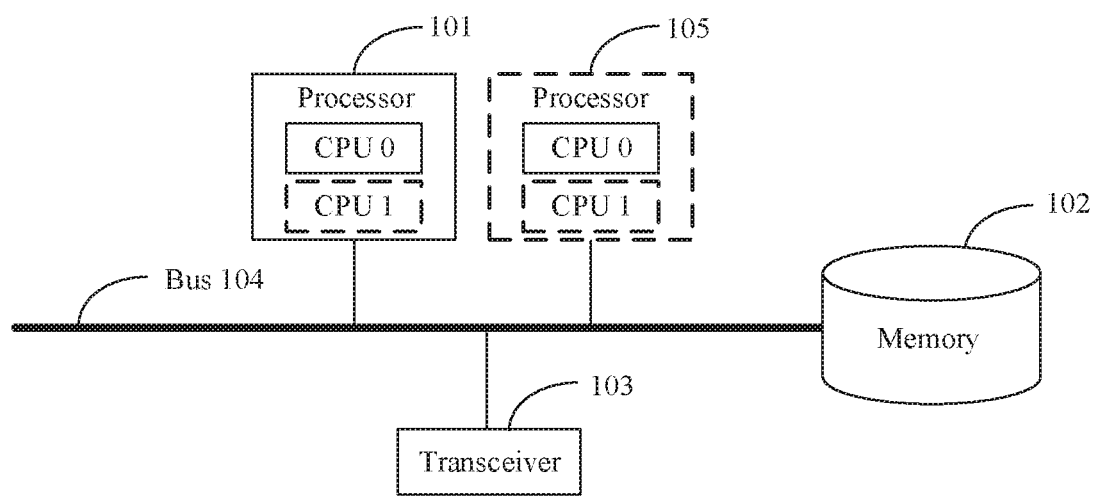
FIG. 10 is a schematic diagram of a hardware structure of a DeNB according to an embodiment of this application.

When the DeNB system 73 is an independent DeNB, FIG. 10 shows a hardware structure of the DeNB. As shown in FIG. 10, the DeNB may include at least one processor 101, a memory 102, a transceiver 103, and a bus 104.

In a specific implementation, in an embodiment, the processor 101 may include one or more CPUs, such as a CPU 0 and a CPU 1 in FIG. 10.

In a specific implementation, in an embodiment, the DeNB may include a plurality of processors, for example, the processor 101 and a processor 105 shown in FIG. 10.

For functions and other descriptions of the components shown in FIG. 10, refer to the foregoing example descriptions.

In addition, a device structure shown in FIG. 10 does not constitute a limitation on the DeNB. A quantity of components included may be greater or less than that shown in the figure, or some components are combined, or component arrangements are different.

For different types of data, in the data transmission method provided in this embodiment of this application, a unified message format is used for transmission. In this way, a time for each node in a multi-hop relay network to process a message in the format can be effectively reduced. Therefore, RNs and the DeNB system in this embodiment of this application all have a function of supporting generation/parsing of messages in the same format.

Therefore, in this embodiment of this application, an independent protocol layer having a corresponding function is added to protocol stacks of the RNs and the DeNB system, or a corresponding function is added to an existing protocol layer (for example, an RLC layer or a PDCP layer), to support the function of generating/parsing the messages in the same format. If the DeNB system includes a DU and a CU, an independent protocol layer having a corresponding function is added to a protocol stack of the DU, or a corresponding function is added to an existing protocol layer (for example, an RLC layer).

For ease of description, in this embodiment of this application, an example in which independent protocol layers having corresponding functions are added to protocol stacks of the RNs and the DeNB system is used for description. The added protocol layer may be referred to as an integrated access and backhaul (IAB) function protocol layer, or may have another name. This is not specifically limited in this embodiment of this application.

For ease of description, the IAB function protocol layer is used as an example for description in this embodiment of this application.

Figure 11A:
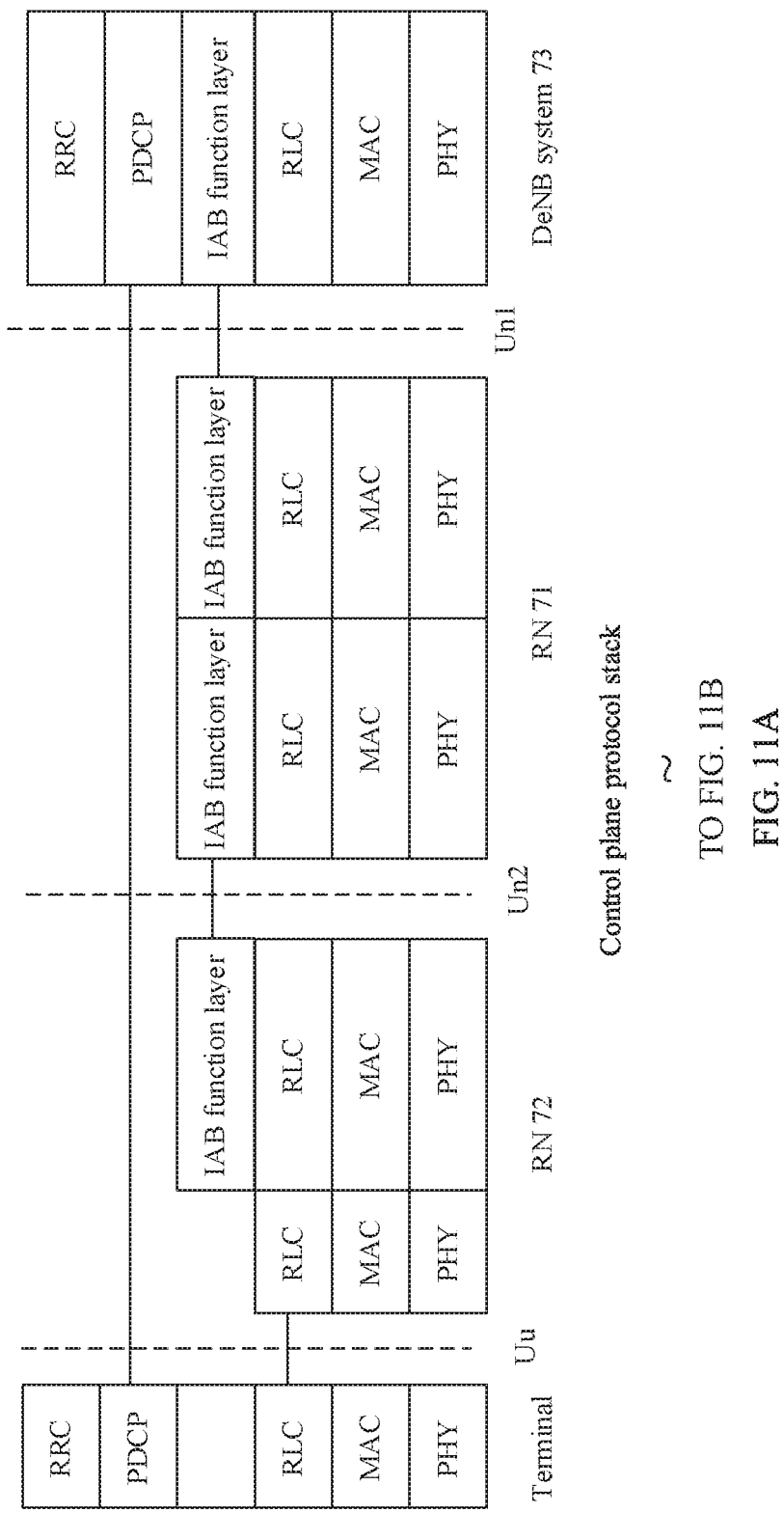
FIG. 11A and FIG. 11B are a schematic diagram of a protocol layer architecture of each node in a communications system according to an embodiment of this application.
Figure 11B:
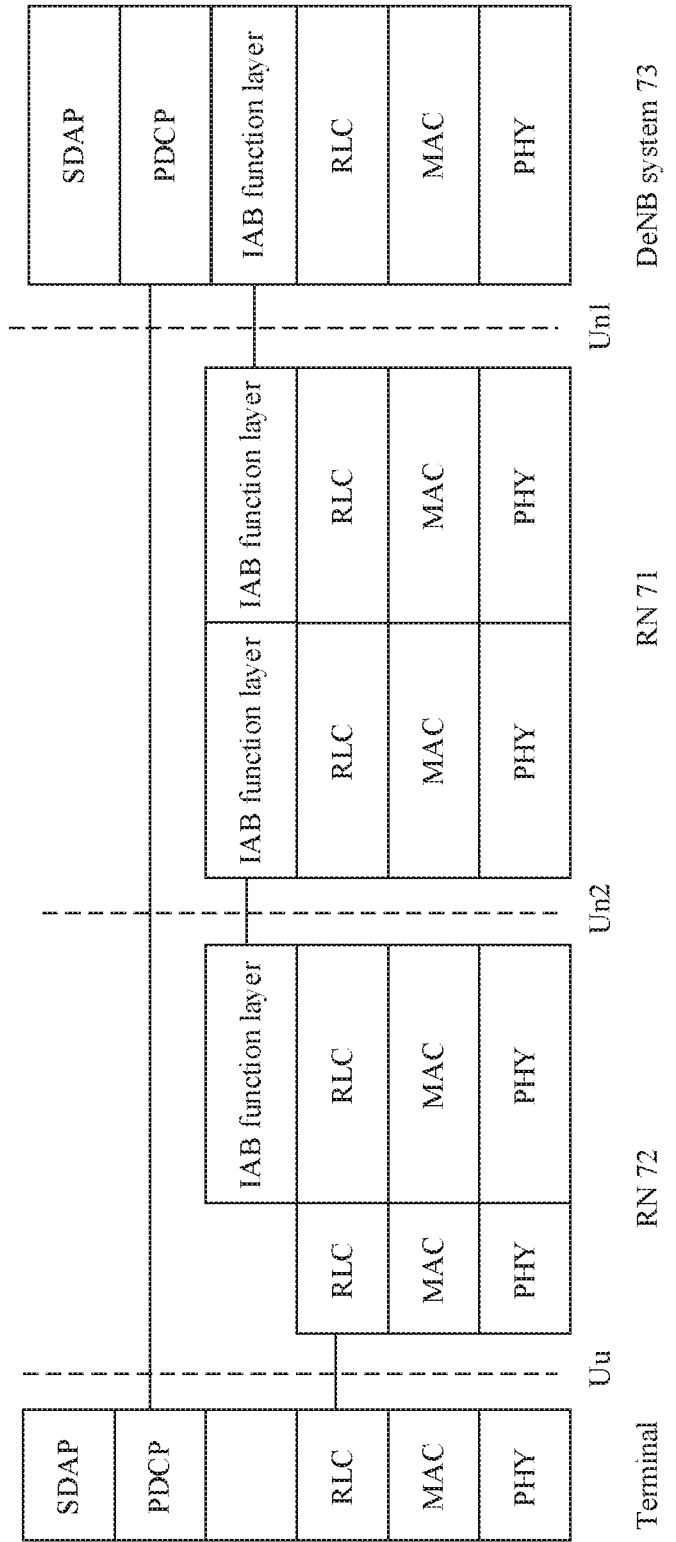
Figure 12A:
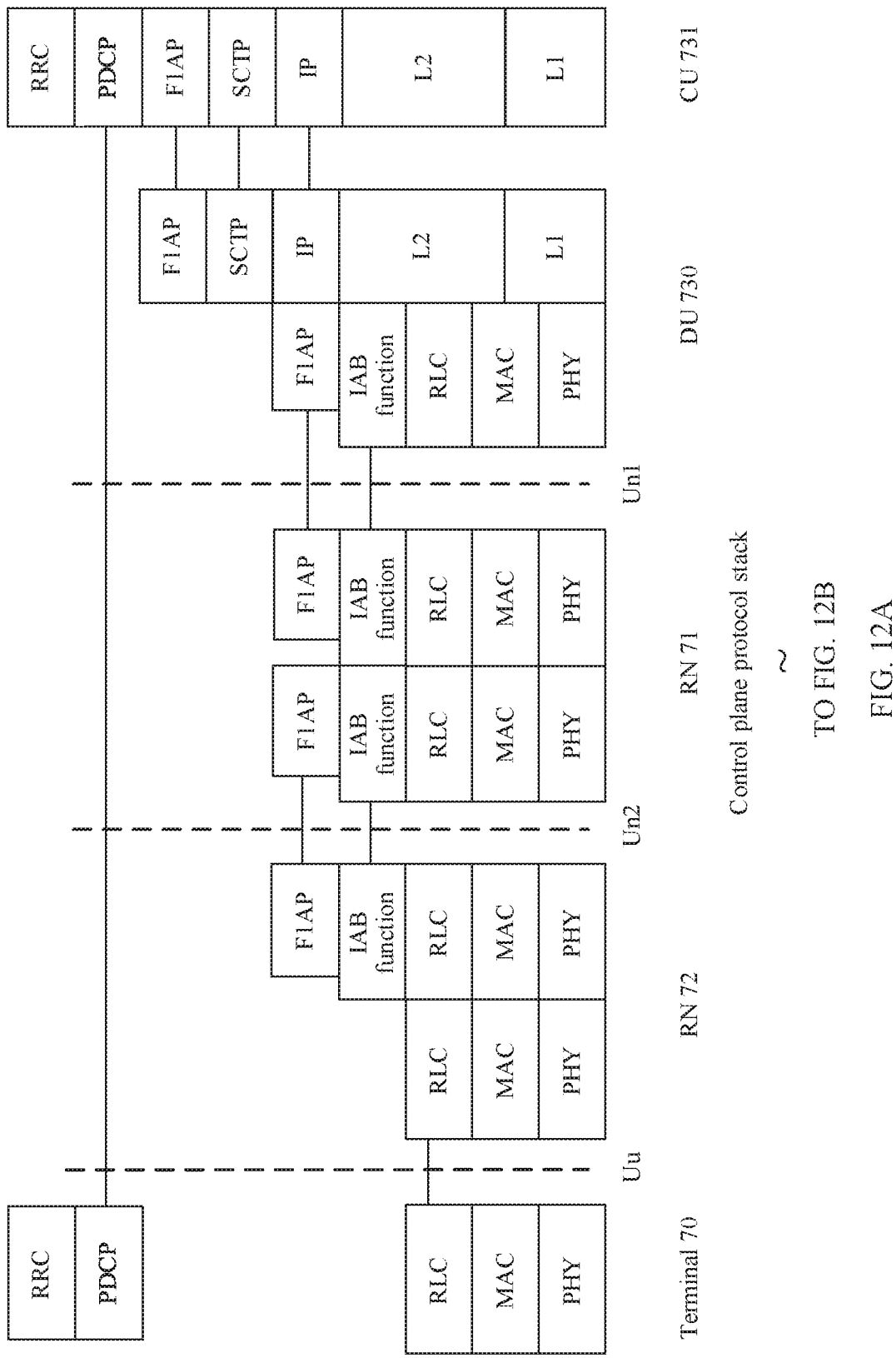
FIG. 12A and FIG. 12B are a second schematic diagram of a protocol stack architecture of each node in a hop-by-hop architecture according to an embodiment of this application.
Figure 12B:
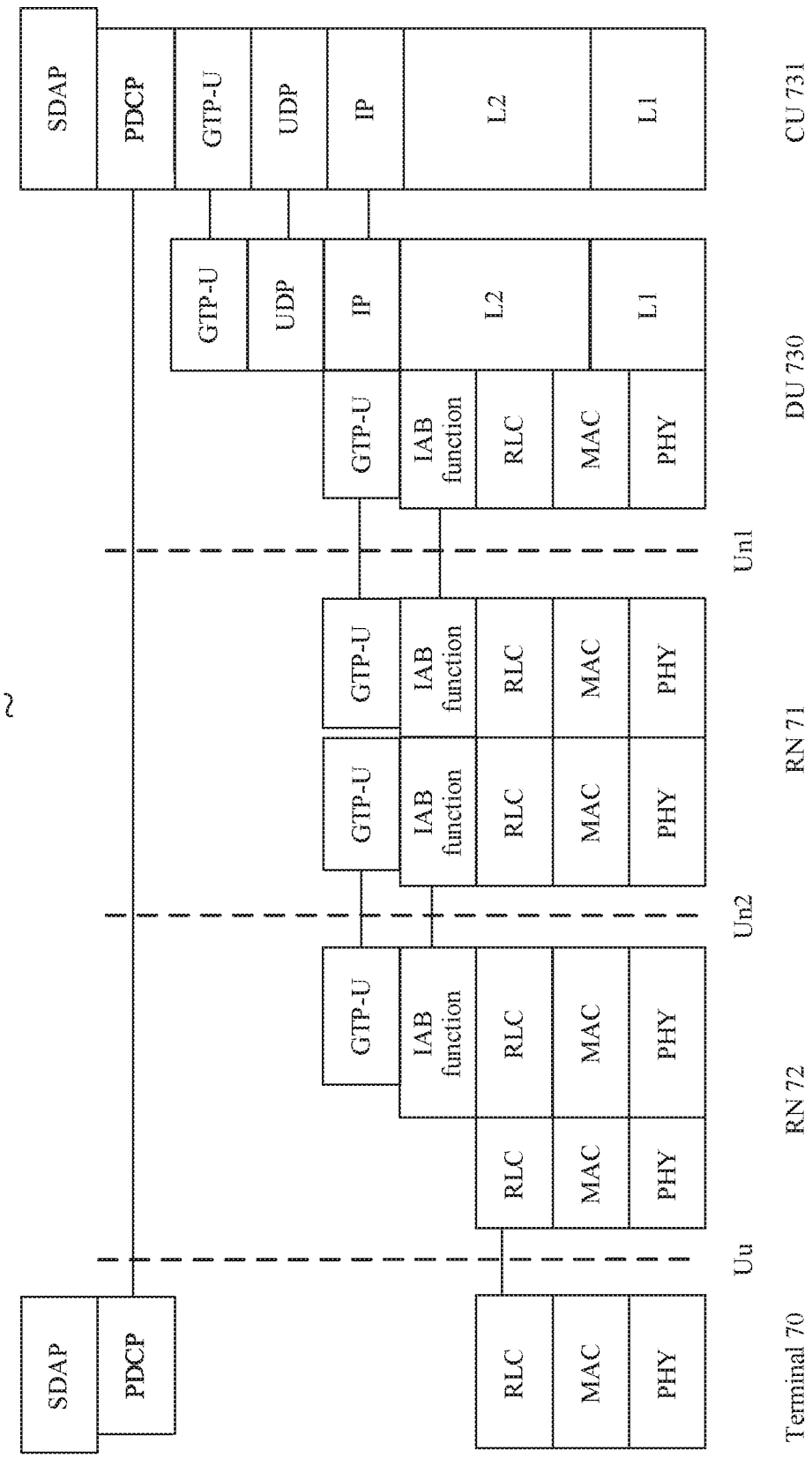
Figure 13A:
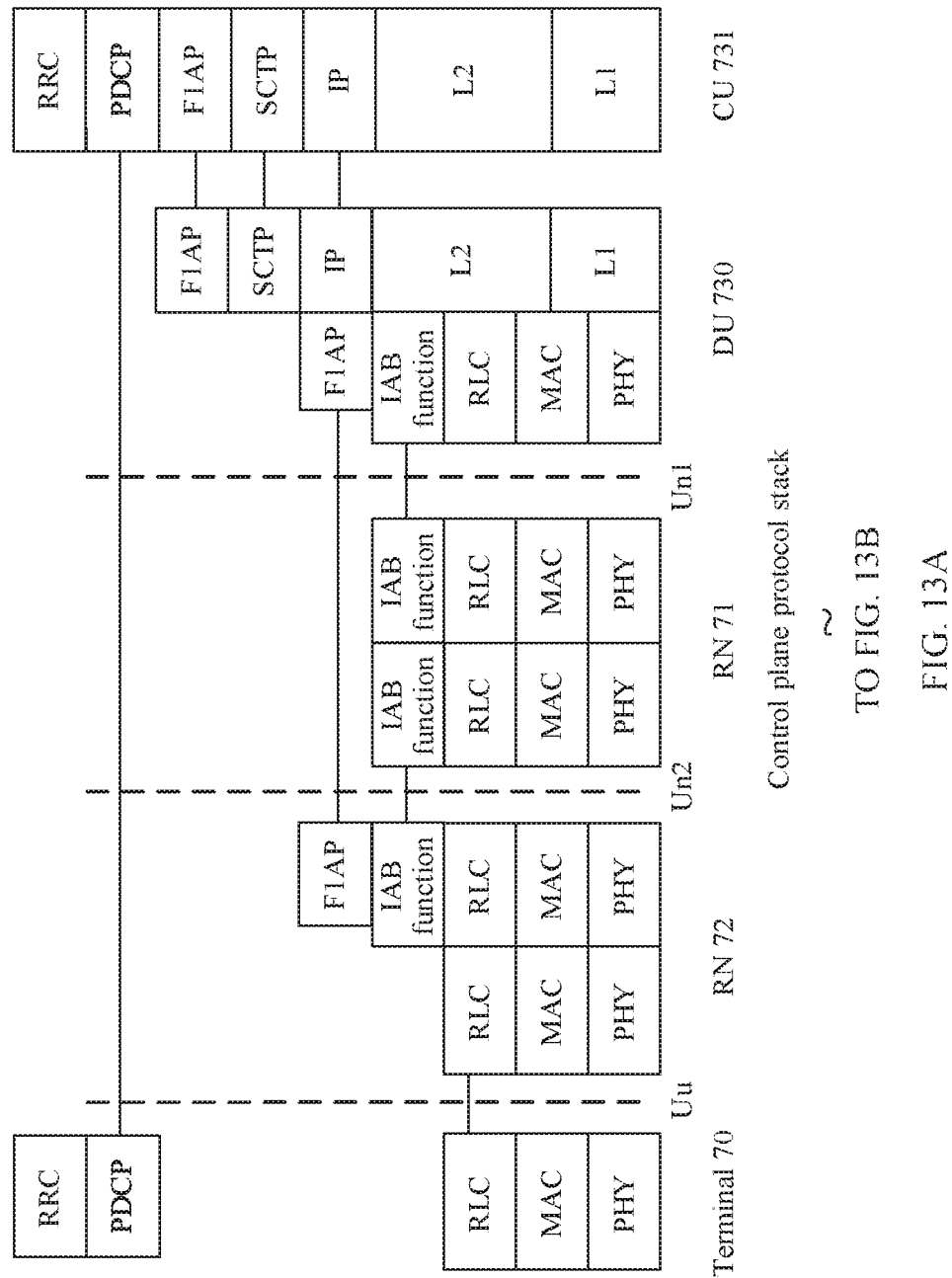

With reference to FIG. 7, if the DeNB system 73 is an independent DeNB, FIG. 11A and FIG. 11B show control-plane protocol stacks and user-plane protocol stacks of nodes according to an embodiment of this application. If the DeNB system 73 includes the DU 730 and the CU 731, FIG. 12A and FIG. 12B show control-plane protocol stacks and user-plane protocol stacks of nodes in a hop-by-hop architecture according to an embodiment of this application, and FIG. 13A and FIG. 13B show control-plane protocol stacks and user-plane protocol stacks of nodes in an end-to-end architecture from an RN 72 to the DU 730 according to an embodiment of this application.

Figure 14A:
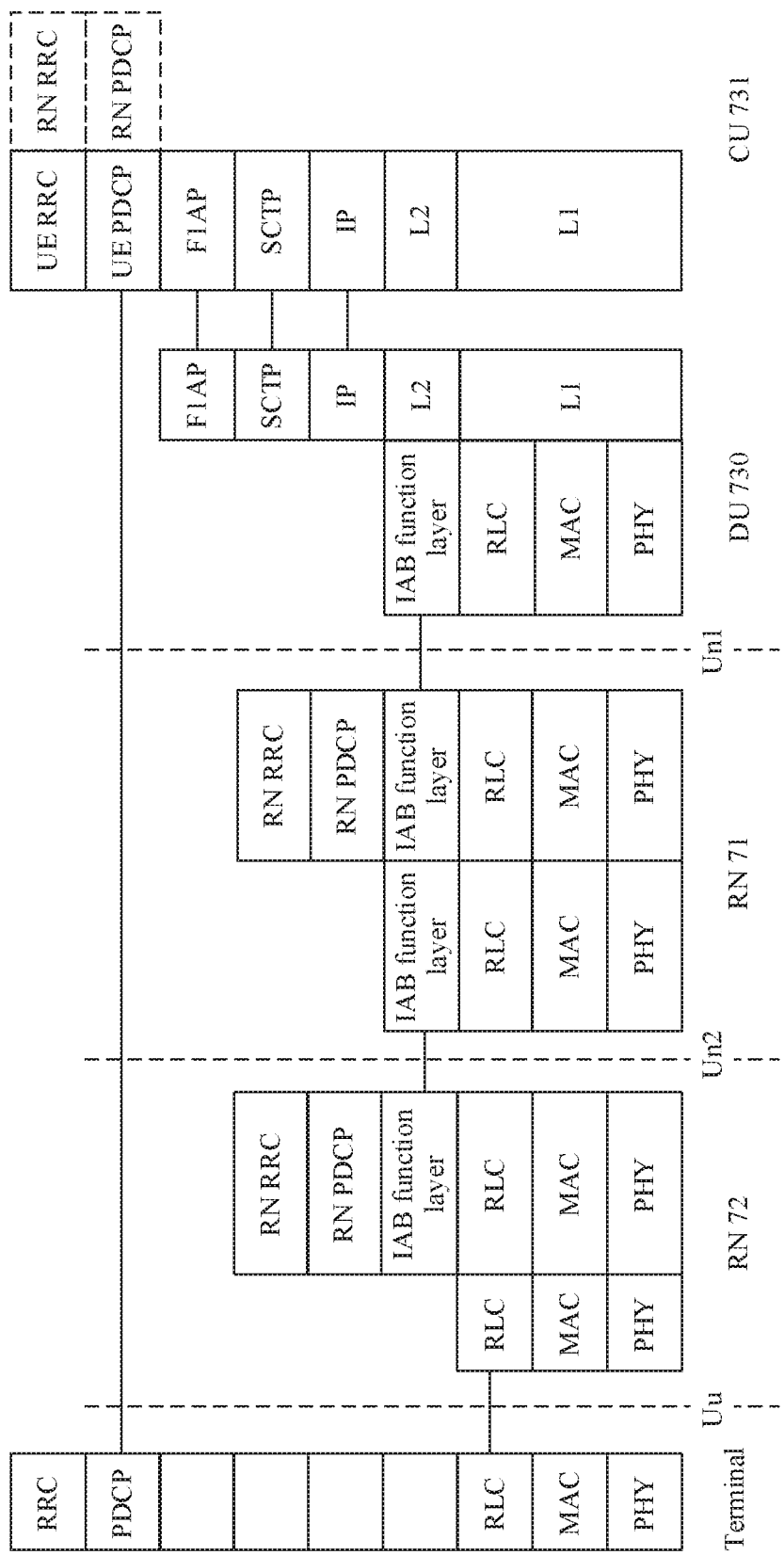
FIG. 14A and FIG. 14B are a third schematic diagram of a protocol stack architecture of each node in a hop-by-hop architecture according to an embodiment of this application.
Figure 14B:
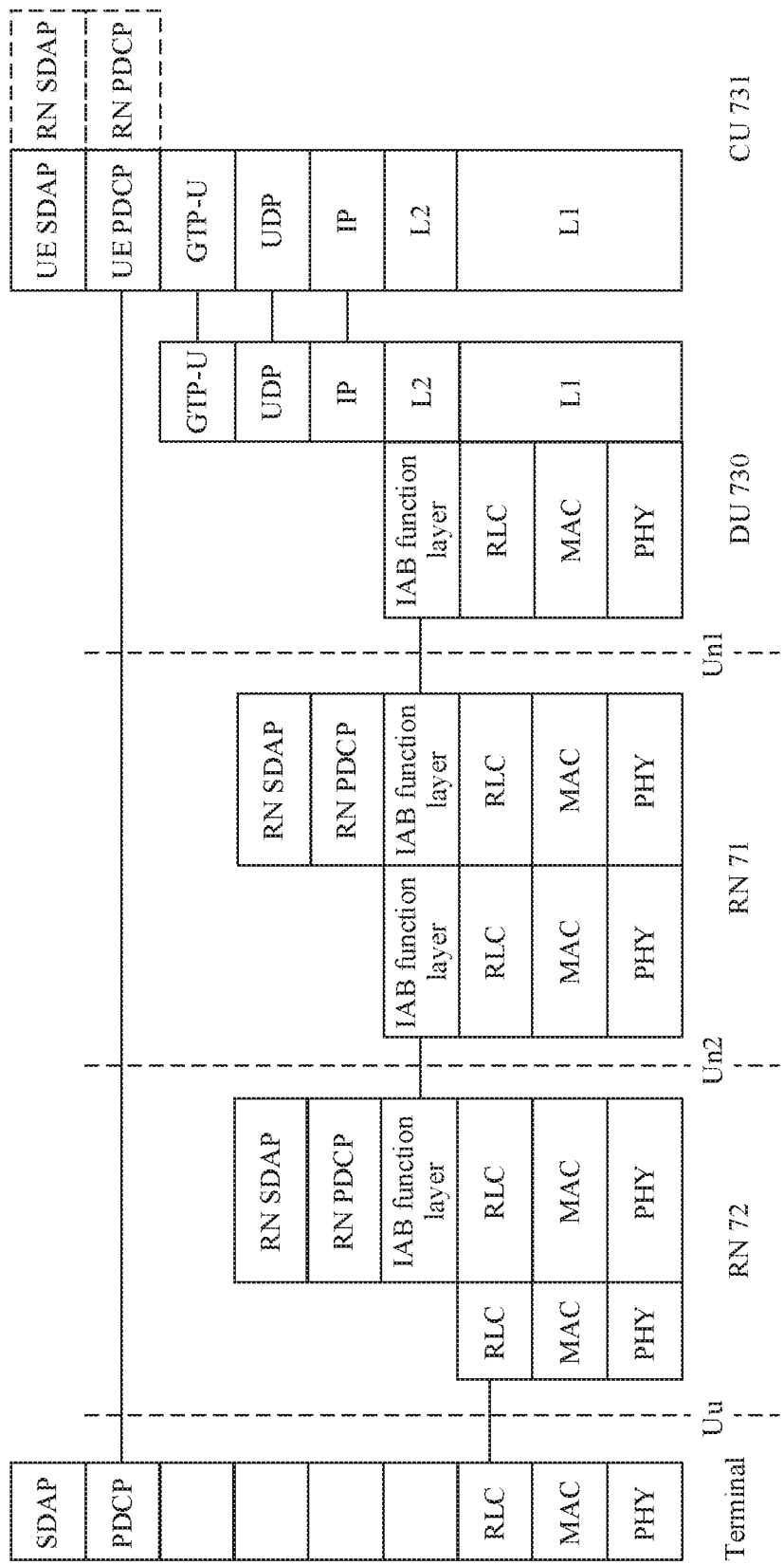

Further, if a PDCP layer of an RN in this embodiment of this application is placed on the CU 731, in other words, an RN PDCP function is not performed during Un interface transmission, the IAB function protocol layer and the PDCP layer are two independent protocol layers. In this scenario, FIG. 14A and FIG. 14B show control-plane protocol stacks and user-plane protocol stacks of nodes according to an embodiment of this application.

Figure 15A:
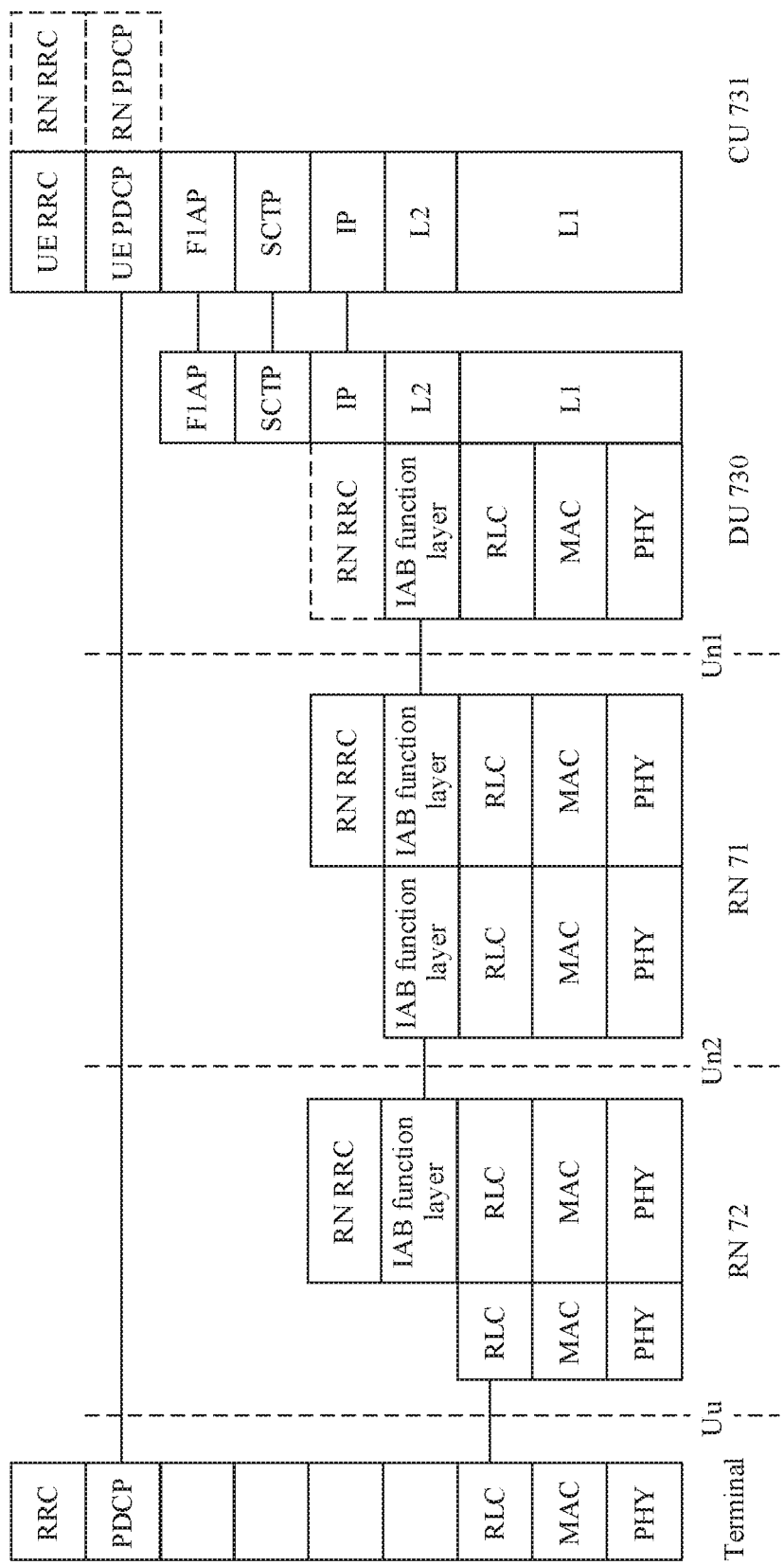
FIG. 15A and FIG. 15B are a fourth schematic diagram of a protocol stack architecture of each node in a hop-by-hop architecture according to an embodiment of this application.
Figure 15B:
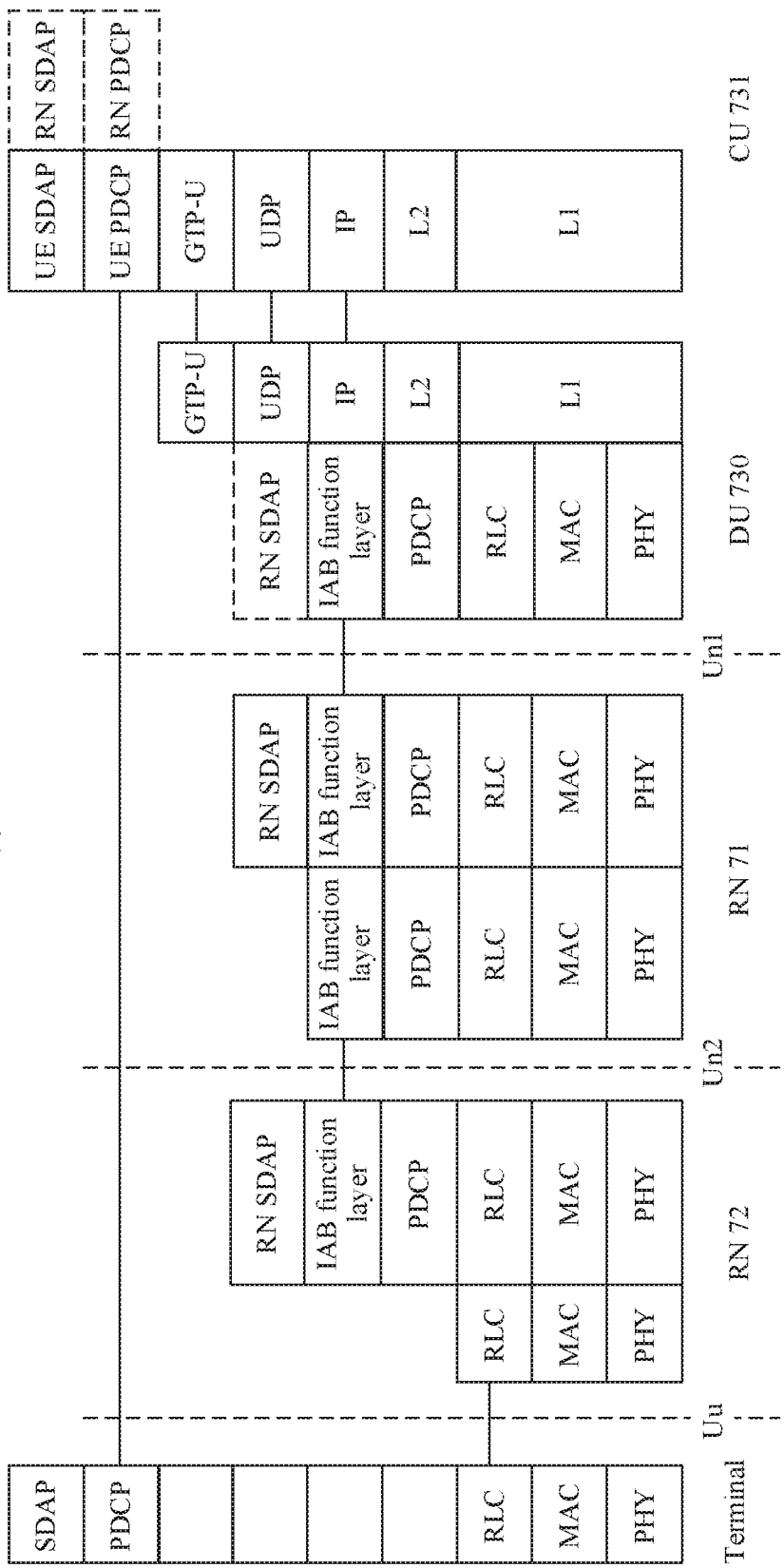

If a PDCP layer of an RN in this embodiment of this application is placed on a DU 730, in other words, a RN PDCP function is performed during Un interface transmission, an IAB function protocol layer may be placed in the PDCP layer. In this scenario, FIG. 15A and FIG. 15B show control-plane protocol stacks and user-plane protocol stacks of nodes according to an embodiment of this application.

It can be learned with reference to the foregoing description that an F1 interface provides a method for interaction between a CU and a DU in a base station system, and a signaling procedure is defined in an F1AP to support a function of the F1 interface. Correspondingly, in this embodiment of this application, a similar interface may be established between an RN and a DeNB system/previous-hop RN, and is used for interaction between the RN and the DeNB system/previous-hop RN. A name of the interface (which may be the F1 interface, or another interface that has a similar function of transferring UE-associated information to perform UE context management, UE configuration, and the like) is not limited. For ease of description, the interface is referred to as an F1-like interface in this embodiment of this application.

For IAB function protocol layers in the protocol stacks shown in FIG. 11A to FIG. 15B, different types of data may be transmitted by using a unified message format. Herein, the unified message format means including a type identifier and first data. For details of the unified message format, refer to subsequent descriptions. The type identifier is used to indicate a type of the first data. The type of the first data includes at least one of user plane data, a status report, a control plane message, and an RRC message of a terminal.

Functions of the IAB function protocol layer are described in detail.

1. Transmitting the User Plane Data

Correspondingly, the first data in this embodiment of this application is the user plane data.

Optionally, the user plane data includes a PDCP PDU/RLC PDU/H-RLC PDU belonging to a DRB of a terminal, and the user plane data of the terminal may be similar to a data packet in a GTP-U format. H-RLC is one of a plurality of parts (which may be referred to as subprotocol layers) into which that an existing RLC protocol layer is divided according to functions, and is responsible for completing functions such as an ARQ.

After obtaining the user plane data, the IAB function protocol layer may transmit the user plane data in one of the following two manners.

Manner 1: The user plane data (the PDCP PDU RLC PDU/H-RLC PDU belonging to the DRB of the terminal) is carried on a user plane of the F1-like interface for transmission.

Optionally, a user-plane protocol stack of the F1-like interface may include any one or any combination of a plurality of the following: a GTP-U layer, a UDP layer, and an IP layer.

Manner 2: The user plane data (the PDCP PDU RLC PDU/H-RLC PDU belonging to the DRB of the terminal) is directly carried in the IAB function protocol layer for transmission. For example, the user plane data is directly carried in a PDU of the IAB function protocol layer.

If the first data is the user plane data, the first message in this embodiment of this application further includes first indication information, and the first indication information is used to indicate a DRB of the terminal to which the user plane data belongs. For the manner 1, the first indication information may be user plane transport layer information, and the user plane transport layer information may include any one or any combination of a plurality of pieces of the following information: a TEID, a source IP address, a destination IP address, a source port number, and a destination port number. For the manner 2, the first message sent by the IAB function protocol layer needs to include an additional terminal identifier, DRB identifier information, and the like. To be simple, the first indication information may include any one or a combination of a plurality of pieces of the following information: a TEID, a source IP address, a destination IP address, a source port number, a destination port number, a terminal identifier, and a DRB identifier.

Optionally, the first message further includes a global sequence number (SN) of the user plane data. The global SN of the user plane data is classified into an SN of the user plane data in the DRB of the terminal and an SN of the user plane data in a DRB of the RN.

The SN of the user plane data in the DRB of the terminal is generated by the DeNB system and the terminal/a serving node of the terminal and is maintained by a DeNB, an intermediate forwarding node, and the serving node of the terminal. The intermediate forwarding node does not change the SN, and therefore the SN is referred to as a global SN.

For example, the SN of the user plane data in the DRB of the terminal may be a PDCP SN and/or an HFN of the terminal, or may be an RLC SN of the terminal. The two SNs are generated by the DeNB system (corresponding to downlink data) and the terminal (corresponding to uplink data), or may be GTP-U SNs or newly defined SNs, for example, SNs inside the IAB function protocol layer, referred to as IAB SNs of the terminal for short. The two SNs are generated by the DeNB system (corresponding to downlink data) and the serving node (corresponding to uplink data) of the terminal.

The SN of the user plane data in the DRB of the RN is an SN maintained between the RN and the DeNB system that are directly connected through an air interface or between the RNs, and referred to as an RN DRB SN for short. For example, the RN DRB SN may be an RN PDCP SN (if a Un interface protocol stack has an RN PDCP protocol layer, and the JAB function protocol layer is below the RN PDCP protocol layer, or the IAB function protocol layer and the RN PDCP protocol layer are disposed together, the RN PDCP SN may be identified in the IAB function protocol layer), or may be a newly defined SN, for example, an SN inside the IAB function protocol layer, referred to as an RN IAB SN for short.

Data (for example, a PDU session and a QoS flow (whose identifier is referred to as a QoS flow identifier, QFI)) of the terminal generally has a requirement on a QoS parameter. The QoS parameter is, for example, a GBR (guaranteed bit rate), a latency/an end-to-end latency, a jitter, a packet loss rate, a forwarding priority, and a voice MOS value. When the data of the terminal is carried on a radio access network (RAN) side, the DeNB system sends the QoS parameter to the RN and the intermediate node that serve the terminal. In addition, each RAN node may limit a rate of a non-GBR service of the terminal, so that the rate does not exceed an AMBR (aggregate maximum bit rate) value. Therefore, when the data of the terminal passes through the DeNB system on a RAN side and one or more RNs, a RAN node not only needs to learn of a corresponding QoS parameter requirement, but also needs to monitor data of the terminal, to ensure that a corresponding QoS requirement can be met. In this case, each RN needs to be capable of identifying data of different terminals (and identifying different DRBs and/or QFIs that belong to one terminal).

For the GBR, the DeNB system directly notifies each RN of the GBR, and each RN guarantees the GBR. Similarly, for an AMBR, each RN may independently ensure the AMBR. For the latency, the DeNB system needs to negotiate with each RN, or the DeNB system notifies each RN after determining the latency, so that each RN ensures a latency requirement of a Un/Uu interface associated with the RN.

2. Transmitting the Status Report

Correspondingly, the first data in this embodiment of this application is the status report. The status report is used to indicate a transmission status of a DRB data packet of the terminal, the intermediate forwarding node, and the serving node of the terminal. Herein, the transmission status of the DRB data packet refers to a transmission status and/or a packet loss status of the DRB data packet.

In the protocol stacks shown in FIG. 11A to FIG. 15B, a peer RLC layer of a terminal 70 is disposed on an RN 72, and a peer PDCP layer of the terminal 70 is disposed on a DeNB system 73. Therefore, an RLC status report and a PDCP status report in this embodiment of this application are different from existing status reports. Using downlink as an example, data of the terminal (for example, a DRB of the terminal is used as a granularity in an L2 architecture) is first carried on a Un interface (for example, a DRB of the RN) and transmitted to an RN serving the terminal. The RN adds the data of the terminal to the DRB of the terminal through the Uu interface, and sends the data of the terminal to the terminal. Therefore, an RLC SN of the terminal on the Uu interface and an RLC SN of the RN on the Un interface are independently numbered. Therefore, a status report fed back for the RLC SN can feed back only one segment of the Un interface or an RLC transmission status of the Uu interface. When the PDCP PDU of the terminal is carried and transmitted over the Un interface, the RN may fail to obtain the PDCP SN of the terminal. Therefore, the RN cannot feed back a PDCP status report based on the PDCP SN of the terminal. For example, in FIG. 4, FIG. 5, and FIG. 6, the PDCP PDU of the terminal is carried and transmitted over the Un interface after being processed by using a GTP-U/UDP/IP protocol stack. If the GTP-U data packet is encrypted at an IP layer, and an encryption manner is not perceived by an RN 1, the RN 1 cannot learn a PDCP SN of the terminal. Even if the PDCP SN can be obtained, GTP-U data packet also needs to be parsed, and additional processing overheads are introduced. In addition, when the PDCP PDU of the terminal is carried and transmitted over the Un interface, a PDCP entity of the RN DRB further processes the PDCP PDU. However, the PDCP entity needs to encrypt user plane data. If the encryption manner is negotiated between the DeNB system and the RN serving the terminal, and the intermediate forwarding node does not perceive the encryption manner, the intermediate forwarding node cannot parse out the PDCP SN of the terminal. In this case, an end-to-end SN between the DeNB system and the RN serving the terminal may be defined, and both the intermediate forwarding node and the RN serving the terminal may feed back the status report based on the SN. For ease of description, in this embodiment of this application, the end-to-end SN between the DeNB system and the RN serving the terminal is referred to as a global SN of the terminal, for example, an IAB SN.

It should be noted that the global SN may be the PDCP SN (the intermediate forwarding node may perceive the PDCP SN of the terminal), or may be the RLC SN. For example, when some RLC functions of the terminal are equivalent to those of the DeNB system, a corresponding SN is maintained between the DeNB system and the terminal, and the intermediate forwarding node does not change the SN. If the RLC function is an ARQ function, the global SN is an RLC SN used for the ARQ. It should be noted that the PDCP SN is an SN corresponding to a PDCP SDU/PDU. The RLC SN is an SN corresponding to an RLC SDU (or an RLC SDU segment).

In conclusion, if the first data is the status report, the status report includes the global SN of the user plane data carried on the DRB of the terminal.

Optionally, the first data further includes fifth indication information used to indicate the DRB of the terminal. In other words, the status report may be a status report of the DRB of the terminal, and is used to provide information about whether the user plane data carried on the DRB of the terminal is successfully sent/received. For the RN, the status report may be the status report of the DRB of the terminal served by the RN, or may be a status report of a DRB of a terminal served by another RN (in this case, the RN is not directly connected to the terminal through an air interface, but forwards data of the terminal). In other words, a transmission granularity of the status report is the DRB of the terminal.

Optionally, the fifth indication information may be at least one of a TEID, a source IP address, a destination IP address, a source port number, a destination port number, a terminal identifier, and a DRB identifier.

Optionally, the status report of the DRB of the terminal may be specific to one DRB of the terminal. In this case, the status report includes fifth indication information corresponding to the terminal. Alternatively, the status report transmitted at the IAB function protocol layer may be specific to a plurality of DRBs of the terminal. In this case, the status report includes a plurality of pieces of fifth indication information associated with the terminal. Alternatively, the status report transmitted at the IAB function protocol layer may be specific to all DRBs of the terminal. In this case, the status report includes sixth indication information used to indicate the terminal. For example, the sixth indication information may be any one or any combination of a plurality of pieces of the following information: a cell radio network temporary identifier C-RNTI, a cell identifier, a terminal context identifier, an F interface identifier of the terminal, an F1-like interface identifier of the terminal, a TEID, and a terminal identifier in another format. Optionally, when the status report transmitted at the IAB function protocol layer may be specific to all DRBs of the terminal, the status report further includes all fifth indication information associated with the terminal. If the status report does not include all fifth indication information associated with the terminal, the status report may include a plurality of status reports that are of DRBs of the terminal and that are arranged in a specific sequence. The sequence may be preset in a protocol, or may be arranged in descending order or ascending order of DRB identifiers.

Optionally, when the RN generates the status report of the DRB of the terminal served by the RN, the status report of the DRB of the terminal may be an RLC status report/PDCP status report of the terminal. The DRB status report of the terminal may be a combination of one or more RLC status reports/PDCP status reports of the terminal that are generated by the IAB function protocol layer.

Optionally, when the RN generates the status report of the DRB of the terminal served by the RN, or generates the status report of the DRB of the terminal served by the another RN, the status report of the DRB of the terminal further includes the global SN of the terminal. In this way, the DeNB system/intermediate forwarding node may determine the transmission status of the data packet of the terminal based on the global SN.

Specifically, the status report of the DRB of the terminal includes a status of a downlink data packet and/or a status of an uplink data packet. A status of a data packet may include any one or any combination of a plurality of pieces of the following content: a largest successfully sent/received global SN (Highest Successfully Delivered Sequence Number), a largest global SN and a smallest global SN of a transmission hole (referring to one data packet or a plurality of data packets with consecutive SNs that is/are not successfully sent/received), a transmission hole sequence number, a largest consecutively successfully sent/received global SN, a largest global SN and a smallest global SN of a successfully transmitted data chunk, a sequence number of a successfully transmitted data chunk, a successfully sent global SN, a lost global SN, a largest sent/received global SN, a terminal identifier, a DRB identifier, and a TEID. It should be noted that specific information included in the status report of the DRB of the terminal is not limited to the SN, and for example, may further include a global SN of a first lost packet and a global SN of a next downlink packet to be sent. However, all the SNs may be inferred by using information included in the DRB status report of the terminal. For example, a global SN of a first lost packet is a smallest global SN in a transmission hole, and a global SN of a next downlink packet to be sent is a largest downlink global SN plus 1. Therefore, possible cases are not listed one by one herein.

In addition, the status report of the DRB of the terminal may alternatively be in a form of a bitmap, and each bit corresponds to a status of whether a data packet corresponding to an SN is lost.

When the intermediate forwarding node generates a status report of a link between the intermediate forwarding node and a next-hop node, or when the serving node of the terminal generates a status report on a transmission status of a Uu interface of the terminal, the largest successfully sent global SN is an SN corresponding to a packet with a largest SN in data packets that are of a DRB of the terminal and that are successfully received by the next-hop node/a terminal served by the next-hop node when data of the DRB of the terminal is transmitted between a node that generates the status report and the next-hop node/the terminal served by the node. The largest consecutively successfully sent global SN is an SN corresponding to a packet with a largest SN in data packets with consecutive SNs that are of a DRB of the terminal and that are successfully received by the next-hop node/a terminal served by the next-hop node when data of the DRB of the terminal is transmitted between a node that generates the status report and the next-hop node/the terminal served by the node.

The transmission hole sequence number in this embodiment of this application is a sequence number corresponding to each transmission hole when there may be more than one transmission hole and different transmission holes need to be indicated. Optionally, successful sending means that a transmit end receives an acknowledge (ACK) feedback from a receive end. Optionally, the lost data packet means that a non-acknowledge (NACK) feedback is received from a peer end, or no ACK feedback is received from a peer end. Optionally, successful receiving means that a receive end successfully receives data sent by a transmit end.

The successfully transmitted data chunk is one successfully received data packet or a plurality of successfully received data packets with consecutive SNs in data packets with global SNs that are greater than the largest consecutively successfully sent global SN.

The sequence number of the successfully transmitted data chunk is a sequence number corresponding to each successfully transmitted data chunk when there may be more than one successfully transmitted data chunk and different successfully transmitted data chunks need to be indicated.

Optionally, the status report may be a status report of a DRB of an RN, and is used to provide information about whether the user plane data carried on the DRB of the RN is correctly sent/received. For the RN, the status report may be a status report of a DRB of a Un interface of the RN, or may be a status report generated by an RN/DU for a DRB of a Un interface of a next-hop RN of the RN/DU. In other words, a transmission granularity of the status report is the DRB of the RN.

Optionally, the status report of the DRB of the RN may be a status report of a DRB of at least one terminal carried on each of the at least one DRB of the RN. In this case, the status report of the DRB of the RN further includes a terminal identifier and/or a DRB identifier, or includes an identifier (for example, a TEID, a UE context identifier, or an identifier in another format) used to identify the DRB of the terminal. If the status report of the DRB of the RN does not include the DRB identifier, the status report of the DRB of the RN may include status reports of DRBs of a plurality of terminals arranged in a specific sequence. The arrangement sequence herein may be preset in a protocol, or may be arranged in descending order or ascending order of DRB identifiers.

It should be noted that, in this case, a DRB of each RN corresponds to one IAB function protocol layer entity. Alternatively, the status report of the DRB of the RN does not identify DRBs of terminals carried by the RN, and feeds back a transmission status of the DRB of the RN by carrying an SN in the DRB of the RN. Specifically, the status report of the DRB of the RN includes any one or any combination of a plurality of pieces of the following content: a largest successfully sent/received RN DRB SN, a largest RN DRB SN and a smallest RN DRB SN of a transmission hole (referring to one data packet or a plurality of data packets with consecutive SNs that is/are not successfully sent/ received), a transmission hole sequence number, a largest consecutively successfully sent/received RN DRB SN, a largest RN DRB SN and a smallest RN DRB SN of a successfully transmitted data chunk, a sequence number of a successfully transmitted data chunk sequence number, a largest sent/received RN DRB SN, a successfully sent RN DRB SN, a lost RN DRB SN, an RN identifier, a DRB identifier, and an RN DRB identifier.

Optionally, the status report of the DRB of the RN may include status reports of all DRBs of the Un interface of the RN, or may be status reports of all DRBs of a next-hop RN of the RN. In this case, the DRB status report of the RN further includes the RN identifier and/or the DRB identifier, or includes information used to identify the RN DRB. If the DRB identifier is not carried, the DRB status report of the RN may include status reports of DRBs of a plurality of RNs that are arranged in a specific sequence. The sequence herein may be preset in a protocol, or may be arranged in descending order or ascending order of DRB identifiers.

Optionally, if the RN is considered as a terminal, the RN may also generate an RLC status report of the Un interface of the DRB of the RN. In this embodiment of this application, the status report is referred to as an RN RLC status report.

The RN RLC status report includes any one or a combination of the following content: a largest successfully sent RN RLC SN, a successfully sent RN RLC SN, a lost RN RLC SN, a largest RN RLC SN and a smallest RN RLC SN of a transmission hole, a transmission hole sequence number, an RN identifier, and a DRB identifier.

The RN generates a status report of the RN at the AB function protocol layer based on the RN RLC status report. Specifically, the status report of the RN includes a part or all of the RN RLC status report of the RN. It should be noted that, in this case, one RN has one IAB function protocol layer entity, and all DRBs of the RN correspond to the IAB function protocol layer entity. Optionally, the status report of the RN further includes the RN identifier and/or the DRB identifier, or includes information used to identify the RN DRB. If the status report of the RN does not include the DRB identifier, the status report may include a plurality of RN RLC status reports arranged in a specific sequence. Alternatively, the status report of the RN includes only an RN RLC status report corresponding to one RN DRB. In this case, the AB function protocol layer entity may be per RN DRB, in other words, one RN DRB corresponds to one IAB function protocol layer entity.

The status report in this embodiment of this application may be periodically reported, or may be reported by event triggering. This is not specifically limited in this embodiment of this application.

The periodic reporting may be used by a data anchor (for example, the DeNB system) to delete, based on the status report, a data packet that has been successfully sent. For example, inside the data anchor, after a peer PDCP entity (referred to as a PDCP entity of the terminal for short) of the terminal sends the PDCP PDU to the IAB function protocol layer, the PDCP entity of the terminal deletes the PDCP PDU, and the IAB function protocol layer buffers the PDCP PDU of the downlink terminal. After the received status report feeds back that the terminal has correctly received the PDCP PDU, the PDCP PDU is deleted. In addition, periodic reporting may be further used inside the data anchor. For example, inside the data anchor, after the PDCP entity of the terminal sends the PDCP PDU by using a lower layer, the PDCP entity of the terminal continues to buffer the PDCP PDU. After receiving the status report and learning that the terminal has correctly received the PDCP PDU, the data anchor instructs the PDCP entity of the terminal to delete the PDCP PDU.

In a scenario in which a status report is reported by event triggering, the event may be: terminal handover, radio link failure (RLF) of the terminal, RN handover, RLF of the RN, or reception of a polling indication (for example, the polling indication is indication information generated by the IAB function protocol layer).

For example, when the terminal is handed over from a source node to a target node, data needs to be forwarded from the source node to the target node needs. In this case, if the data anchor buffers the data that needs to be forwarded, the source node of the terminal may feed back the status report of the terminal or status reports of DRBs of one or more terminals to the data anchor, so that the data anchor forwards, to the target node, data that is not successfully sent to the terminal. The data anchor may be a common previous-hop RN or previous-but-n-hop (n>0) RN of the source node and the target node, or a common DeNB of the source node and the target node (for example, a peer PDCP of the terminal is placed in the DeNB, and the PDCP PDU that is not successfully received by the terminal may be further buffered in the DeNB). In other words, before and after the terminal is handed over, relay transmission needs to be performed on data of the terminal at the data anchor. Optionally, if the data anchor is a previous-hop RN/DeNB directly connected to the source node and the target node through an air interface, the source node may feed back the RLC status report of the terminal to the data anchor. The source node may be an RN, and the target node may be an RN or a DeNB. Specially, the target node and the data anchor are the same node. The data anchor needs to send, to the target node, data that is not successfully received by the terminal, so that the target node sends the data to the terminal. Therefore, the data anchor needs to learn of information about the target node, and the learning may be performed in the following manners: manner 1: The source node notifies the data anchor, for example, the source node negotiates with the target node in advance by using a handover preparation process, and notifies the data anchor of the information about the target node; manner 2: The target node notifies the data anchor, for example, after the terminal is accessed by the target node, the target node notifies the data anchor, so that the data anchor switches a data path of the terminal from the source node to the target node.

Optionally, after accessing from the target node, the terminal may send a status report on a DRB transmission status of the terminal, to explicitly notify the target node/data anchor of a data packet that is not successfully received by the target node/data anchor. An advantage of this method is that, when the serving node or the intermediate forwarding node of the terminal feeds back a status report for the DRB of the terminal, a data packet that is not successfully received by the terminal and that is indicated in the status report may have been successfully received by the terminal, but an acknowledge (ACK) feedback is not sent in time. Therefore, the terminal may provide a more accurate status report after accessing the target node, and this avoids air interface resource waste caused by repeated data transmission. The terminal sends the status report to the data anchor, so that the data anchor can be prevented from sending, to the target node, a data packet that has been successfully received by the terminal but for which an ACK feedback has not been sent. Alternatively, if the data anchor sends, to the target node, a data packet that has been successfully received by the terminal but for which an ACK feedback has not been sent, the terminal sends the status report to the target node, so that the target node can be prevented from sending, to the terminal, the data packet that has been successfully received by the terminal but for which the ACK feedback has not been sent.

For example, after an RLF occurs on the terminal, the terminal performs RRC connection reestablishment in a cell provided by the target node, the target node notifies an original serving node that the RLF occurs on the terminal, and the original serving node may forward the data of the terminal to the target node. In this case, if the data anchor buffers the data that needs to be forwarded, the original serving node of the terminal may feed back the status report of the terminal or status reports of DRBs of a plurality of terminals to the data anchor, so that the data anchor forwards, to the target node, data that is not successfully sent to the terminal. The data anchor may be a common previous-hop RN or previous-but-n-hop (n>0) RN of the original serving node and the target node, or a common DeNB of the original serving node and the target node (for example, a peer PDCP of the terminal is placed in the DeNB, and the PDCP PDU that is not successfully received by the terminal may be further buffered in the DeNB). In other words, before and after the RRC connection reestablishment of the terminal, relay transmission needs to be performed on data of the terminal at the data anchor. Optionally, if the data anchor is a previous-hop RN directly connected to the original serving node and the target node through an air interface, the original serving node may feed back the RLC status report of the terminal to the data anchor. The original serving node may be an RN, and the target node may be an RN or a DeNB. Specially, the target node and the data anchor are the same node. The data anchor needs to send, to the target node, data that is not successfully received by the terminal, so that the target node sends the data to the terminal. Therefore, the data anchor needs to learn of information about the target node, and the learning may be performed in the following manners: manner 1: The original serving node notifies the data anchor, for example, the original serving node configures the target node for the terminal in advance, and notifies the data anchor of the information about the target node in advance; manner 2: The target node notifies the data anchor, for example, after the terminal is accessed by the target node, the target node notifies the data anchor, so that the data anchor switches a data path of the terminal from the original serving node to the target node.

Optionally, similar to the scenario in which the terminal is handed over, after accessing from the target node, the terminal may send a status report on a DRB transmission status of the terminal, to explicitly notify the target node/data anchor of a data packet that is not successfully received by the target node/data anchor.

For example, when the RN is handed over from a source node to a target node, data needs to be forwarded from the source node to the target node needs. In this case, if the data anchor buffers the data that needs to be forwarded, the source node of the RN may feed back the status report of the RN or status reports (which carry data of a terminal served by the RN) of DRBs of one or more RNs to the data anchor, so that the data anchor forwards, to the target node, data that is not successfully sent to the RN. Alternatively, after the RN is handed over, relay transmission does not continue to be performed on data (all DRBs or some DRBs) of some terminals by using the RN, or some terminals are no longer served by the RN. In this case, the source node needs to feed back status reports of DRBs of the terminals to the data anchor. The data anchor is a common previous-hop RN or previous-but-n-hop (n>) RN of the source node and the target node, or a common DeNB of the source node and the target node (for example, a peer PDCP of the terminal is placed in the DeNB, and the PDCP PDU that is not successfully received by the terminal may be further buffered in the DeNB). In other words, before and after the RN is handed over, relay transmission needs to be performed on data of the RN (for example, data of the terminal served by the RN and data of a next-hop RN served by the RN) at the data anchor. If the data anchor is a previous-hop RN/DeNB directly connected to the source node and the target node through an air interface, the source node may feed back an RLC status report of the RN to the data anchor. The source node may be an RN, and the target node may be an RN or a DeNB. Specially, the target node and the data anchor are the same node. The data anchor needs to send, to the target node, data that is not successfully received by the terminal, so that the target node sends the data to the RN. Therefore, the data anchor needs to learn of information about the target node, and the learning may be performed in the following manners: manner 1: The source node notifies the data anchor, for example, the source node negotiates with the target node in advance by using a handover preparation process, and notifies the data anchor of the information about the target node; manner 2: The target node notifies the data anchor, for example, after the RN is accessed by the target node, the target node notifies the data anchor, so that the data anchor switches a data path of the RN from the source node to the target node.

Optionally, after accessing from the target node, the RN may send a status report on a data transmission status of the RN, to explicitly notify the target node/data anchor of a data packet that is not successfully received by the target node/data anchor. An advantage of this method is that, when the serving node or the intermediate forwarding node of the RN feeds back a status report for the data of the RN, a data packet that is not successfully received by the RN and that is indicated in the status report may have been successfully received by the RN, but an ACK feedback is not sent in time. Therefore, the RN may provide a more accurate status report after accessing the target node, and this avoids air interface resource waste caused by repeated data transmission. The RN sends the status report to the data anchor, so that the data anchor can be prevented from sending, to the target node, a data packet that has been successfully received by the RN but for which an ACK feedback has not been sent. Alternatively, if the data anchor sends, to the target node, a data packet that has been successfully received by the RN but for which an ACK feedback has not been sent, the RN sends the status report to the target node, so that the target node can be prevented from sending, to the RN, the data packet that has been successfully received by the RN but for which the ACK feedback has not been sent.

For example, after an RLF occurs on the RN, the RN performs RRC connection reestablishment in a cell provided by the target node, the original serving node learns that the RLF occurs on the RN, and the original serving node may forward the data of the RN to the target node. In this case, if the data anchor buffers the data that needs to be forwarded, the original serving node of the RN may feed back the status report of the RN or status reports of DRBs of a plurality of RNs to the data anchor, so that the data anchor forwards, to the target node, data that is not successfully sent to the RN. Alternatively, after the RN RRC connection reestablishment, relay transmission does not continue to be performed on data (all DRBs or some DRBs) of some terminals by using the RN, or some terminals are no longer served by the RN. In this case, the source node needs to feed back status reports of DRBs of the terminals to the data anchor. The data anchor is a common previous-hop RN or previous-but-n-hop (n>0) RN of the original serving node and the target node, or a common DeNB of the original serving node and the target node (for example, a peer PDCP of the terminal is placed in the DeNB, and the PDCP PDU that is not successfully received by the terminal may be further buffered in the DeNB). In other words, before and after the RN RRC connection reestablishment, relay transmission needs to be performed on data of the RN at the data anchor. If the data anchor is a previous-hop RN directly connected to the original serving node and the target node through an air interface, the original serving node may feed back the RLC status report of the RN to the data anchor. The original serving node may be an RN, and the target node may be an RN or a DeNB. Specially, the target node and the data anchor are the same node. The data anchor needs to send, to the target node, data that is not successfully received by the RN, so that the target node sends the data to the RN. Therefore, the data anchor needs to learn of information about the target node, and the learning may be performed in the following manners: manner 1: The original serving node notifies the data anchor, for example, the original serving node configures the target node for the RN in advance, and notifies the data anchor of the information about the target node in advance; manner 2: The target node notifies the data anchor, for example, after the RN is accessed by the target node, the target node notifies the data anchor, so that the data anchor switches a data path of the RN from the original serving node to the target node.

Optionally, similar to the scenario in which the RN is handed over, after accessing from the target node, the RN may send a status report on a data transmission status of the RN, to explicitly notify the target node/data anchor of a data packet that is not successfully received by the target node/data anchor.

It should be noted that, in the foregoing several cases, if the data anchor is not a previous-hop node of the RN, the previous-hop node of the RN needs to route upwards the received status report as data of a node that sends the status report, and send the data to the data anchor.

Using the protocol stack shown in FIG. 11A and FIG. 11B and the connection relationship shown in FIG. 2 as an example, UE 3 accesses an RN 3, and performs data transmission with the DeNB by using an RN 2 and an RN 1, and the RN 2 generates a status report of a DRB of the RN 3 on the Un3 interface. Specifically, in a possible manner, the peer IAB function protocol layer entity of the RN 3 on the RN 2 generates the status report, and sends the status report to the peer IAB function layer entity of the RN 1 on the RN 2, so that the RN 2 sends the status report to the RN 1 through the Un2 interface. In another possible manner, the peer IAB function layer entity of the RN 1 on the RN 2 generates the status report. Optionally, the pee IAB function protocol layer entity of the RN 3 on the RN 2 informs the peer IAB function layer entity of the RN 1 on the RN 2 of a sending/receiving status of a data packet on the Un3 interface. Because a plurality of DRBs of a terminal may have different mapping manners on different Un interfaces, there may be a plurality of implementations of a routing manner of the status report. When the IAB function protocol layer entity is a per RN DRB, for example, a DRB 1 and a DRB 2 of a terminal are carried on a DRB 1 of the RN 3 on the Un3 interface, but on the Un2 interface, the DRB 1 of the terminal is carried on a DRB 1 of the RN 2, and the DRB 2 of the terminal is carried on a DRB 2 of the RN 2. The status report sent by the RN 2 on the Un2 interface needs to feed back a transmission status of the DRB 1 of the terminal on the DRB 1 of the RN 2, and feed back the transmission status of the DRB 2 of the terminal on the DRB 2 of the RN 2. Similarly, when receiving the DRB that feeds back the DRB transmission status of the terminal, the RN 1 needs to transmit, on the DRB of the RN 1, the transmission status of the DRB of the terminal carried on the DRB of the RN 1. To be specific, when forwarding the status report, the intermediate forwarding node needs to reassemble the status report, aggregate, based on an RN DRB of the intermediate forwarding node, DRB status reports of the terminal included in the status report, and aggregate, into one status report, DRB statuses of the terminal carried on one RN DRB, and transmit the status report on the RN DRB.

3. Transmitting the Control Plane Message

Correspondingly, the first data in this embodiment of this application is the control plane message.

The F1-like interface may transmit an interface control plane message, and the message is similar to the F1AP and is referred to as an F1AP-like signaling procedure/message. In an optional manner, the F1AP-like signaling procedure and message are consistent with the F1AP, or are extended based on the F1AP. In this way, an existing interface procedure can be directly reused, and standardization work is reduced.

Similar to the F1AP, the F1AP-like message may be classified into two types: a common message (or Non UE-associated) and a UE-associated message.

Optionally, after the F1-like interface is established between the RN and the DeNB system, a logical F1-like connection exists between the RN and the DeNB system, different logical F1-like connections exist between different RNs and the DeNB system, and F1AP-like messages of different RNs may be distinguished by using the carried logical F1-like connections. Optionally, the logical F1-like connection may be identified by using any one or a combination of the following information: control plane transport layer information (if any), second indication information, an identifier of the terminal on the F1-like interface (UE F1-like ID), and third indication information. The control plane transport layer information is information carried in a transport layer protocol of the F1-like interface. For example, if a transport layer protocol layer of the F1-like interface includes an IP layer, the control plane transport layer information includes an IP address of the DeNB system and/or an IP address of the RN. For example, if the transport layer protocol layer of the F1-like interface includes an SCTP layer, the control plane transport layer information includes: a port number of the DeNB system and/or a port number of the RN, an SCTP stream identifier, an SCTP payload protocol identifier, and the like. In brief, the control plane transport layer information may include any one or any combination of a plurality of pieces of the following information: the IP address of the DeNB system, the IP address of the RN, the port number of the DeNB system, the port number of the RN, the SCTP stream identifier, the SCTP PPI, and the like. The second indication information is used to indicate an RN that establishes the F1-like interface with the DeNB system. For example, the second indication information may be a UE identifier (for example, a C-RNTI, an S-TMSI, or a GUTI) when the RN accesses a network as UE, or may be an F1-like interface identifier (for example, a UE F1AP ID or a UE F1AP-like ID) allocated by a previous-hop RN to the RN when the RN accesses a network as UE, or may be an RN ID obtained after the RN is handed over from a UE mode to an RN mode after the RN accesses a network as UE (optionally, the RN ID may be configured by an OAM system, assigned by the DeNB system, or preconfigured). Optionally, if the RN is considered as one DU, the second indication information may have a same format as a DU identifier. Optionally, the second indication information may be a global identifier, and includes an RN local identifier and a quantity of RN hops. Optionally, the RN local identifier may be allocated by a previous-hop node (for example, an RN or a DU in a DeNB system) of the RN. The third indication information is used to indicate an F1-like interface, to identify logical F1-like connections of different RNs.

Optionally, between an RN and the DeNB system, a terminal-associated logical F1-like connection may be established for a terminal served by the RN. Optionally, the terminal-associated logical F1-like connection may identify different terminals by using any one or any combination of a plurality of pieces of the following information: fourth indication information used to indicate the terminal and an identifier of a serving node of the terminal.

The fourth indication information may be any one or any combination of a plurality of pieces of the following information: an F1-like interface UE ID, a C-RNTI, a cell ID, a context identifier, and the like. Further, optionally, the fourth indication information is a combination of a terminal identifier and an RN identifier.

It should be noted that if the terminal accesses a cell provided by an RN, the terminal is directly connected to an RN through an air interface, the RN provides a Uu interface for the terminal, or the RN provides a radio resource for air interface transmission for the terminal, in this embodiment of this application, the RN is referred to as an RN serving the terminal, and the terminal is referred to as a terminal served by the RN.

4. Transmitting the RRC Message of the Terminal

Correspondingly, the first data in this embodiment of this application is the RRC message of the terminal.

After obtaining the RRC message of the terminal, the IAB function protocol layer sends the first message including the RRC message of the terminal and a type identifier corresponding to the RRC message.

Optionally, the RRC message of the UE may be carried in an F1AP-like message for transmission, or may be directly transmitted by using the IAB function protocol layer, for example, directly carried in a PDU of the IAB function protocol layer.

5. Carrying Routing Information

The first message may include a target identifier, and the target identifier is used to indicate a serving node of the terminal. The first communications device determines, based on the target identifier, a target device of the control plane message or the user plane data, to perform processing and/or forwarding.

Optionally, the target identifier may be an identifier of the serving node of the terminal or an IP address of the serving node of the terminal.

Further, the first message further includes sixth indication information, and the sixth indication information is used to indicate that the first data belongs to the terminal or that the first data is associated with the terminal.

6. Carrying the Type Identifier

The type identifier is used to indicate a type of the first data. In this way, a device that receives the first message may perform different processing based on the data type.

It can be learned from the descriptions of the foregoing several functions that the IAB function protocol layer may be used to transmit any one or any combination of a plurality of the following data types: an F1AP-like control plane message (optionally, the F1AP-like control plane message may be further classified into a common F1AP-like control plane message and a UE-associated F1AP-like control plane message), an RRC message of the terminal, user plane data, a status report of a Uu interface, and a status report of a Un interface. When the data is transmitted by using the TAB function protocol layer, a corresponding data type may be further carried, so that a receive end performs processing based on a processing procedure of a corresponding function after identifying the data type.

7. Having a Compression Function

The user plane data, the control plane data, the RRC message, and the status report are all referred to as the first data. After obtaining the first data, the IAB function protocol layer compresses the first data or sub-information in the first data based on a first preset compression algorithm. The sub-information includes at least one of an IP header, an SCTP common header, and information other than target information in an SCTP data chunk, and the target information is at least one of user data, the stream identifier, and the PPI; or the sub-information includes at least one of an IP header, a UDP header, and information other than a TEID in a GTP header.

If the control-plane protocol stack of the F1-like interface between the DeNB system and the RN includes the transport layer protocol layer, when generating the F1AP-like control plane message including a transmission protocol layer information field, the DeNB system/RN compresses the transmission protocol layer information field of the F1AP-like control plane message. When receiving the F1AP-like control plane message, the DeNB system/RN decompresses the transmission protocol layer information field of the F1AP-like control plane message. Optionally, for the DeNB system, when the DeNB system includes a CU and a DU, the compression/decompression is performed by the DU.

Figure 16:
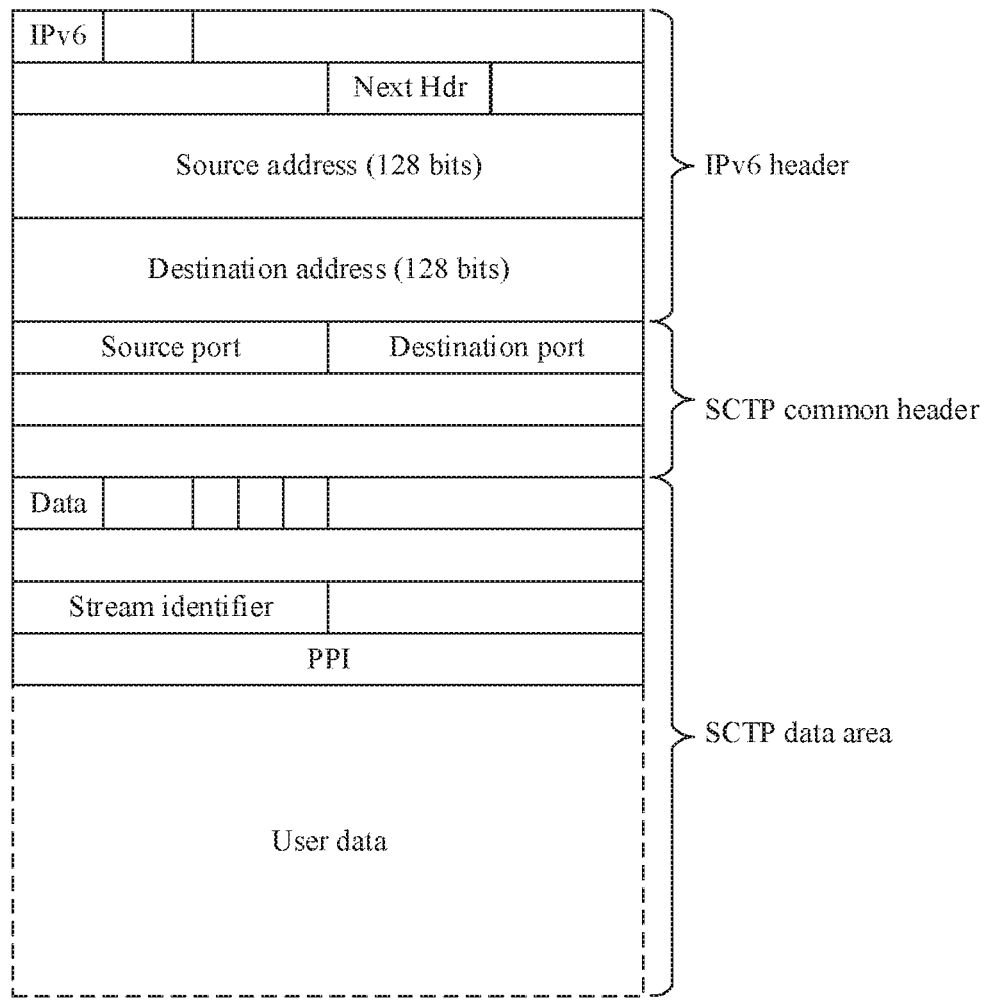
FIG. 16 is a schematic diagram of a format of an uncompressed SCTP data packet according to an embodiment of this application.

FIG. 16 shows a format of an existing SCTP/IP packet and a format of each field in the SCTP/IP packet. For existing interfaces such as S1, NG, and F1, fields that carry useful information include: a source IP address and a destination IP address, which are used for IP addressing; a source port number and a destination port number; a stream identifier, used to identify a common message and a UE-associated message: and a PPI, used to indicate a corresponding AP type (for example, an S1AP is 18, an NGAP is 60, and an F1AP is 62). The F1AP-like message body needs to be carried in a user data field in FIG. 16. Information about a field other than an F1AP-like message body is static. If the intermediate forwarding node does not need to obtain the information included in the field, the intermediate forwarding node may compress the information. Specially, compressing the information specifically includes compressing the information into zero, or deleting/peeling the compressed information. In an optional manner, a peer end may be notified of the compressed information in another manner (for example, a control plane message). Correspondingly, decompression includes restoring the compressed information. In another optional manner, the compressed information is not used by the peer end, and correspondingly the peer end does not need to perform decompression processing.

Optionally, the first sub-information of the first data is compressed. The first sub-information may be an IP header (for example, an IPv6 header part in FIG. 16), or an IP header and an SCTP common header, or a part other than user data in an IP header, an SCTP common header, and an SCTP data chunk, or a part other than user data and a stream identifier in an IP header, an SCTP common header, and an SCTP data chunk, or a part other than user data, a stream identifier, and a PPI in an IP header, an SCTP common header, and an SCTP data chunk.

Optionally, the compression and the decompression are performed by nodes at two ends of the F1-like interface (for example, a DeNB and an RN that establish the interface), and does not need to be performed by the intermediate forwarding node (for example, an RN that performs relay transmission for the F1AP-like control plane message).

Optionally, the first preset compression algorithm is pre-configured (for example, specified in a protocol), or is configured by the DeNB system/an operation and management entity (OAM). Specifically, the DeNB system may configure the first preset compression algorithm for the RN through an RRC message of the RN, may configure the first preset compression algorithm for the RN in an F1-like interface establishment process, or may configure the first preset compression algorithm for the RN after establishment of the F1-like interface is completed.

Optionally, the DeNB system sends a compression activation/deactivation indication to the RN, to indicate that the RN starts/stops using the compression function.

Optionally, when the compressed F1AP-like control plane message is transmitted, a compression indication is carried in a data packet, to indicate that the F1AP-like control plane message is compressed. For example, the compression indication is 1-bit information, "1" indicates being compressed, and "0" indicates not being compressed.

Optionally, the compression indication is carried in a packet header of the IAB function protocol layer.

When a control-plane protocol stack of the F1-like interface between the DeNB system and the RN does not include the transport layer protocol layer, a data packet of the IAB function protocol layer of the F1AP-like control plane message carries a message identifier, to identify a common message or a UE-associated message. Optionally, the IAB function protocol layer data packet that carries the F1AP-like control plane message carries an AP type, to indicate that a corresponding AP type is F1AP-like. For example, if the F1AP-like protocol layer is the same as the F1AP protocol layer, when the DeNB includes a CU and a DU, the DU peels the transmission protocol layer field of the F1AP message received by the F1 interface, and reserves only an F1AP message body, and the F1AP message body is transmitted to the RN on the Un interface. Similarly, when receiving, from the Un interface, the F1AP-like control plane message sent by the RN, the DU uses the F1 AP-like control plane message as an F1AP message body transmitted on the F1 interface, a transmission field is added, and the F1AP-like control plane message is transmitted on the F interface.

Similarly, when the user plane data is transmitted in the manner 1, the user plane data is carried on the user plane of the F1-like interface for transmission.

When the user-plane protocol stack of the F1-like interface includes the transport layer protocol layer (for example, a GTP-U/UDP/IP), the PDCP PDU of the terminal is carried in the GTP-U data packet. The DeNB system/RN compresses the transmission protocol layer information field of the user plane data when generating the user plane data that includes the transmission protocol layer information field. When receiving the user plane data, the DeNB system/RN decompresses the transmission protocol layer information field of the user plane data. Optionally, for the DeNB system, when the DeNB system includes a CU and a DU, the compression/decompression is performed by the DU.

Figure 19:
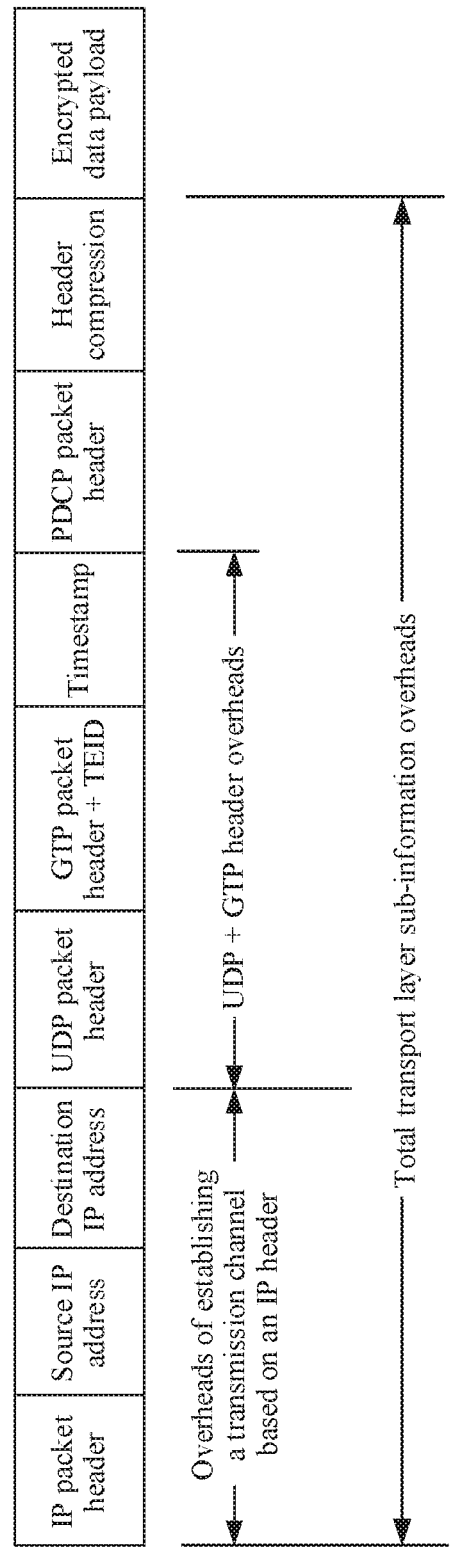
FIG. 19 is a schematic diagram of a format of an uncompressed GTP-U data packet according to an embodiment of this application.

FIG. 19 shows a format of an existing GTP-U data packet and a format of each field in the GTP-U data packet. Fields of useful information carried in the GTP-U data packet include: a source IP address and a destination IP address, which are used for IP addressing; a source port number and a destination port number; and a TEID, used to identify a DRB of UE. Information about a field other than a UE PDCP PDU is static. If the intermediate forwarding node does not need to obtain the information included in the field, the intermediate forwarding node may compress the information. Specially, compressing the information specifically includes compressing the information into zero, or deleting/peeling the compressed information. In an optional manner, a peer end may be notified of the compressed information in another manner (for example, a control plane message). Correspondingly, decompression includes restoring the compressed information. In another optional manner, the compressed information is not used by the peer end, and correspondingly the peer end does not need to perform decompression processing.

Optionally, the first sub-information of the first data is compressed. The first sub-information may be an IP header, or an IP header and a UDP header, or a part other than a TEID in an IP header, a UDP header, and a GTP header, or a UDP header and a GTP header.

When the user-plane protocol stack of the F1-like interface does not include the transport layer protocol layer, the F1AP-like user plane data includes the TEID or the first indication information. For example, if the TEID carried in the F1-like user plane data packet corresponds to the TEID on the F1 interface, in other words, for DRBs of same UE, when the DRBs are transmitted on the F1-like interface and the F1 interface, a same TEID is used. Optionally, when the DeNB system includes a CU and a DU, the DU peels the transmission protocol layer field from the GTP-U data packet received by the F1 interface, and reserves only the TEID and the PDCP PDU of the UE, and the TEID and the PDCP PDU of the UE are transmitted to the RN on the Un interface. Similarly, when receiving, from the Un interface, the F1AP-like user plane data packet sent by the RN, the DU uses the F1 AP-like user plane data packet as an F1-U data packet transmitted on the F1 interface, a transmission field is added, and the F1AP-like user plane data packet is transmitted on the F1 interface.

8. Providing Air-Interface Security Protection

The IAB function protocol layer provides integrity protection and/or encryption for transmitted first data (which may be, a control plane message, user plane data, or a status report).

For the RRC message and the user plane data of the terminal transmitted at the IAB function protocol layer, security protection is performed in downlink by using the pee PDCP layer of the DeNB system of the terminal, and security protection is performed in uplink by using the PDCP layer of the terminal. Therefore, no further security protection is needed. However, for the F1AP-like control plane message, because the F1AP-like control plane message carries configuration information (for example, cell configuration information) of the RN and the DeNB system and terminal-associated configuration information (for example, QoS information of the terminal), security protection needs to be performed to prevent the F1AP-like control plane message from being stolen or tampered with. Therefore, the IAB function protocol layer may perform security protection on the F1AP-like control plane message. Optionally, security protection may also be performed on another data type.

Specifically, a specific implementation of security protection may be encryption and/or integrity protection. To be specific, an IAB function protocol layer at a transmit end performs encryption and/or integrity protection on data on which security protection needs to be performed, and an IAB function protocol layer at a receive end performs decryption and/or integrity check on the data. The transmit end and the receive end need to use a same encryption/integrity protection key and algorithm, and the encryption/integrity protection key and algorithm may be the same or different.

It should be noted that when the IAB function protocol layer is placed in the RN PDCP protocol layer, an RN PDCP security protection function may be used for the security protection function. In other words, an RN PDCP encryption key and algorithm and an RN PDCP integrity protection key and algorithm are used, to perform security protection on data on which security protection needs to be performed.

With reference to the foregoing descriptions, for the protocol stacks shown in FIG. 12A, FIG. 12B, FIG. 14A, FIG. 14B, FIG. 15A, and FIG. 15B, FIG. 17 shows a format of a first message of the protocol stacks. For the protocol stacks shown in FIG. 13A and FIG. 13B, FIG. 18 shows a format of a first message of the protocol stacks.

For the protocol stacks shown in FIG. 14A and FIG. 14B, an IAB function protocol layer and a PDCP layer are independent protocol layers. Specially, the IAB function protocol layer is used as a part of an RN RLC layer, for example, used as a sub-layer of the RN RLC layer. In this case, data of the IAB function protocol layer is carried in an RN RLC PDU, for example, as a content part of an RLC PDU. To enable the RN to identify, when the RN reads the RLC PDU, the RN RLC PDU that carries the data of the IAB function protocol layer, and further parse the RLC PDU based on a data format of the JAB function protocol layer, an IAB function protocol layer data indication (for example, a 1-bit indicator bit) is added to the RN RLC PDU, to indicate that the RN RLC PDU includes the data of the AB function protocol layer. Optionally, the IAB function protocol layer data indication may be included in an RLC header. A in FIG. 20 shows a format of a data packet of an existing RLC layer, and B shows a format of a data packet of an RLC layer integrated with an TAB function according to an embodiment of this application. In FIG. 20, "Oct" represents a byte.

Similarly, for the protocol stacks shown in FIG. 15A and FIG. 15B, an AB function protocol layer may be disposed in a PDCP layer. The AB function protocol layer is a part of an RN PDCP layer, for example, used as a sub-layer of the RN PDCP layer. In this case, data of the JAB function protocol layer is carried in an RN PDCP PDU, for example, as a content part of a PDCP PDU. To enable the RN to identify, when the RN reads the PDCP PDU, the RN PDCP PDU that carries the data of the TAB function protocol layer, and further parse the RN PDCP PDU based on a data format of the IAB function protocol layer, an IAB function protocol layer data indication (for example, a 1-bit indicator bit) is added to the RN PDCP PDU, to indicate that the RN PDCP PDU includes the data of the IAB function protocol layer. Optionally, the IAB function protocol layer data indication may be included in a PDCP header. A in FIG. 21 shows a format of a data packet of an existing PDCP layer, and B shows a format of a data packet of a PDCP layer integrated with an AB function according to an embodiment of this application. A MAC-I in FIG. 21 is an integrity protection parity bit.

It can be learned from the foregoing descriptions that, in this embodiment of this application, JAB function protocol layers are added to protocol stacks of an RN and a DeNB system, and the IAB function protocol layers can implement the foregoing functions 1 to 8. To enable the RN and the DeNB system to implement the foregoing functions 1 to 8, the JAB function protocol layers of the RN and the DeNB system need to be initially configured.

Initial configurations of the IAB function protocol layers of the RN and DeNB systems are described herein.

Figure 22:
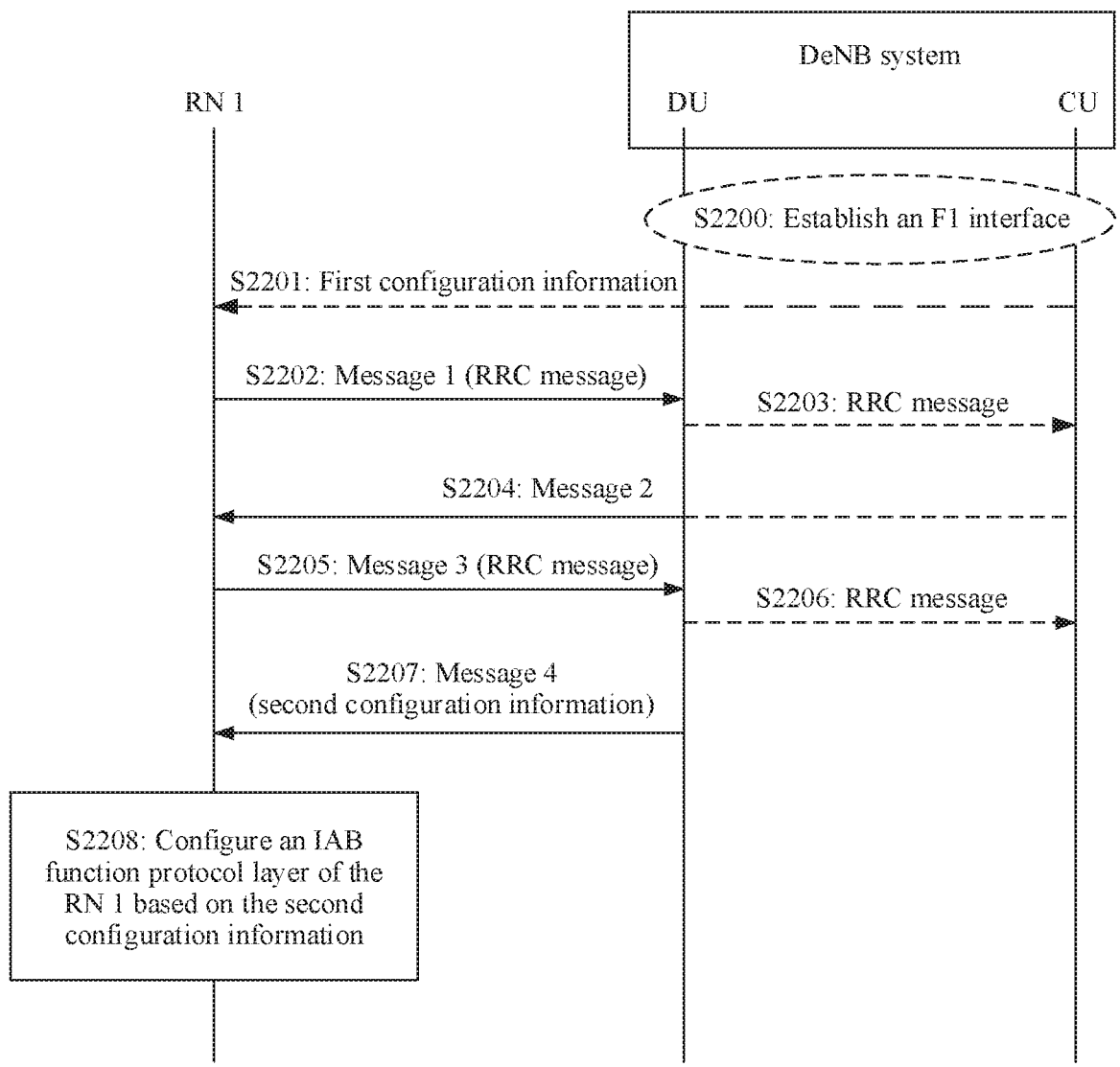
FIG. 22 is a first schematic flowchart for configuring an IAB function protocol layer of each node according to an embodiment of this application.

FIG. 22 shows a procedure for configuring an IAB function protocol layer in a scenario in which an RN 1 accesses a network.

A DeNB system in the following procedure may be an independent DeNB, or may include a CU and a DU. If the DeNB system is an independent DeNB, interaction between the CU and the DU in FIG. 22 is internal interaction of the DeNB system. It should be noted that whether the DeNB system performs CU-DU splitting does not affect processing of the RN 1. Specifically, when the RN 1 sends a message to the DeNB system, if the DeNB system includes a CU and a DU, the DU receives, through an air interface (for example, a Un1 interface), a message sent by the RN 1, and further may need to send the message to the CU. When the RN 1 receives a message sent by the DeNB system, if the DeNB system includes a CU and a DU, the message received by the RN 1 may be generated by the DU and sent to the RN 1 through an air interface, or generated by the CU and sent to the DU through an F1 interface, and then processed by the DU and sent to the RN 1 through an air interface.

As shown in FIG. 22, a configuration method includes the following steps.

S2200 (optional): If the DeNB system includes a CU and a DU, an F1 interface is established between the DU and the CU, and the F1 interface is used to indicate whether each of the DU and the CU has a function of supporting an IAB function protocol layer.

If the DeNB system includes a CU and a DU, this step is required.

Specifically, for the DU, the DU indicates, to the CU by using an F1AP message, that the DU has a function of supporting the AB function protocol layer. Optionally, the F1AP message includes information used to indicate that the DU has the IAB function protocol layer.

The CU is similar to the DU, and details are not described herein again.

S2201 (optional): The DeNB system generates first configuration information associated with an RN access network, and sends the first configuration information.

Specifically, if the DeNB system includes a CU and a DU, and both the CU and the DU can provide a service for the RN, for example, the DU supports the function of the JAB function protocol layer, and the DeNB system including the CU and the DU can route control plane signaling and user plane data of the RN to a core network node serving the RN, it is determined that the DeNB system can provide a service for the RN, and the DeNB system generates the first configuration information.

Optionally, the first configuration information may include an access control parameter used to indicate the RN, and may also include information (for example, a random access resource, a PUCCH, a configuration of a signal used for measurement, and a measurement reporting configuration) associated with a configuration of a radio resource dedicated to the RN.

After generating the first configuration information, the DeNB system (for example, the DU) broadcasts the first configuration information through an air interface.

For example, the first configuration information is a system message.

S2202: The RN 1 sends a message 1 to the DeNB system, to request to access a network.

Specifically, the RN 1 may initiate a random access procedure, and send the message 1 to request to establish an RRC connection (specifically including scenarios of establishment, resume, and reestablishment).

The message 1 may include an RRC connection request message, an RRC connection resume request message, or an RRC connection reestablishment request message.

Optionally, in the random access process, the RN 1 may further send an RN indication, so that the DeNB system identifies that a terminal requesting to establish the RRC connection is not a common terminal, but an RN. The RN indication may be included in a MAC data packet, and is used to be interpreted by the DU. Alternatively, the RN 1 performs access by using a random access resource dedicated to the RN, so that the DU can identify that a terminal initiating random access is not a common terminal, but an RN.

S2203 (optional): When the DeNB system includes a CU and a DU, the DU sends, to the CU through an F1 interface, the RRC message included in the message 1.

Optionally, if the DU identifies, in the random access process, that a device initiating access is the RN, but not a common terminal, the DU determines whether access of the RN is allowed. If the DU determines that access of the RN 1 is not allowed, the DU sends a notification message to the CU through the F1 interface, to instruct the CU to reject access of the RN 1, so that the CU sends, to the RN 1, an RRC message used to indicate that access is rejected. Optionally, that the DU instructs the CU to reject access of the RN 1 may be indicated explicitly or implicitly.

If the DU does not determine whether access of the RN 1 is allowed, after receiving the message 1, the DU forwards the RRC message of the RN 1 in the message 1 to the CU through the F1 interface.

S2204: The DeNB system sends a message 2 to the RN 1.

The message 2 is used to indicate whether access of the RN 1 is allowed.

Optionally, the message 2 may include an RRC connection setup message, an RRC connection resume message, an RRC connection reestablishment message, an RRC connection reject message, an RRC connection resume reject message, or an RRC connection reestablishment reject message.

If the DeNB system includes a CU and a DU, after receiving the RRC message in the message 1 sent by the DU, the CU determines that the RN requests access to a device, and further determines whether access of the RN 1 is allowed, to generate the message 2 indicating that access of the RN 1 is allowed or rejected, and sends the message 2 to the RN 1 by using the DU.

If the CU determines to allow access of the RN 1, the message 2 generated by the CU is used to indicate that access of the RN 1 is allowed. In this case, the message 2 may include an RRC connection setup message, an RRC connection resume message, or an RRC connection reestablishment message.

If the CU determines to reject access of the RN 1, the CU generates the message 2 used to indicate that access of the RN 1 is rejected. In this case, the message 2 may include an RRC connection reject message, an RRC connection resume reject message, or an RRC connection reestablishment Reject message.

Optionally, before generating the message 2, the CU may further receive a notification message sent by the DU, to instruct the CU to reject access of the RN 1, so that the CU generates the message 2 used to indicate that access of the RN 1 is rejected.

S2205: If the message 2 is used to indicate that access of the RN 1 is allowed, the RN 1 sends a message 3 to the DeNB system.

The message 3 is used to indicate that RRC setup is completed.

The message 3 may include an RRC connection setup complete message, an RRC connection resume complete message, or an RRC connection reestablishment complete message.

Optionally, the message 3 further includes an identifier of the RN 1.

It should be noted that the message 3 herein is merely used to describe a message, and is different from the message 3 in the existing random access process.

S2206 (optional): When the DeNB system includes a CU and a DU, the DU forwards, to the CU through the F1 interface, the RRC message included in the message 3.

S2207: The DeNB system sends a message 4 including second configuration information to the RN 1, to instruct the RN 1 to configure, based on the second configuration information, a peer IAB function protocol layer of the DeNB system.

The second configuration information includes security configuration information and compression configuration information.

Optionally, the message 4 further includes any one or any combination of a plurality of pieces of the following information: a relay mode activation indication, an RB list, a PHY/MAC/RLC configuration of an RB, a PDCP configuration of the RB in a cell group configuration (cellgroupconfig), and QoS information of a DRB. For example, in a possible case, the PHY/MAC/RLC configuration of the RB is included in cellgroupconfig, and cellgroupconfig further includes a common configuration of an access cell.

Optionally, the message 4 may be an RRC connection reconfiguration message, or may be an RRC reconfiguration message.

When the DeNB system includes a CU and a DU, after receiving the RRC message in the message 3, the CU sends a message 5 including third configuration information to the DU through the F1 interface, and the third configuration information is used to instruct the DU to complete configuration of the peer IAB function protocol layer of the DU of the RN 1.

For example, the third configuration information includes any one or a combination of the following information: an anchor key, a control plane key, a user plane key, an encryption algorithm, an integrity protection algorithm, key derivation information (for example, a quantity of hops and a counter), a compression activation indication, a compression-into-zero indication, a compression field indication, and a compression algorithm.

Optionally, the message 5 may be an F1AP message, for example, a UE context setup request message of the terminal or a UE context modification request message of the terminal.

The message 5 further includes an RB list of the RN 1 and QoS information corresponding to the DRB.

The RB list includes an RB identifier. Optionally, the QoS information corresponding to the DRB includes at least one of the following information: a DRB identifier, a QoS parameter of the DRB, and a QoS parameter of a QoS flow carried on the DRB.

Optionally, the DU sends a message 6 including fourth configuration information to the CU through the F1 interface, and the message 6 is used to indicate a configuration parameter of the TAB function protocol layer of the RN 1 to the CU, so that the CU generates a corresponding configuration message (for example, an RRC message), and the configuration message is sent to the RN 1.

The fourth configuration information includes any one or a combination of the following information: an anchor key, a control plane key, a user plane key, an encryption algorithm, an integrity protection algorithm, key derivation information (for example, a quantity of hops and a counter), a compression activation indication, a compression-into-zero indication, a compression field indication, and a compression algorithm.

Optionally, the message 6 further includes at least one of the following information: the RB list of the RN 1, the PHY/MAC/RLC configuration of the RB, and the cell group configuration.

Sending the message 5 and/or the message 6 between the CU and the DU may implement the following three manners of configuring a configuration parameter of the IAB function protocol layer in the RN 1.

Manner 1: The CU determines configuration information of the IAB function protocol layer in the DU, and sends the configuration information to the DU by using the message 5. In this case, the second configuration information is the third configuration information.

Manner 2: The DU determines configuration information of the IAB function protocol layer in the DU, and sends the configuration information to the CU by using the message 6, so that the CU generates a corresponding RRC message, to instruct the RN 1 to perform a corresponding configuration. In this case, the second configuration information is the fourth configuration information.

Manner 3: The CU determines first sub-configuration information (that is, the third configuration information) of the JAB function protocol layer in the DU, and sends the first sub-configuration information to the DU by using the message 5, and/or the DU determines second sub-configuration information (that is, the fourth configuration information), and sends the second sub-configuration information to the CU by using the message 6. The DeNB system (which may be the CU or the DU) obtains the second configuration information based on the first sub-configuration information and the second sub-configuration information.

Optionally, the first sub-configuration information may be at least one of an anchor key, key derivation information, and whether compression is being performed, and the second sub-configuration information may be at least one of an encryption algorithm, an integrity protection algorithm, and a compression algorithm.

For the manner 1 and the manner 3, the CU needs to obtain capability information (for example, whether the encryption algorithm/an integrity protection algorithm/a compression algorithm is supported) of the RN 1. For the manner 2 and the manner 3, the DU needs to obtain the capability information of the RN 1.

Optionally, the capability information may be sent by the RN 1 to the CU by using an RRC message, or may be sent by a core network to the CU through an interface (for example, an NG interface) between the core network and a base station. After obtaining the capability information of the RN 1, the CU sends the capability information of the RN 1 to the DU through the F1 interface.

S2208: The RN 1 configures the IAB function protocol layer of the RN 1 based on the second configuration information.

Optionally, the RN 1 sends a message 7 to the DeNB system, to request to establish an F1-like interface.

When the DeNB system includes a CU and a DU, a method for configuring the IAB function protocol layer of the RN 1 based on the second configuration information by the RN 1 is as follows.

In an implementation, the message 7 is an RRC message. In this case, the DU does not parse the message 7, but sends the message 7 to the CU through the F1 interface. After receiving the message 7, the CU establishes a corresponding F1 interface for the F1-like interface of the RN 1, and instructs the DU to establish, for the F1-like interface, a transmission channel of a Uu interface between the F1-like interface and the RN 1.

In another implementation, the message 7 is an IAB function protocol layer/MAC layer/RLC layer/PHY layer message. In this case, the DU parses the message 7, to establish, for the F1-like interface, a transmission channel of a Uu interface between the F1-like interface and the RN 1.

Optionally, that the DU establishes, for the F1-like interface, the transmission channel of the Uu interface between the F1-like interface and the RN 1 includes allocating a radio resource, for example, an SRB, a DRB, or an RLC-bearer, used to transmit an F1-like interface message.

Optionally, the DU requests the CU to establish a corresponding F1 interface for the F1-like interface. In this case, that the CU establishes the corresponding F interface for the F1-like interface includes that the CU considers the RN 1 as a DU, and establishes an F1 interface for the RN 1 between the CU and the DU. The DU is responsible for forwarding a message on the F1 interface to the CU or the RN 1.

Optionally, after establishment of the F1-like interface is completed, the RN 1 enables a base station mode. In this way, the RN 1 may send a system message or receive a random access request (Random Access Preamble) message from another node.

In this case, configuration of an IAB function protocol layer of each node in the network is completed.

It should be noted that the RRC message in this embodiment of this application is an RRC message defined in LTE, and this application is also applicable to a message that is defined in another system and that has a different name from the RRC message but has a same or similar function. In addition, the steps in this embodiment may also be separately used. Specifically. S2200 and S2201 are optional, and implementation of this solution does not depend on the foregoing two steps. S2202 to S2206 are used by the DeNB system to perform admission decision on the RN. In particular, when the DeNB system includes a CU and a DU, the CU and the DU may need to jointly perform admission decision on the RN. S2207 and S2208 are used by the DeNB to configure an IAB function for the RN 1. In particular, when the DeNB system includes a CU and a DU, the configuration needs to be performed jointly by the CU and the DU. In addition, a peer IAB function layer of the DU of the RN 1 further needs to be configured. Therefore, S2202 to S2206 and S2207 and S2208 may be applied as two independent processes.

Figure 23:
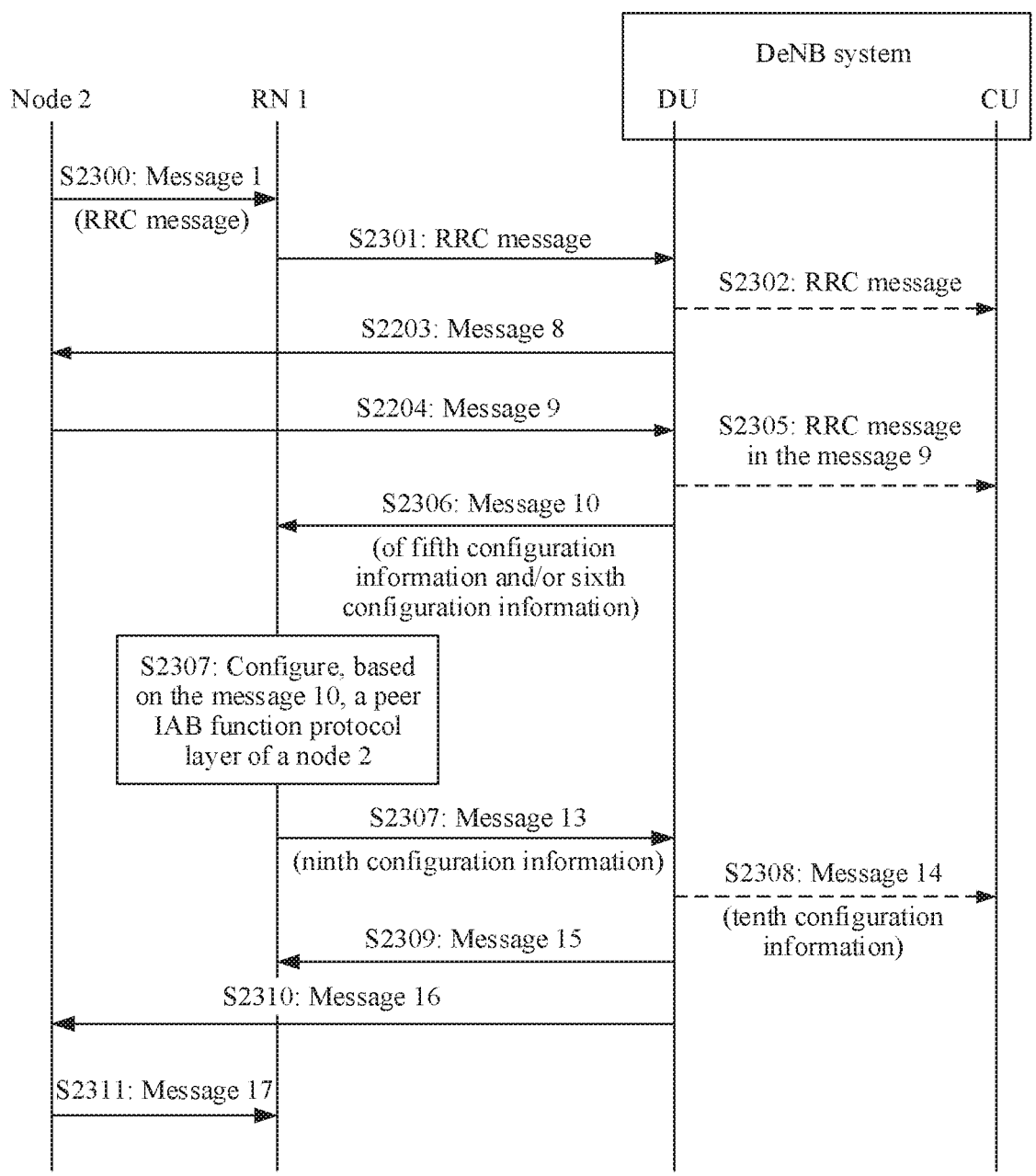
FIG. 23 is a second schematic flowchart for configuring an IAB function protocol layer of each node according to an embodiment of this application.

With reference to FIG. 22, FIG. 23 shows a procedure for configuring an IAB function protocol layer in a scenario in which a node 2 (a terminal or an RN 2) accesses a network through an RN 1.

As shown in FIG. 23, a configuration method includes the following steps.

S2300: After receiving a system message sent by the RN 1, the node 2 sends a message 1 to the RN 1.

For S2300, refer to S2202. Details are not described again herein.

S2301: The RN 1 sends an RRC message in the message 1 to a DeNB system.

Optionally, the RN 1 adds the RRC message in the message 1 to an IAB function protocol layer message, and sends the IAB function protocol layer message to the DeNB system.

Optionally, if the RN 1 determines, in a random access process, that a device initiating access is an RN rather than a common terminal, the RN 1 determines whether access of the node 2 is allowed. If the RN 1 determines that access of the node 2 is not allowed, the RN 1 sends a notification message to the DeNB system through an F1-like interface, to indicate that access of the node 2 is rejected, so that the DeNB system sends, to the node 2, an RRC message used to indicate access rejection.

Optionally, the RN 1 may notify the DeNB that a system rejects access of the node 2 by using an explicit indication or an implicit indication.

S2302 (optional): When the DeNB system includes a CU and a DU, the DU sends, to the CU through an F1 interface, an RRC message received by the DU.

For S2302, refer to the foregoing descriptions for S2203. Details are not described again herein.

S2303: The DeNB system sends a message 8 to the node 2.

The message 8 is used to indicate whether access of the node 2 is allowed.

Optionally, the message 8 may include an RRC connection setup message, an RRC connection resume message, an RRC connection reestablishment message, an RRC connection reject message, an RRC connection resume reject message, or an RRC connection reestablishment reject message.

If the DeNB system includes a CU and a DU, after receiving the RRC message sent by the DU, the CU determines whether an RN requests access to a device, and further determines whether access of the node 2 is allowed, to generate the message 8 indicating that access of the node 2 is allowed or rejected, and sends the message 8 to the node 2 by using the DU and the RN 2.

Specifically, the CU sends the RRC message in the message 8 to the DU through the F1 interface, the DU forwards the RRC message in the message 8 to the RN 1, and the RN 1 sends the RRC message in the message 8 to the node 2.

If the CU determines to allow access of the node 2, the message 8 generated by the CU is used to indicate that access of the node 2 is allowed. In this case, the message 8 may include an RRC connection setup message, an RRC connection resume message, or an RRC connection reestablishment message.

If the CU determines to reject access of the node 2, the CU generates the message 8 used to indicate that access of the node 2 is rejected. In this case, the message 8 may include an RRC connection reject message, an RRC connection resume reject message, or an RRC connection reestablishment Reject message.

S2304: If the message 8 is used to indicate that access of the node 2 is allowed, the node 2 sends a message 9 to the RN/DeNB system.

The message 9 is used to indicate that RRC setup is completed.

The message 9 may include an RRC connection setup complete message, an RRC connection resume complete message, or an RRC connection reestablishment complete message.

Optionally, if the node 2 is the RN 2, the message 9 further includes an identifier of the RN, used to indicate that a device that sends the message is the RN, and is not a common terminal.

If the node 2 sends the message 9 to the RN 1, the RN 1 sends an RRC message in the message 9 to the DeNB system. For a process in which the RN 1 sends the RRC message in the message 9 to the DeNB system, refer to S2205. Details are not described herein again.

S2305 (optional): When the DeNB system includes a CU and a DU, the DU forwards the RRC message in the message 9 to the CU through the F1 interface.

S2306: The DeNB system sends a message 10 including fifth configuration information and/or sixth configuration information to the RN 1, to instruct the RN 1 to perform configuration based on the fifth configuration information and/or the sixth configuration information.

Optionally, when the DeNB system includes a CU and a DU, if the node 2 is the RN 2, after receiving the RRC message in the message 9, the CU sends seventh configuration information to the DU through the F1 interface, and the seventh configuration information is used to instruct the DU to perform configuration of the IAB function protocol layer corresponding to the node 2.

For example, the seventh configuration information includes any one or a combination of the following information associated with the node 2: security configuration information, compression configuration information, and capability information. A manner in which the CU obtains the capability information of the node 2 is similar to a manner in which the CU obtains the capability information of the RN 1, and details are not described herein again.

Optionally, when the DeNB system includes a CU and a DU, if the node 2 is the RN 2, after receiving the RRC message in the message 9, the CU sends fifth configuration information to the DU through the F1 interface, and the fifth configuration information is used to instruct the RN 1 to perform configuration of the IAB function protocol layer corresponding to the node 2.

For example, the fifth configuration information includes any one or a combination of the following information associated with the node 2: security configuration information, compression configuration information, and capability information.

The fifth configuration information and the seventh configuration information may be included in different messages. For example, the fifth configuration information is included in the message 11, and the seventh configuration information is included in the message 12.

Optionally, the message 11 may be included in the message 12. In this way, the fifth configuration information is the same as the seventh configuration information, or the fifth configuration information is a subset of the seventh configuration information. In this case, the message 12 may include only the seventh configuration information.

Optionally, when the DeNB system includes a CU and a DU, the CU may further send eighth configuration information to the DU, and the eighth configuration information is used to indicate QoS information of the node 2 to the DU, so that the DU adjusts and updates, based on a QoS requirement of data of the node 2 carried on a DRB of the RN 1, a PHY/MAC/RLC configuration of the DRB of the RN 1, to trigger the CU to send an RRC reconfiguration message to the RN 1 for reconfiguration.

It should be noted that in this manner, the CU determines how to map the data of the node 2 to the DRB of the RN 1, and sends the QoS requirement (for example, a QoS parameter of the DRB or a QoS parameter of a QoS flow) of the data of the node 2 to the DU, so that the DU determines whether the PHY/MAC/RLC configuration of the DRB of the RN 1 that carries the data of the node 2 needs to be updated.

The eighth configuration information includes any one or a combination of the following information: an RB list of the node 2, QoS information corresponding to a DRB of the node 2, a correspondence between the DRB of the node 2 and the DRB of the RN 1, a QoS flow list of the node 2, QoS information corresponding to a QoS flow of the node 2, and a correspondence between the QoS flow of the node 2 and the DRB of the RN 1. The QoS flow list includes a QoS flow identifier (QFI for short) and/or a DRB identifier of the node 2.

Optionally, the CU may further send sixth configuration information to the DU, to indicate QoS information of the node 2 to the RN 1.

The sixth configuration information includes any one or a combination of the following information: an RB list of the node 2 and QoS information corresponding to a DRB of the node 2.

Optionally, the sixth configuration information may be included in the message 11/message 12.

Specially, the sixth configuration information is a subset of the eighth configuration information. In this case, the CU sends the eighth configuration information to the DU, and the DU generates the sixth configuration information based on the eighth configuration information. The message 11/message 12 may be an F1AP message, or may be a UE context setup request or a UE context modification request message.

Optionally, if the message 12 includes the seventh configuration information and/or the eighth configuration information, and the message 11 includes the fifth configuration information and/or the sixth configuration information, the UE/RN F1AP ID included in the message 12 is used to determine the RN 1, and can be used to instruct the DU to configure an air interface between the DU and the RN 1. The UE/RN F1AP ID included in the message 11 is used to determine the node 2, and can be used to instruct the DU to configure an air interface corresponding to the node 2, and/or forward configuration information to the RN 1, so that the RN 1 configures an air interface between the RN 1 and the node 2.

It should be noted that both the sixth configuration information and the eighth configuration information include the QoS information of the data of the node 2, and the sixth configuration information and the eighth configuration information may not be completely the same. For example, for a latency-associated parameter, if a latency requirement on a RAN side of the node 2 is A, a base station system (for example, a CU and/or a DU) may further decompose the latency requirement A into a latency requirement B that needs to be met when a data packet is carried on the DRB of the RN 1 for transmission and a latency requirement C that needs to be met when a data packet is carried on a DRB of UE for transmission, the latency requirement B is included in the seventh configuration information, and the latency requirement C is included in the eighth configuration information.

It should be noted that if the node 2 is a terminal, the CU does not need to send the fifth configuration information and the seventh configuration information to the DU. If the node 2 is an RN, and the AB function protocol layer is hop-by-hop, the DU does not need to configure the IAB function protocol layer corresponding to the node 2, and the RN 1 needs to configure the IAB function protocol layer corresponding to the node 2. In other words, the CU does not need to send the seventh configuration information, but needs to send the fifth configuration information. If the IAB function protocol layer is end-to-end, to be specific, when the CU sends an IAB function protocol layer message to the node 2, the RN 1 does not need to process (for example, perform security protection/encryption on) the message. Therefore, the CU does not need to send the fifth configuration information to the RN 1.

Optionally, the DU obtains the fifth configuration information and/or the sixth configuration information based on the message 11, to generate a message 10. Alternatively, the DU receives the message 12, and processes the message 12 (for example, changes the UE/RN F1AP ID of the F1 interface to an identifier, indicating the node 2, on the F1-like interface, compresses all or some information in the message 12, and performs security protection on all or some information in the message 12, in other words, performs security protection on all or some information in the message 12 based on an encryption algorithm and/or an integrity protection algorithm).

S2307 (optional): If the network architecture is a hop-by-hop architecture, and the node 2 is the RN 2, the RN 1 configures, based on the message 10, the peer IAB function protocol layer of the node 2, and sends a message 13 including ninth configuration information to the DeNB system, to indicate a configuration parameter associated with the node 2 in the DeNB system, so that the DeNB system generates a corresponding configuration message (for example, an RRC message) and sends the configuration message to the RN 1.

The ninth configuration information includes any one or a combination of the following information: security configuration information, compression configuration information, an RB list of the node 2, and a PHY/MAC/RLC configuration corresponding to an RB.

The message 13 may be an F1AP-like message, or may be a message having a function similar to that of a UE context setup response message or a UE context modification response message.

S2308: When the DeNB system includes a CU and a DU, the DU sends a message 14 including tenth configuration information to the CU, to indicate a configuration parameter associated with the node 2 to the CU, so that the CU generates a corresponding configuration message (for example, an RRC message) and sends the corresponding configuration message to the node 2.

The tenth configuration information includes any one or a combination of the following information: security configuration information, compression configuration information, an RB list of the node 2, and a PHY/MAC/RLC configuration corresponding to an RB.

Optionally, the DU sends eleventh configuration information to the CU, and the eleventh configuration information includes any one or a combination of the following information: an RB list of the RN 1 and a PHY/MAC/RLC configuration corresponding to the RB, and is used to instruct the CU to generate a reconfiguration message sent to the RN 1 and change a configuration of the RB of the RN 1.

Optionally, the eleventh configuration information may be included in a message 13/message 14.

The message 13/message 14 may be an F1AP message, or may be a UE context setup response message or a UE context modification response message. In this case, a UE/RN F1AP ID in the message 13 is used to determine the node 2, and is used to indicate configuration information of the CU associated with the node 2. A UE/RN F1AP ID in the message 14 is used to determine the RN 1, and is used to indicate configuration information of the CU associated with the RN 1.

When the node 2 is an RN, an IAB function protocol layer needs to be configured for the node 2. A security configuration and/or a compression configuration in the IAB function protocol layer may be determined by the CU (this is applicable to an end-to-end architecture, and the CU is a centralized decision anchor), or determined by the DU (applicable to an end-to-end architecture), or determined by the CU and the DU through negotiation, or determined by the RN 1 (applicable to a hop-by-hop architecture), or determined by the CU and the RN 1 through negotiation, or determined by the DU and the RN 1 through negotiation, or determined by the CU, the DU, and the RN 1 through negotiation.

In the several manners of determining through negotiation, a key may be determined by the CU or the DU, and an algorithm may be determined by the RN 1. A security configuration and/or compression configuration manner may be implemented by sending the message 10, the message 11, the message 12, the message 13, and the message 14 among the CU, the DU, and the RN 1.

It should be noted that in this embodiment of this application, in a process in which S2306 to S2308 may be first performed, specific configuration information may be sent in a plurality of sequences. For example, the specific configuration information is sent in the sequences described in the foregoing steps, or the DU first sends the eleventh configuration information to the CU and then sends the fifth configuration information/the sixth configuration information to the RN 1. This is not specifically limited in this embodiment of this application.

S2309: The DeNB system sends a message 15 to the RN 1.

The message 15 includes one or a combination of the following information: a configuration (for example, security configuration information and compression configuration information) of an IAB function protocol layer corresponding to the node 2, an RB list of the RN 1, a PHY/MAC/RLC configuration of an RB, a PDCP configuration of the RB, and QoS information of a DRB.

The message 15 may include an RRC connection reconfiguration message or an RRC reconfiguration message.

Optionally, after receiving the message, the RN 1 applies a new configuration, and replies with a configuration completion response message.

S2310: The DeNB system sends a message 16 to the node 2.

The message 16 includes one or a combination of the following information: a configuration of an IAB function protocol layer (if the node 2 is an RN, an information element appears; otherwise, the information element does not appear), an RN mode activation indication (if the node 2 is an RN, the information element appears; otherwise, the information element does not appear), an RB list of the node 2, a PHY/MAC/RLC configuration of an RB, a PDCP configuration of the RB, and QoS information of a DRB.

The message 16 may be an RRC connection reconfiguration message or an RRC reconfiguration message.

Optionally, after receiving the message, the node 2 applies a new configuration, and replies with a configuration completion response message.

It should be noted that in this embodiment of this application, S2309 may be performed before S2310, or S2310 may be performed before S2309. This is not specifically limited in this embodiment of this application.

S2311 (optional): If the node 2 is the RN 2, the node 2 sends a message 17 to the RN 1, to request to establish an F1-like interface.

If the message 17 is an RRC message, the RN 1 does not parse the message 17, but sends the message 17 to the DeNB system through an F1-like interface. After receiving the message 17, the DeNB system performs processing similar to that on the message 7 in the embodiment shown in FIG. 22. To be specific, the DU sends the message 17 to the CU through the F1 interface. After receiving the message 17, the CU establishes a corresponding F1 interface for the F1-like interface, and enables the DU to establish, for the F1-like interface, a transmission channel of a Uu interface between the F1-like interface and the RN 1.

If the message 17 is an IAB function protocol layer/MAC layer/RLC layer/PHY message, the RN 1 parses the message 17, to establish, for the F1-like interface, a transmission channel of a Uu interface between the F1-like interface and the node 2. Optionally, the DU requests the CU to establish a corresponding F1 interface for the F1-like interface. Optionally, that the DU establishes, for the F1-like interface, the transmission channel of the Uu interface between the F1-like interface and the RN 1 includes: allocating a radio resource used to transmit an F1-like interface message, for example, an SRB, a DRB, or an RLC-bearer. Optionally, that the CU establishes the corresponding F1 interface for the F1-like interface includes that the CU considers the RN 1 as a DU, and establishes an F1 interface for the RN 1 between the CU and the DU. The DU is responsible for forwarding a message on the F1 interface to the CU or the RN 1.

Further, after establishment of the F1-like interface is completed, the node 2 enables a base station mode. In this way, the node 2 may send a system message or receive a random access request (Random Access Preamble) message from another node.

In this case, configuration of an IAB function protocol layer of each node in the network is completed.

In addition, the steps in this embodiment may also be separately used. Specifically, S2300 to S2305 are used by the DeNB system/RN 1 to perform admission decision on access of the RN. In particular, when the DeNB system includes a CU and a DU, the CU and the DU may need to jointly perform admission decision on the RN. S2306 to S2311 are used by the DeNB to configure the node 2. In particular, when the DeNB system includes a CU and a DU and the node 2 is an RN, the configuration needs to be performed jointly by the CU and the DU. In addition, a peer IAB function layer of the node 2 on the DU and/or the RN 1 further needs to be configured. Therefore, S2300 to S2305 and S2306 to S2311 may be applied as two independent processes.

Figure 24:
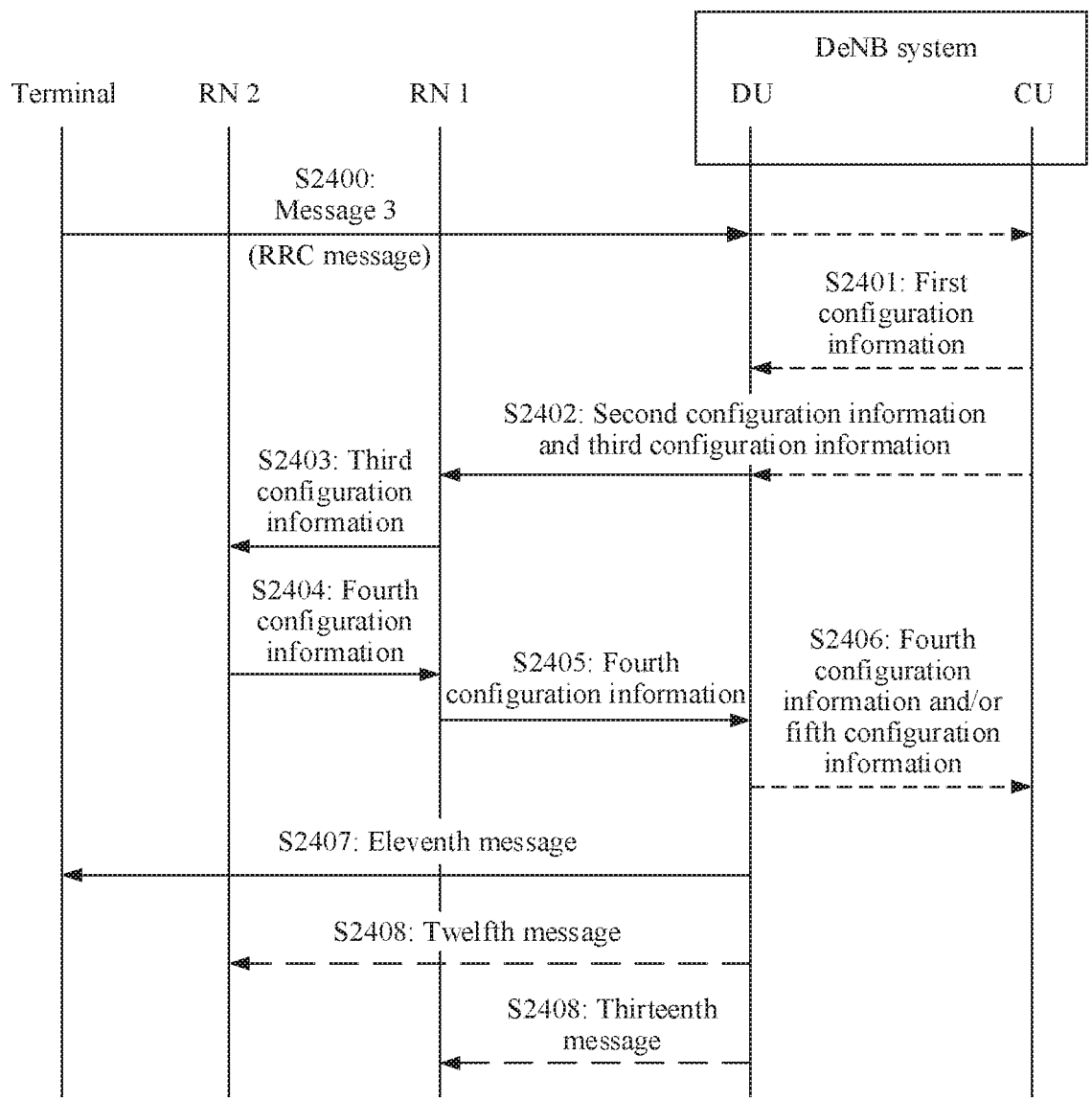
FIG. 24 is a third schematic flowchart for configuring an IAB function protocol layer of each node according to an embodiment of this application.

Further, with reference to FIG. 23, FIG. 24 shows a procedure for configuring an IAB function protocol layer in a scenario in which the node 2 is an RN 2, and a terminal accesses a network through the RN 2 and an RN 1.

As shown in FIG. 24, a configuration method includes the following steps.

S2400: The terminal establishes an RRC connection with a DeNB system by using the RN 2 and the RN 1.

Specifically, the terminal sends a message 3 to the RN 2, the RN 2 sends an RRC message included in the message 3 to the RN 1, and the RN 1 sends the RRC message to the DeNB system.

S2401 (optional): When the DeNB system includes a CU and a DU, the CU sends first configuration information to the DU, to notify the DU of UE-associated QoS information, so that the DU updates a PHY/MAC/RLC configuration of a DRB of the RN 1 based on a QoS requirement of the terminal.

The DU adjusts and updates the PHY/MAC/RLC configuration of the DRB of the RN 1 based on a QoS requirement of data of the terminal carried on the DRB of the RN 1, to trigger the CU to send an RRC reconfiguration message to the RN 1 for reconfiguration.

It should be noted that in this manner, the CU determines how to map the data of the terminal to the DRB of the RN 1, and sends the QoS requirement (for example, a QoS parameter of the DRB or a QoS parameter of a QoS flow) of the data of the terminal to the DU, so that the DU determines whether to update the PHY/MAC/RLC configuration of the DRB of the RN 1 that carries the data of the terminal.

The first configuration information includes any one or a combination of the following information: an RB list of the terminal, QoS information corresponding to a DRB of the terminal, a correspondence between the DRB of the terminal and a DRB of the RN 1, a QoS flow list of the terminal, QoS information corresponding to a QoS flow of the terminal, and a correspondence between the QoS flow of the terminal and the DRB of the RN 1.

Optionally, the CU sends second configuration information to the DU through an F1 interface, to indicate the QoS information of the terminal of the RN 1, so that the RN 1 updates a PHY/MAC/RLC configuration of a DRB of the RN 2 based on the QoS requirement of the terminal. The RN adjusts and updates the PHY/MAC/RLC configuration of the DRB of the RN 2 based on the QoS requirement of the data of the terminal carried on the DRB of the RN 2, to trigger the CU to send an RRC reconfiguration message to the RN 2 for reconfiguration.

It should be noted that in this manner, the CU determines how to map the data of the terminal to the DRB of the RN 2, and send the QoS requirement (for example, a QoS parameter of the DRB or a QoS parameter of a QoS flow) of the data of the terminal to the DU, so that the DU forwards the QoS requirement to the RN 1, and the RN 1 determines whether to update the PHY/MAC/RLC configuration of the RN 2 that carries the data of the terminal.

The second configuration information includes any one or a combination of the following information: an RB list of the terminal, QoS information corresponding to a DRB of the terminal, a correspondence between the DRB of the terminal and a DRB of the RN 2, a QoS flow list of the terminal, QoS information corresponding to a QoS flow of the terminal, and a correspondence between the QoS flow of the terminal and the DRB of the RN 2.

Optionally, the CU sends third configuration information to the DU through the F1 interface, to indicate the QoS information of the terminal of the RN 2, so that the RN 2 provides a PHY/MAC/RLC configuration parameter of a DRB of UE based on the QoS requirement of the terminal, so that the CU sends the configuration parameter to the UE by using the RRC reconfiguration message.

It should be noted that in this manner, the CU determines how to map the data of the terminal to the DRB of the terminal, and sends the QoS requirement (for example, a QoS parameter of the DRB or a QoS parameter of a QoS flow) of the data of the terminal to the DU, so that the DU forwards the QoS requirement to the RN 1, the RN 1 further forwards the QoS requirement to the RN 2, and the RN 2 determines whether to update the PHY/MAC/RLC configuration of the DRB of the RN 2 that carries the data of the terminal.

The third configuration information includes any one or any combination of a plurality of pieces of the following information: an RB list of the terminal, QoS information corresponding to a DRB of the terminal, a QoS flow list of the terminal, and QoS information corresponding to a QoS flow of the terminal.

Herein, the first configuration information, the second configuration information, and the third configuration information may be separately included in a first message, a second message, and a third message.

In this embodiment, the first message, the second message, and the third message may be F1AP messages. UE/RN F1AP IDs in the messages may be used to determine the RN 1, the RN 2, and the terminal separately, and is used by the DU to determine and parse the first message, and update a configuration of the DRB of the RN 1 based on the first configuration information in the first message. After determining that content of the second message is associated with the RN 2, the DU forwards the content of the second message to the RN 1 for processing. Likewise, after determining that content of the third message is associated with the UE, the DU forwards the content of the third message to the RN 1, so that the RN 1 forwards the content of the third message to the RN 2 for processing.

Optionally, the first configuration information, the second configuration information, and the third configuration information may be located in the first message. After receiving the first message, the DU applies the first configuration information, and sends the second configuration information and the third configuration information to the RN 1.

Specially, the second configuration information and/or the third configuration information may be subnets/a subset of the first configuration information, and the DU obtains the second configuration information and/or the third configuration information based on the first configuration information. For example, the first message/the second message/the third message may be a UE context setup request message or a UE context modification request message.

It should be noted that the first configuration information, the second configuration information, and the third configuration information each include the QoS requirement of the data of the terminal, and may not be completely the same. For example, for a latency-associated parameter, if a latency requirement on a RAN side of the terminal is A, the DeNB system (for example, a CU and/or a DU) may further decompose the latency requirement A into a latency requirement B that needs to be met when a data packet is carried on the DRB of the RN 1 for transmission, a latency requirement C that needs to be met when a data packet is carried on the DRB of the RN 2 for transmission, and a latency requirement D that needs to be met when a data packet is carried on a DRB of UE for transmission, the latency requirement B is included in the first configuration information, the latency requirement C is included in the second configuration information, and the latency requirement D is included in the third configuration information.

S2402: The DeNB system sends the second configuration information and the third configuration information to the RN 1, so that the RN 1 parses the second configuration information and determines whether to change a configuration of the DRB of the RN 2. If the configuration of the DRB of the RN 2 needs to be changed, the RN 1 communicates with the DeNB system, so that the DeNB system sends a new configuration to the RN 2 through the RN 1.

Optionally, the second configuration information and the third configuration information may be respectively included in a fourth message and a fifth message. For example, the fourth message and the fifth message may be F1AP-like messages, and UE/RN IDs carried in the fourth message and the fifth message are used to identify the RN 2 and the UE separately, so that the RN 1 may learn that the second configuration information is a configuration associated with the RN 2, to perform parsing and processing, and so that the RN 1 learns that the third configuration information is associated with the UE, and the third configuration information needs to be forwarded to the RN 2 for processing.

Optionally, the second configuration information and the third configuration information may be included in the fourth message. The RN 1 obtains the third configuration information from the fourth message, and sends the third configuration information to the RN 2. Specially, the third configuration information is included in the second configuration information, and the RN 1 obtains the third configuration information from the second configuration information.

S2403: The RN 1 sends the third configuration information to the RN 2, and the RN 2 determines a PHY/MAC/RLC configuration parameter of the DRB of the terminal based on the third configuration information.

Optionally, the third configuration information is included in an F1AP-like message, and a UE ID carried in the F1AP-like message is used to identify the UE, so that the RN 2 can learn that the third configuration information is associated with the UE served by the RN 2, and parses and processes the third configuration information.

S2404: The RN 2 sends fourth configuration information to the RN 1, where the fourth configuration information includes an RB list of the terminal and a PHY/MAC/RLC configuration corresponding to the RB.

For example, the fourth configuration information may be included in an F1AP-like message similar to a UE context setup response message or a UE context modification response message.

S2405: The RN 1 sends, to the DeNB system, the fourth configuration information sent by the RN 2.

Optionally, the RN 1 further sends fifth configuration information to the DeNB system, and the fifth configuration information carries an RB list of the RN 2 and a PHY/MAC/RLC configuration corresponding to the RB, so that the DeNB system sends the updated RB configuration to the RN 2 by using the RN 1.

Optionally, the fourth configuration information and the fifth configuration information may be included in different messages, for example, a sixth message and a seventh message. For example, the sixth message and the seventh message may be F1AP-like messages, and UE/RN IDs carried in the sixth message and the seventh message are used to determine the UE and the RN 2 separately, and are used by the DeNB system to learn that the two types of configuration information are sent to the terminal and the RN 2 separately.

The fourth configuration information and the fifth configuration information may be included in a same message, for example, the sixth message. For example, the sixth message/the seventh message may be an F1AP-like message, and further may be an F1AP-like message similar to a UE context setup response message or a UE context modification response message.

S2406 (optional): When the DeNB system includes a CU and a DU, the DU sends the fourth configuration information and/or the fifth configuration information to the CU.

Optionally, the DU sends sixth configuration information to the CU, and the sixth configuration information carries an RB list of the RN 1 and a PHY/MAC/RLC configuration corresponding to the RB, so that the CU sends the updated RB configuration to the RN 1.

Optionally, the fourth configuration information, the fifth configuration information, and the sixth configuration information may be included in different messages, for example, an eighth message, a ninth message, and a tenth message. For example, the eighth message, the ninth message, and the tenth message may be F1AP messages, and UE/RN F1AP IDs carried in the eighth message, the ninth message, and the tenth message are used to determine the UE, the RN 2, and the RN 1 separately, and are used by the DeNB system to learn that the configuration information is sent to the UE, the RN 2, and the RN 1 separately.

The fourth configuration information, the fifth configuration information, and the sixth configuration information may be included in a same message, for example, the eighth message. For example, the eighth message, the ninth message, and the tenth message may be F1AP-like messages similar to a UE context setup response message or a UE context modification response message.

S2407: The DeNB system sends an eleventh message to the terminal based on the fourth configuration information.

The eleventh message includes any one or any combination of a plurality of pieces of the following information: an RB list of the terminal, a PHY/MAC/RLC configuration of an RB, a PDCP configuration of the RB, and QoS information of a DRB. For example, the eleventh message is an RRC message, and may further be an RRC connection reconfiguration message or an RRC reconfiguration message.

Optionally, after receiving the message, the terminal applies a new configuration, and replies with a configuration completion response message.

The eleventh message needs to be sent by the DeNB system to the RN 1, sent by the RN 1 to the RN 2, and then sent by the RN 2 to the terminal. This process is the same as that in which the DeNB system sends an RRC message to the terminal. Details are not described herein again.

Similarly, the response message replied by the terminal also needs to be received by the RN 2 and then sent to the RN 1, and then sent by the RN 1 to the DeNB system. Details are not described herein again.

S2408 (optional): When a configuration of the RB of the RN 2 needs to be updated, the DeNB system sends a twelfth message to the RN 2 based on the fifth configuration information.

The twelfth message includes any one or any combination of a plurality of pieces of the following information: an RB list of the RN 2, a PHY/MAC/RLC configuration of an RB, a PDCP configuration of the RB, and QoS information of a DRB.

For example, the twelfth message is an RRC message, and may further be an RRC connection reconfiguration message or an RRC reconfiguration message.

Optionally, after receiving the message, the RN 2 applies a new configuration, and replies with a configuration completion response message. The twelfth message needs to be sent by the DeNB system to the RN 1 and sent by the RN 1 to the RN 2. This process is the same as that in which the DeNB system sends an RRC message to the RN 2. Details are not described herein again.

Similarly, the response message replied by the RN 2 also needs to be received by the RN 1 and then sent to the DeNB system. Details are not described herein again.

S2409 (optional): When a configuration of the RB of the RN 1 needs to be updated, the DeNB system sends a thirteenth message to the RN 1 based on the seventh configuration information.

The thirteenth message includes any one or any combination of a plurality of pieces of the following information: an RB list of the RN 1, a PHY/MAC/RLC configuration of an RB, a PDCP configuration of the RB, and QoS information of a DRB. For example, the thirteenth message is an RRC message, and may further be an RRC connection reconfiguration message or an RRC reconfiguration message.

Optionally, after receiving the message, the RN 1 applies a new configuration, and replies with a configuration completion response message.

When the DeNB system includes a CU and a DU, the thirteenth message needs to be sent by the CU of the DeNB system to the DU and sent by the DU to the RN 1. This process is the same as that in which the DeNB system sends an RRC message to the RN 1. Details are not described herein again.

Similarly, the response message replied by the RN 1 also needs to be received by the DU and then sent to the CU. Details are not described herein again.

It should be noted that an execution sequence of S2407, S2408, and S2409 is not limited in this embodiment of this application. In addition, a sending sequence of specific configuration information in steps S2400 to S2406 is not limited in this application. For example, the execution may be performed according to a sequence described in the foregoing steps. Alternatively, the DU first sends the sixth configuration information to the CU, and then sends the second configuration information/the third configuration information to the RN 1. The RN 1 first sends the fifth configuration information to the DU, and then sends the third configuration information to the RN 2.

The RN 1 is equivalent to the RN 71 in FIG. 7, and the RN 2 is equivalent to the RN 72 in FIG. 7.

After an IAB function protocol layer of each node is configured, each node in the communications system may transmit data based on the IAB function protocol layer of the node.

A data transmission method according to an embodiment of this application is described herein.

Figure 25:
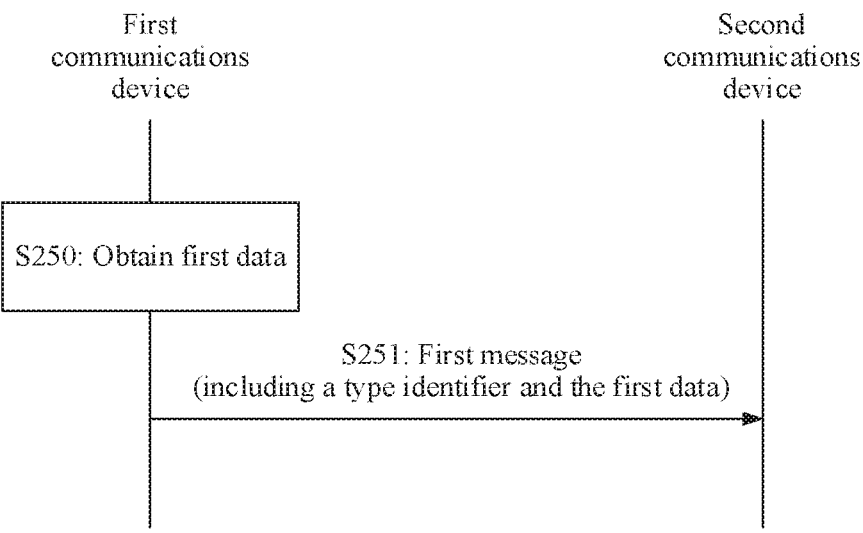
FIG. 25 is a first schematic flowchart of a data transmission method according to an embodiment of this application.

Specifically, with reference to the communications system shown in FIG. 7, as shown in FIG. 25, the data transmission method provided in this embodiment of this application includes the following steps.

S250: A first communications device obtains first data.

S251: The first communications device sends a first message including a type identifier and the first data to a second communications device.

The first communications device herein is an intermediate forwarding node, a serving node of a terminal, a DeNB, or a DU in a DeNB system.

If the first communications device is the intermediate forwarding node, the second communications device is a previous-hop device or a next-hop device of the intermediate forwarding node. For example, if the first communications device is an RN 71, the second communications device is an RN 72 or a DU 730.

If the first communications device is the serving node of the terminal, the second communications device is a previous-hop device of the serving node of the terminal. For example, if the first communications device is an RN 72, the second communications device is an RN 71.

If the first communications device is the DeNB or the DU, the second communications device is a next-hop device of the first communications device.

The type of the first data is user plane data, a status report, a control plane message, and an RRC message of the terminal.

It can be learned with reference to the foregoing descriptions that if the first data is the user plane data, the first message includes first indication information and a global SN of the user plane data.

If the first data is the status report, the first data includes the global SN of the user plane data carried over the DRB of the terminal, the first data is used to indicate a transmission status of a DRB data packet of a third communications device, and the third communications device is the terminal, the intermediate forwarding node, or the serving node of the terminal.

If the first data is the control plane message, the first message includes at least one of transport layer protocol layer information of a first interface, second indication information, an identifier of the terminal on the first interface, and third indication information. Herein, the first interface is a logical communications interface between the first communications device and the second communications device, that is, the F1-like interface. Different from a logical communications interface, a physical interface may be an air interface, for example, a Un interface. The transport layer protocol layer information of the first interface includes at least one of an IP address of the first communications device, an IP address of the second communications device, an IP address of the DeNB or the DU, a port number of the first communications device, a port number of the second communications device, a port number of the DeNB or the DU, an SCTP stream identifier, and an SCTP PPI, the second indication information is used to indicate the first communications device, and the third indication information is used to indicate the first interface; or the first message includes at least one of fourth indication information and an identifier of the serving node of the terminal, and the fourth indication information is used to indicate the terminal.

With reference to the function description of the IAB function protocol layer, it can be learned that if the first data is the status report, the first data further includes fifth indication information used to indicate the DRB of the terminal. If the third communications device is the intermediate forwarding node or the serving node of the terminal, the first data specifically includes the fifth indication information carried over each DRB in at least one DRB of the third communications device.

Regardless of the type of the first data, the first message in this embodiment of this application further includes at least one of a target identifier and sixth indication information used to indicate the terminal. The target identifier is used to indicate the serving node of the terminal.

For the first indication information, the second indication information, the third indication information, the fourth indication information, the fifth indication information, and the sixth indication information, refer to the foregoing descriptions. Details are not described herein again.

Specifically, if the first data is the control plane message, and when the first message includes the identifier of the terminal on the first interface or the fourth indication information, a method for obtaining the first data by the first communications device includes: receiving, by the first communications device, a second message including second data, where the second data includes seventh indication information, and the seventh indication information is used to indicate the terminal or the DRB of the terminal: and obtaining, by the first communications device, the second data and replacing the seventh indication information with the identifier of the terminal on the first interface or the fourth indication information, to generate the first data. After generating the first data, the first communications device generates the first message, and sends the first message to the second communications device. It can be learned that in this process, the first communications device essentially replaces the seventh indication information with the identifier on the first interface or the fourth indication information.

It should be noted that, if the first communications device is the serving node of the terminal, the method for obtaining the first data by the first communications device is applicable to an uplink transmission process. If the first communications device is the DeNB or the DU in the DeNB system, the method for obtaining the first data by the first communications device is applicable to a downlink transmission process. If the first communications device is the intermediate forwarding node, the method for obtaining the first data by the first communications device is applicable to both an uplink transmission process and a downlink transmission process.

Optionally, after obtaining the first data, the first communications device further compresses the first data or sub-information in the first data based on a first preset compression algorithm. In this way, the first communications device sends the first message including the compressed first data to the second communications device.

The sub-information includes at least one of an IP header, an SCTP common header, and information other than target information in an SCTP data chunk, and the target information is at least one of data, the stream identifier, and the PPI; or the sub-information includes at least one of an IP header, a UDP header, and information other than a TEID in a GTP header.

It should be noted that, if the first communications device is the serving node of the terminal, the compression method is applicable to an uplink transmission process. If the first communications device is the DeNB or the DU in the DeNB system, the compression method is applicable to a downlink transmission process. If the first communications device is the intermediate forwarding node, the compression method is applicable to both an uplink transmission process and a downlink transmission process.

If the first communications device is the intermediate forwarding node, the method for obtaining the first data by the first communications device includes: receiving, by the first communications device, a third message sent by a fourth communications device, where the third message includes the second data: and obtaining, by the first communications device, the second data from the third message and decompressing the second data based on a second preset compression algorithm, to obtain the first data. If the second communications device is a previous-hop device of the first communications device, the fourth communications device is the next-hop device of the first communications device. If the second communications device is the next-hop device of the first communications device, the fourth communications device is a previous-hop device of the first communications device.

If the first communications device is the serving node of the terminal, the first communications device further receives a fourth message sent by the second communications device, where the fourth message includes third data; and the first communications device decompresses the third data based on a third preset compression algorithm, and sends the decompressed third data to the terminal.

If the first communications device is the DU, the first communications device further receives a fifth message sent by the second communications device, where the fifth message includes fourth data; and the first communications device decompresses the fourth data based on a fourth preset compression algorithm, and sends the decompressed fourth data to a CU in the DeNB system.

If the first communications device is the DU, the method for obtaining the first data by the first communications device includes: receiving, by the first communications device, a sixth message that is sent by the CU and that includes fifth data; and obtaining, by the first communications device, the fifth data from the sixth message and decompressing the fifth data based on a fifth preset compression algorithm, to obtain the first data.

Optionally, after obtaining the first data, the first communications device further processes the first data based on a first preset key and a first preset target algorithm, and sends the first message including the processed first data to the second communications device.

The first preset target algorithm includes at least one of a preset encryption algorithm and a first preset integrity protection algorithm. Therefore, a process in which the first communications device processes the first data based on the first preset key and the first preset target algorithm is essentially performing security protection on the first data.

It should be noted that, if the first communications device is the serving node of the terminal, the security protection method is applicable to an uplink transmission process. If the first communications device is the DeNB or the DU in the DeNB system, the security protection method is applicable to a downlink transmission process. If the first communications device is the intermediate forwarding node, the security protection method is applicable to both an uplink transmission process and a downlink transmission process.

If the first communications device is the intermediate forwarding node, the method for obtaining the first data by the first communications device includes: receiving a seventh message sent by a fifth communications device, where the seventh message includes sixth data; and obtaining the sixth data, and processing the sixth data based on a second preset key and a second preset target algorithm, to obtain the first data.

The second preset target algorithm includes at least one of a first preset decryption algorithm and a second preset integrity protection algorithm.

It may be understood that if the second communications device is the previous-hop device of the first communications device, the fifth communications device is the next-hop device of the first communications device. If the second communications device is the next-hop device of the first communications device, the fifth communications device is the previous-hop device of the first communications device.

If the first communications device is the serving node of the terminal, the first communications device further receives an eighth message sent by the second communications device, where the eighth message includes seventh data: the first communications device obtains the seventh data and processes the seventh data based on a third preset key and a third preset target algorithm: and the first communications device sends the processed seventh data to the terminal.

The third preset target algorithm includes at least one of a second preset decryption algorithm and a third preset integrity protection algorithm.

If the first communications device is the DU, the first communications device further receives a ninth message sent by the second communications device, where the ninth message includes eighth data; the first communications device obtains the eighth data and processes the eighth data based on a fourth preset key and a fourth preset target algorithm: and the first communications device sends the processed eighth data to the CU in the DeNB system.

The fourth preset target algorithm includes at least one of a third preset decryption algorithm and a fourth preset integrity protection algorithm.

For the communication system shown in FIG. 7, the embodiment described in FIG. 25 describes a method for transmitting data by the intermediate forwarding point in an uplink/downlink data transmission process, a method for transmitting data by the serving node of the terminal in an uplink/downlink data transmission process, and a method for transmitting data by the DeNB system in a downlink data transmission process.

The following describes a method for transmitting data by the DeNB in an uplink data transmission process.

Figure 26:
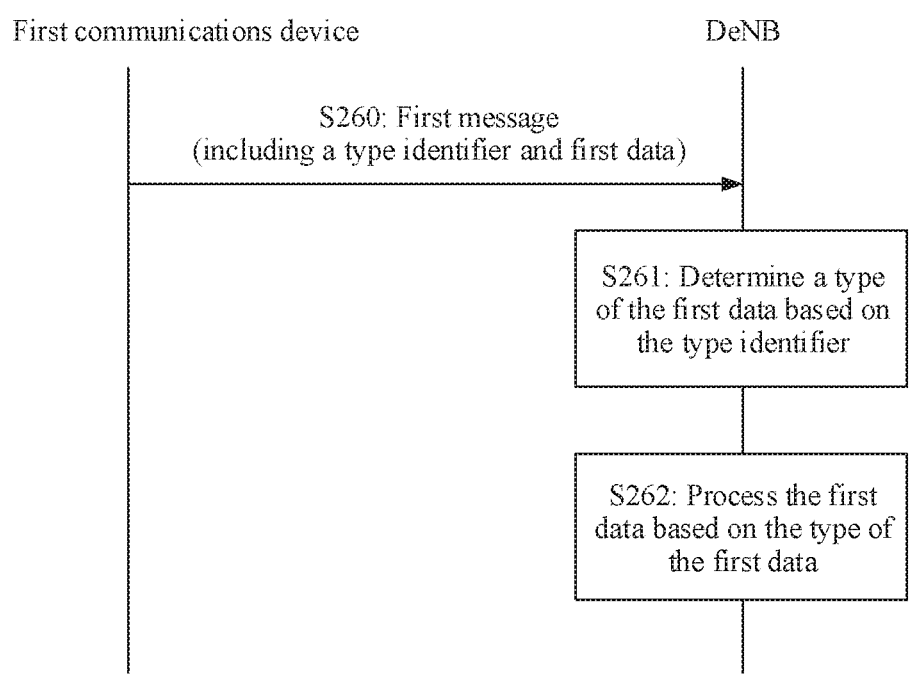
FIG. 26 is a second schematic flowchart of a data transmission method according to an embodiment of this application.

Specifically, with reference to the communications system shown in FIG. 7, as shown in FIG. 26, the data transmission method provided in this embodiment of this application includes the following steps.

S260: The DeNB receives a first message that is sent by a first communications device and that includes first data and a type identifier.

The type identifier is used to indicate a type of the first data. The type of the first data includes at least one of user plane data, a status report, a control plane message, and an RRC message of a terminal.

S261: The DeNB determines the type of the first data based on the type identifier.

S262: The DeNB processes the first data based on the type of the first data.

The first message in this embodiment is the same as the foregoing first message. Details are not described herein again.

If the first data is the status report, a method for processing the first data by the DeNB includes: sending, by the DeNB to a second communications device based on the first data, a DRB data packet of the second communications device that is not successfully received as indicated by the first data.

Optionally, before S262, the DeNB further receives sixth indication information sent by the first communications device or a third communications device, where the sixth indication information is used to instruct to send, to the second communications device by using the third communications device, the DRB data packet of the second communications device that is not successfully received as indicated by the first data. In this way, the method for processing the first data by the DeNB includes: sending, by the DeNB to the second communications device based on the first data and through the third communications device, the DRB data packet of the second communications device that is not successfully received as indicated by the first data.

In conclusion, for different types of data, in the data transmission method provided in this embodiment of this application, a unified message format is used for transmission. In this way, a time for each node in a multi-hop relay network to process a message in the format can be effectively reduced.

An embodiment of this application provides a data transmission apparatus 300. The data transmission apparatus 300 is a first communications device or a chip in the first communications device. The first communications device is an intermediate forwarding node, a serving node of a terminal, a DeNB, or a DU in a DeNB system. The data transmission apparatus 300 is configured to perform the steps performed by the first communications device in the foregoing data transmission method. The data transmission apparatus 300 provided in this embodiment of this application may include modules corresponding to corresponding steps.

In this embodiment of this application, the data transmission apparatus 300 may be divided into functional modules based on the foregoing method examples. For example, functional modules may be obtained through division based on corresponding functions, or at least two functions may be integrated into one processing module. The integrated module may be implemented in a form of hardware, or may be implemented in a form of a software functional module. In this embodiment of this application, module division is an example, and is merely a logical function division. In an actual implementation, another division manner may be used.

Figure 27:
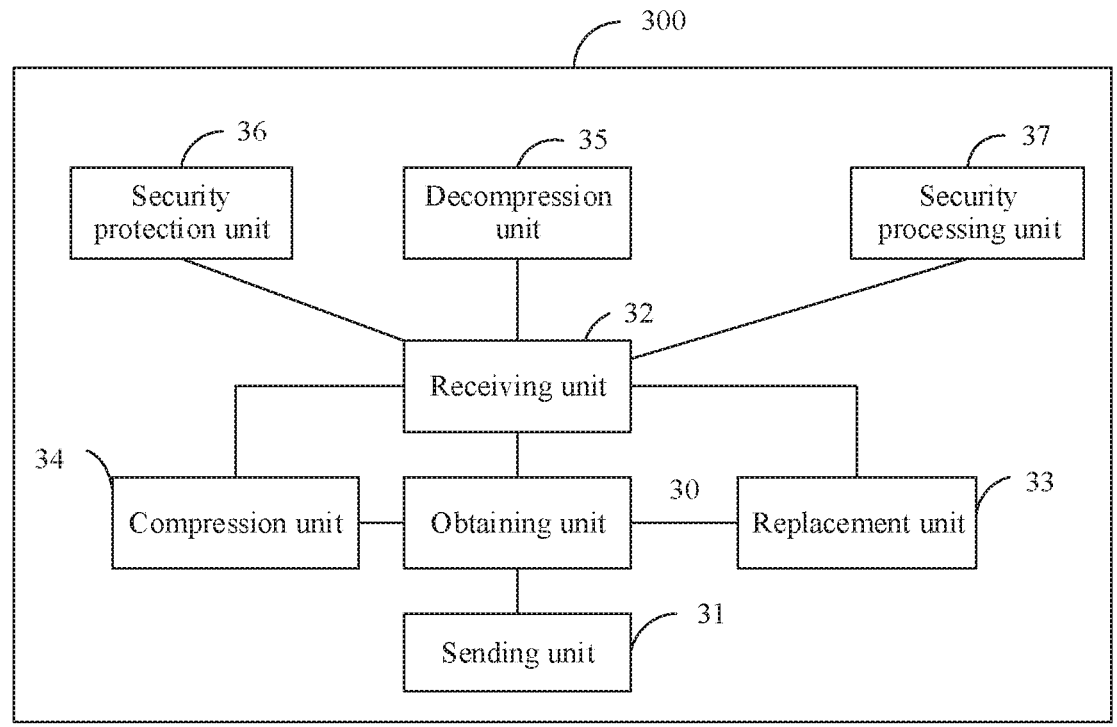
FIG. 27 is a first schematic structural diagram of a data transmission apparatus according to an embodiment of this application.

When the functional modules are obtained through division based on the corresponding functions, FIG. 27 is a possible schematic structural diagram of the data transmission apparatus 300. As shown in FIG. 27, the data transmission apparatus 30) includes an obtaining unit 30, a sending unit 31, a receiving unit 32, a replacement unit 33, a compression unit 34, a decompression unit 35, a security protection unit 36, and a security processing unit 37. The obtaining unit 30 is configured to support the data transmission apparatus 300 in performing S250 in the foregoing embodiment, and/or is configured to perform another process of the technology described in this specification. The sending unit 31 is configured to support the data transmission apparatus 300 in performing S251 in the foregoing embodiment, and/or is configured to perform another process of the technology described in this specification. The receiving unit 32 is configured to support the data transmission apparatus 300 in "receiving a second message including second data", and/or is configured to perform another process of the technology described in this specification. The replacement unit 33 is configured to support the data transmission apparatus 300 in "replacing seventh indication information with an identifier of the terminal on a first interface or fourth indication information", and/or is configured to perform another process of the technology described in this specification. The compression unit 34 is configured to support the data transmission apparatus 300 in "compressing sub-information in the first data based on a first preset compression algorithm", and/or is configured to perform another process of the technology described in this specification. The decompression unit 35 is configured to support the data transmission apparatus 300 in "decompressing the second data based on a second preset compression algorithm" and/or is configured to perform another process of the technology described in this specification. The security protection unit 36 is configured to support the data transmission apparatus 300 in "processing the first data based on a first preset key and a first preset target algorithm", and/or is configured to perform another process of the technology described in this specification. The security processing unit 37 is configured to support the data transmission apparatus 300 in "processing obtained seventh data based on a third preset key and a third preset target algorithm", and/or is configured to perform another process of the technology described in this specification. Certainly, the data transmission apparatus 300 provided in this embodiment of this application includes but is not limited to the foregoing modules. For example, the data transmission apparatus 30) may further include a storage unit. The storage unit may be configured to store program code of the data transmission apparatus 300. All related content of the steps in the foregoing method embodiments may be cited in function descriptions of the corresponding functional modules. Details are not described herein.

When the data transmission apparatus 300 is the serving node of the terminal or the intermediate forwarding node, the obtaining unit 30, the replacing unit 33, the compression unit 34, the decompression unit 35, the security protecting unit 36, and the security processing unit 37 may be the processor 91 in FIG. 9, the sending unit 31 and the receiving unit 32 may be the transceiver 93 in FIG. 9, and the storage unit may be the memory 92 in FIG. 9.

When the data transmission apparatus 300 is the DeNB, the obtaining unit 30, the replacing unit 33, the compression unit 34, the decompression unit 35, the security protecting unit 36, and the security processing unit 37 may be the processor 101 in FIG. 10, the sending unit 31 and the receiving unit 32 may be the transceiver 103 in FIG. 10, and the storage unit may be the memory 102 in FIG. 10.

When the data transmission apparatus 300 runs, the data transmission apparatus 300 performs the steps of the first communications device in the data transmission method in the embodiment shown in FIG. 25.

Another embodiment of this application further provides a computer-readable storage medium. The computer-readable storage medium stores an instruction. When the instruction runs on the data transmission apparatus 300, the data transmission apparatus 300 performs the steps of the first communications device in the data transmission method in the embodiment shown in FIG. 25.

In another embodiment of this application, a computer program product is further provided. The computer program product includes a computer-executable instruction, and the computer-executable instruction is stored in a computer-readable storage medium. At least one processor of the data transmission apparatus 300 may read the computer-executable instruction from the computer-readable storage medium, and the at least one processor executes the computer-executable instruction, to enable the data transmission apparatus 300 to implement the steps of the first communications device in the data transmission method shown in FIG. 25.

An embodiment of this application provides a data transmission apparatus 400. The data transmission apparatus 400 may be a DeNB or a chip in the DeNB. The data transmission apparatus 400 is configured to perform the steps performed by the DeNB in the foregoing data transmission method. The data transmission apparatus 400 provided in this embodiment of this application may include modules corresponding to corresponding steps.

In this embodiment of this application, the data transmission apparatus 400 may be divided into functional modules based on the foregoing method examples. For example, functional modules may be obtained through division based on corresponding functions, or at least two functions may be integrated into one processing module. The integrated module may be implemented in a form of hardware, or may be implemented in a form of a software functional module. In this embodiment of this application, module division is an example, and is merely a logical function division. In actual implementation, another division manner may be used.

Figure 28:
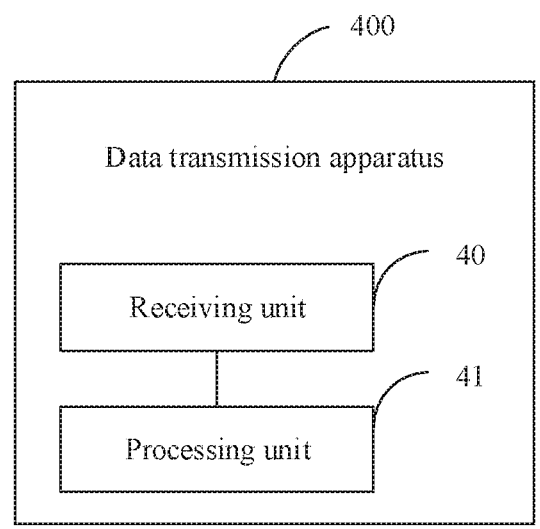
FIG. 28 is a second schematic structural diagram of a data transmission apparatus according to an embodiment of this application.

When the functional modules are obtained through division based on the corresponding functions, FIG. 28 is a possible schematic structural diagram of the data transmission apparatus 400 in this embodiment. As shown in FIG. 28, the data transmission apparatus 400 includes a receiving unit 40 and a processing unit 41. The receiving unit 40 is configured to instruct the data transmission apparatus 400 to perform S260 in the foregoing embodiment, and/or is configured to perform another process of the technology described in this specification. The processing unit 41 is configured to support the data transmission apparatus 400 in performing S261 and S262 in the foregoing embodiment, and/or is configured to perform another process of the technology described in this specification. All related content of the steps in the foregoing method embodiments may be cited in function descriptions of the corresponding functional modules. Details are not described herein. Certainly, the data transmission apparatus 400 provided in this embodiment of this application includes but is not limited to the foregoing modules. For example, the data transmission apparatus 400 may further include a storage unit. The storage unit may be configured to store program code and data of the data transmission apparatus 400.

The processing unit 41 may be the processor 101 in FIG. 10, the receiving unit 40 may be the transceiver 103 in FIG. 10, and the storage unit may be the memory 102 in FIG. 10.

Another embodiment of this application further provides a computer-readable storage medium. The computer-readable storage medium includes code of one or more programs, the one or more programs include an instruction, and when the processor in the data transmission apparatus 400 executes the program code, the data transmission apparatus 400 performs the data transmission method shown in FIG. 26.

In another embodiment of this application, a computer program product is further provided. The computer program product includes a computer-executable instruction, and the computer-executable instruction is stored in a computer-readable storage medium. At least one processor of the data transmission apparatus 400 may read the computer-executable instruction from the computer-readable storage medium, and the at least one processor executes the computer-executable instruction, to enable the data transmission apparatus 40 to implement the steps of the DeNB in the data transmission method shown in FIG. 26.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL) or wireless (for example, infrared, radio, or microwave) manner. The computer-readable storage medium may be any usable medium accessible by a computer, or a data terminal device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD), or the like.

According to foregoing descriptions about implementations, it may be clearly understood by a person skilled in the art that, for the purpose of convenient and brief description, division of the foregoing functional modules is used as an example for description. In an actual application, the functions may be assigned to different functional modules for implementation as required. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and components displayed as units may be one or more physical units, in other words, may be located in one place, or may be distributed on a plurality of different places. Some or all of the units may be selected based on an actual requirement to achieve an objective of the solutions of the embodiments.

In addition, functional units in the embodiments of this application may be integrated into one processing unit, or each of the units may exist alone physically, or two or more units may be integrated into one unit. The integrated units may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of this application essentially, or the part contributing to the prior art, or all or some of the technical solutions may be implemented in a form of a software product. The software product is stored in a storage medium and includes a plurality of instructions for instructing a device (which may be a single-chip microcomputer, a chip or the like) or a processor to perform all or some of the steps of the methods described in the embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A data transmission method, applied to a first communications device or a chip in the first communications device, wherein the first communications device is a donor base station or a distributed unit (DU) of the donor base station, and wherein the data transmission method comprises:
    obtaining first data; and
    after obtaining the first data;
        compressing sub-information in the first data based on a first preset compression algorithm, wherein the sub-information comprises at least one of an internet protocol (IP) header, a stream control transmission protocol (SCTP) common header, and information other than target information in an SCTP data chunk, and the target information is at least one of user data, an SCTP stream identifier, and an SCTP payload protocol identifier (PPI); or wherein the sub-information comprises at least one of an IP header, a user datagram protocol (UDP) header, and information other than a tunnel endpoint identifier (TEID) in a general packet radio service tunneling protocol (GTP) header; and
        sending a first message to a second communications device, wherein the first message comprises the first data obtained after compression and a type identifier, wherein the type identifier is used to indicate a type of the first data, and wherein the type of the first data comprises at least one of user plane data, a status report, a control plane message, and a radio resource control (RRC) message of a terminal; and
    wherein the second communications device is a next-hop device of the first communications device; and
    if the first data is the user plane data, the first message comprises first indication information and a global sequence number (SN) of the user plane data, and the first indication information is used to indicate a data radio bearer (DRB) of the terminal to which the user plane data belongs;
    if the first data is the status report, the first data comprises the global SN of the user plane data carried over the DRB of the terminal, wherein the first data is used to indicate a transmission status of a DRB data packet of a third communications device, and wherein the third communications device is the terminal, an intermediate forwarding node, or a serving node of the terminal; or
    if the first data is the control plane message, the first message comprises at least one of transport layer protocol layer information of a first interface, second indication information, an identifier of the terminal on the first interface, and third indication information, wherein the first interface is a logical communications interface between the first communications device and the second communications device, wherein the transport layer protocol layer information of the first interface comprises at least one of an IP address of the first communications device, an IP address of the second communications device, an IP address of the donor base station or the DU, a port number of the first communications device, a port number of the second communications device, a port number of the donor base station or the DU, the SCTP stream identifier, and the PPI, wherein the second indication information is used to indicate the first communications device, and wherein the third indication information is used to indicate the first interface; or the first message comprises fourth indication information and an identifier of the serving node of the terminal, and the fourth indication information is used to indicate the terminal.

2. The data transmission method according to claim 1, wherein if the first data is the status report, the first data further comprises fifth indication information, and the fifth indication information is used to indicate the DRB of the terminal.

3. The data transmission method according to claim 2, wherein if the third communications device is the intermediate forwarding node or the serving node of the terminal, the first data comprises the fifth indication information carried over each DRB in at least one DRB of the third communications device.

4. The data transmission method according to claim 1, wherein the first message further comprises at least one of a target identifier and sixth indication information, wherein the target identifier is used to indicate the serving node of the terminal, and wherein the sixth indication information is used to indicate the terminal.

5. The data transmission method according to claim 1, wherein if the first data is the control plane message, and when the first message comprises the identifier of the terminal on the first interface or the fourth indication information, the obtaining first data comprises:
receiving a second message comprising second data, wherein the second data comprises seventh indication information, and wherein the seventh indication information is used to indicate the terminal or the DRB of the terminal;
obtaining the second data; and
replacing the seventh indication information with the identifier of the terminal on the first interface or the fourth indication information to generate the first data.

6. The data transmission method according to claim 1, wherein the first communications device is the DU, and wherein the data transmission method further comprises:
receiving a fifth message sent by the second communications device, wherein the fifth message comprises fourth data; and
decompressing the fourth data based on a fourth preset compression algorithm, and sending the decompressed fourth data to a centralized unit (CU) of the donor base station.

7. The data transmission method according to claim 6, wherein the first communications device is the DU, and wherein the obtaining first data comprises:
receiving a sixth message sent by the CU, wherein the sixth message comprises fifth data;
obtaining the fifth data from the sixth message; and
decompressing the fifth data based on a fifth preset compression algorithm to obtain the first data.

8. The data transmission method according to claim 1, wherein after the obtaining first data, the data transmission method further comprises:
processing the first data based on a first preset key and a first preset target algorithm, wherein the first preset target algorithm comprises at least one of a preset encryption algorithm and a first preset integrity protection algorithm; and
wherein the sending a first message to a second communications device comprises:
sending the first message comprising the processed first data to the second communications device.

9. The data transmission method according to claim 8, wherein the first communications device is the DU, and wherein the data transmission method further comprises:
receiving a ninth message sent by the second communications device, wherein the ninth message comprises eighth data;
obtaining the eighth data, and processing the eighth data based on a fourth preset key and a fourth preset target algorithm; and
sending the processed eighth data to a centralized unit (CU) of the donor base station, wherein the fourth preset target algorithm comprises at least one of a third preset decryption algorithm and a fourth preset integrity protection algorithm.

10. The data transmission method according to claim 1, wherein after obtaining the first data comprises in response to obtaining the first data.

11. A data transmission apparatus, wherein the data transmission apparatus is a first communications device or a chip in the first communications device, wherein the first communications device is a donor base station or a distributed unit (DU) of the donor base station, and wherein the data transmission apparatus comprises: at least one processor and a memory having instructions, wherein the instructions are executed by the at least one processor to cause the apparatus to:
obtain first data; and
after obtaining the first data;
compress sub-information in the first data based on a first preset compression algorithm, wherein the sub-information comprises at least one of an internet protocol (IP) header, a stream control transmission protocol (SCTP) common header, and information other than target information in an SCTP data chunk, and the target information is at least one of user data, an SCTP stream identifier, and an SCTP payload protocol identifier (PPI); or wherein the sub-information comprises at least one of an IP header, a user datagram protocol (UDP) header, and information other than a tunnel endpoint identifier (TEID) in a general packet radio service tunneling protocol (GTP) header; and
send a first message to a second communications device, wherein the first message comprises the first data obtained after compression and a type identifier, wherein the type identifier is used to indicate a type of the first data, and wherein the type of the first data comprises at least one of user plane data, a status report, a control plane message, and a radio resource control (RRC) message of a terminal; and wherein the second communications device is a next-hop device of the first communications device; and
if the first data is the user plane data, the first message comprises first indication information and a global sequence number (SN) of the user plane data, and the first indication information is used to indicate a data radio bearer (DRB) of the terminal to which the user plane data belongs;
if the first data is the status report, the first data comprises the global SN of the user plane data carried over the DRB of the terminal, wherein the first data is used to indicate a transmission status of a DRB data packet of a third communications device, and wherein the third communications device is the terminal, an intermediate forwarding node, or a serving node of the terminal; or if the first data is the control plane message, the first message comprises at least one of transport layer protocol layer information of a first interface, second indication information, an identifier of the terminal on the first interface, and third indication information, wherein the first interface is a logical communications interface between the first communications device and the second communications device, wherein the transport layer protocol layer information of the first interface comprises at least one of an IP address of the first communications device, an IP address of the second communications device, an IP address of the donor base station or the DU, a port number of the first communications device, a port number of the second communications device, a port number of the donor base station or the DU, the SCTP stream identifier, and the PPI, wherein the second indication information is used to indicate the first communications device, and wherein the third indication information is used to indicate the first interface; or the first message comprises fourth indication information and an identifier of the serving node of the terminal, and the fourth indication information is used to indicate the terminal.

12. The data transmission apparatus according to claim 11, wherein if the first data is the status report, the first data further comprises fifth indication information, and the fifth indication information is used to indicate the DRB of the terminal.

13. The data transmission apparatus according to claim 12, wherein if the third communications device is an intermediate forwarding node or a serving node of the terminal, the first data comprises the fifth indication information carried over each DRB in at least one DRB of the third communications device.

14. The data transmission apparatus according to claim 11, wherein the first message further comprises at least one of a target identifier and sixth indication information, wherein the target identifier is used to indicate the serving node of the terminal, and wherein the sixth indication information is used to indicate the terminal.

15. The data transmission apparatus according to claim 11, wherein if the first data is the control plane message, and the first message comprises the identifier of the terminal on the first interface or the fourth indication information, the instructions further cause the apparatus to:
receive a second message comprising second data, wherein the second data comprises seventh indication information, and wherein the seventh indication information is used to indicate the terminal or the DRB of the terminal;
obtain the second data from the second message; and
replace the seventh indication information with the identifier of the terminal on the first interface or the fourth indication information to generate the first data.

16. The data transmission apparatus according to claim 11, wherein the first communications device is the DU, and wherein the instructions further cause the apparatus to:
receive a fifth message sent by the second communications device, wherein the fifth message comprises fourth data; and
decompress the fourth data based on a fourth preset compression algorithm; and send the decompressed fourth data to a centralized unit (CU) of the donor base station.

17. The data transmission apparatus according to claim 16, wherein the first communications device is the DU, and wherein the instructions further cause the apparatus to:
receive a sixth message sent by the CU, wherein the sixth message comprises fifth data;
obtain the fifth data from the sixth message; and
decompress the fifth data based on a fifth preset compression algorithm, to obtain the first data.

18. The data transmission apparatus according to claim 11, wherein the instructions further cause the apparatus to:
process, after obtaining the first data, the first data based on a first preset key and a first preset target algorithm, wherein the first preset target algorithm comprises at least one of a preset encryption algorithm and a first preset integrity protection algorithm; and
send the first message comprising the processed first data to the second communications device.

19. The data transmission apparatus according to claim 18, wherein the first communications device is the DU, and wherein the instructions further cause the apparatus to:
receive a ninth message sent by the second communications device, wherein the ninth message comprises eighth data;
obtain the eighth data from the ninth message;
process the eighth data based on a fourth preset key and a fourth preset target algorithm; and
send the processed eighth data to a centralized unit (CU) of the donor base station, wherein the fourth preset target algorithm comprises at least one of a third preset decryption algorithm and a fourth preset integrity protection algorithm.

20. The data transmission apparatus according to claim 11, wherein after obtaining the first data comprises in response to obtaining the first data.

* * * * *

UNITED STATES PATENT AND TRADEMARK OFFICE
CERTIFICATE OF CORRECTION

| | | |
|---|---|---|
| PATENT NO. | : 11,463,937 B2 | |
| APPLICATION NO. | : 16/925614 | |
| DATED | : October 4, 2022 | |
| INVENTOR(S) | : Rui Wang et al. | |

It is certified that error appears in the above-identified patent and that said Letters Patent is hereby corrected as shown below:

In the Claims

In Column 70, In Line 14, In Claim 1, delete "data;" and insert -- data: --.

In Column 72, In Line 30, In Claim 11, delete "data;" and insert -- data: --.

Signed and Sealed this
Second Day of May, 2023

*Katherine Kelly Vidal*

Katherine Kelly Vidal
*Director of the United States Patent and Trademark Office*